(12) United States Patent
Seok et al.

(10) Patent No.: US 12,284,635 B2
(45) Date of Patent: Apr. 22, 2025

(54) METHOD FOR TRANSMITTING UPLINK CHANNEL IN WIRELESS COMMUNICATION SYSTEM AND APPARATUS THEREFOR

(71) Applicant: WILUS INSTITUTE OF STANDARDS AND TECHNOLOGY INC., Gyeonggi-do (KR)

(72) Inventors: Geunyoung Seok, Gyeonggi-do (KR); Minseok Noh, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/618,855

(22) Filed: Mar. 27, 2024

(65) Prior Publication Data

US 2024/0323934 A1 Sep. 26, 2024

Related U.S. Application Data

(63) Continuation of application No. PCT/KR2022/014496, filed on Sep. 27, 2022.

(30) Foreign Application Priority Data

Sep. 27, 2021 (KR) .................. 10-2021-0127439
Nov. 5, 2021 (KR) .................. 10-2021-0151431

(Continued)

(51) Int. Cl.
*H04W 72/0446* (2023.01)
*H04L 5/00* (2006.01)
*H04W 72/21* (2023.01)

(52) U.S. Cl.
CPC ....... *H04W 72/0446* (2013.01); *H04L 5/0051* (2013.01); *H04W 72/21* (2023.01)

(58) Field of Classification Search
CPC .. H04W 72/0446; H04W 72/21; H04L 5/0051
See application file for complete search history.

(56) References Cited

U.S. PATENT DOCUMENTS 12,069,670 B2 *  8/2024  Shim ..................... H04L 5/0051
2019/0165985 A1   5/2019  Bose et al.

(Continued)

FOREIGN PATENT DOCUMENTS

WO   2022/151868   7/2022
WO   2022/152195   7/2022

(Continued)

OTHER PUBLICATIONS

International Search Report for PCT/KR2022/014496 mailed on Jan. 13, 2023 and its English translation from WIPO (now published as WO2023/048551).

(Continued)

*Primary Examiner* — Brian D Nguyen
(74) *Attorney, Agent, or Firm* — WOMBLE BOND DICKINSON (US) LLP

(57) ABSTRACT

The present invention relates to a method used in a wireless communication system and an apparatus therefor, comprising the steps of: transmitting an uplink channel on a slot set; and transmitting a DMRS for transmission of the uplink channel on the slot set, wherein the DMRS is transmitted to maintain phase continuity and power consistency over a plurality of consecutive slots in a time window, and, when the length of the time window is not configured by a base station, the time window is determined according to the proposal of the present invention.

12 Claims, 53 Drawing Sheets

(30) Foreign Application Priority Data

Dec. 20, 2021 (KR) .......................... 10-2021-0183237
Feb. 22, 2022 (KR) .......................... 10-2022-0023264

(56) References Cited

U.S. PATENT DOCUMENTS

| | | | |
|---|---|---|---|
| 2022/0224456 A1* | 7/2022 | Yi | ...................... H04W 72/1268 |
| 2023/0033400 A1* | 2/2023 | Maso | .................... H04L 5/0051 |
| 2024/0188055 A1* | 6/2024 | Su | ......................... H04L 5/0051 |
| 2024/0188075 A1* | 6/2024 | Tran | ...................... H04L 5/0048 |

FOREIGN PATENT DOCUMENTS

| | | |
|---|---|---|
| WO | 2022/152217 | 7/2022 |
| WO | 2023/003816 | 1/2023 |
| WO | 2023/007056 | 2/2023 |
| WO | 2023/048551 | 3/2023 |

OTHER PUBLICATIONS

Written Opinion of the International Searching Authority for PCT/KR2022/014496 mailed on Jan. 13, 2023 and its English translation by Google Translate (now published as WO2023/048551).

China Telecom: "Discussion on Pucch enhancements", 3GPP TSG RAN WG1 #105-e, R1-2104849, e-Meeting, May 11, 2021, pp. 1-4.

Vivo: "Discussion on Joint channel estimation for Pusch", 3GPP TSG RAN WG1 #105-e, R1-2104378, e-Meeting, May 11, 2021, pp. 1-12.

CMCC: "Discussion on joint channel estimation for Pusch", 3GPP TSG RAN WG1 #106-e, R1-2107419, e-Meeting, Aug. 7, 2021, pp. 1-10.

CATT: "Discussion on joint channel estimation for Pusch", 3GPP TSG RAN WG1 #106-e, R1-2106990, e-Meeting, Aug. 7, 2021, pp. 1-15.

\* cited by examiner

FIG. 9
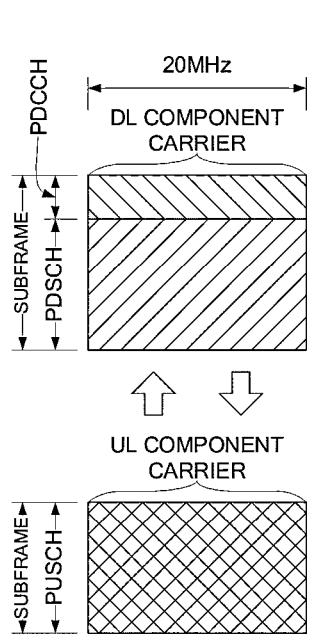
(a) Single CC
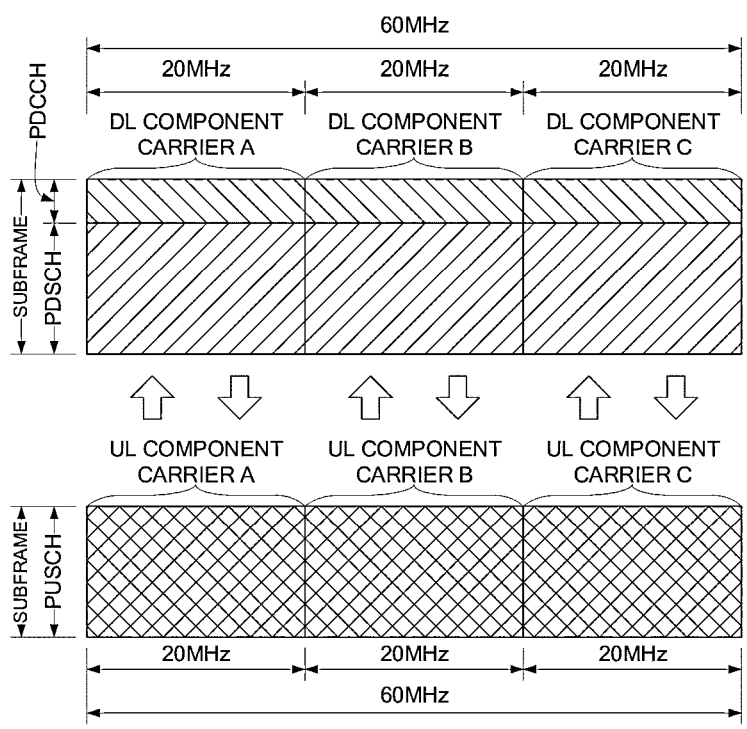
(b) Multiple CC

FIG. 12
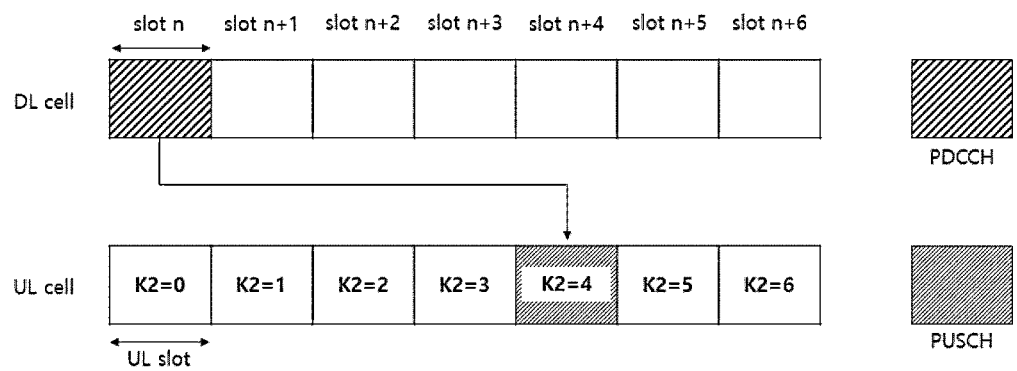
(a) PUSCH scheduling in time (K2)
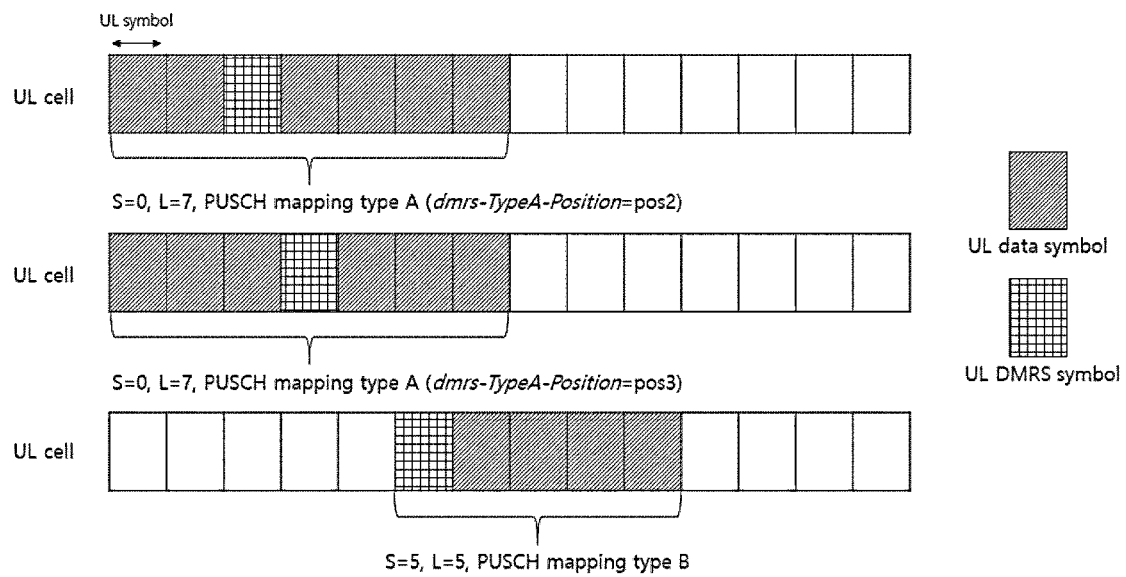
(b) PUSCH scheduling in time (SLIV)

FIG. 13
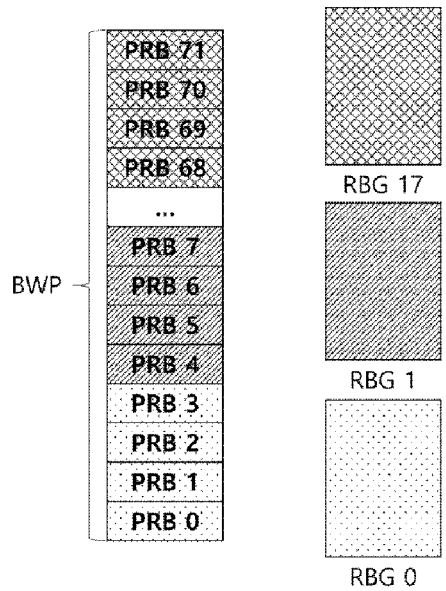
(a) PUSCH scheduling in frequency (type 0)
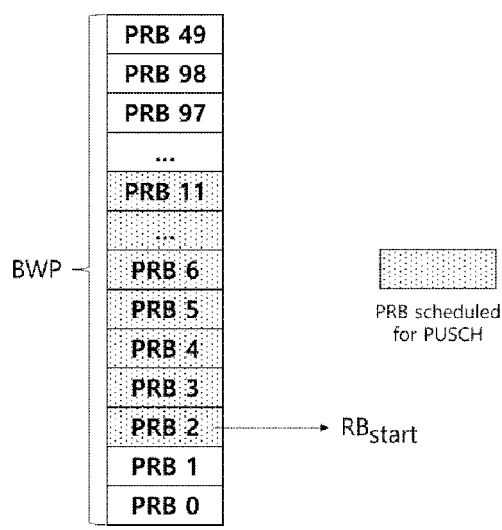
(b) PUSCH scheduling in frequency (type 1)

FIG. 14
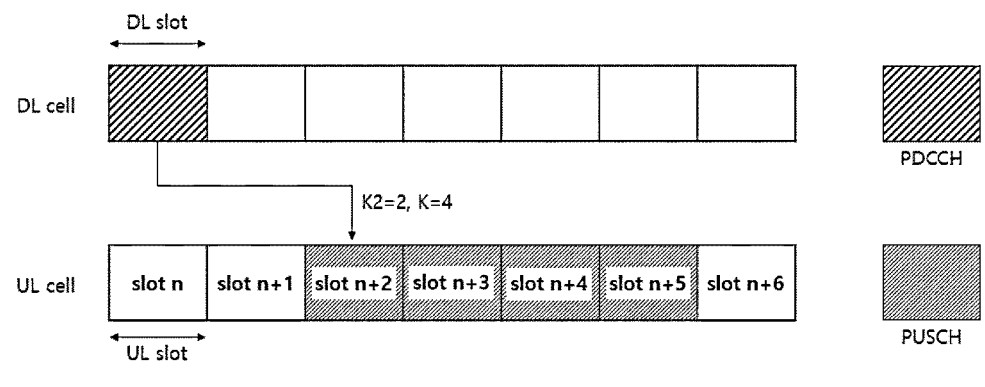
(a) PUSCH repetition type A
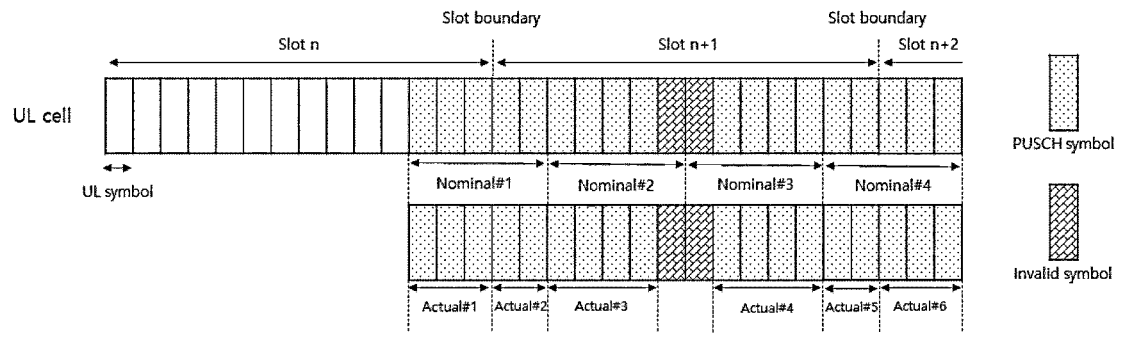
(b) PUSCH repetition type B

| slot n | slot n+1 | slot n+2 | slot n+3 | slot n+4 | slot n+5 | slot n+6 |
|---|---|---|---|---|---|---|
| 1st hop | Invalid UL | Invalid UL | 2nd hop | 1st hop | Invalid UL | 2nd hop |
| index: 0 | 0 | 1 | 1 | 2 | 2 | 3 |

(a) 1st example (case 1, N=4, M=2)

| slot n | slot n+1 | slot n+2 | slot n+3 | slot n+4 | slot n+5 | slot n+6 |
|---|---|---|---|---|---|---|
| 1st hop | Invalid UL | Invalid UL | 1st hop | 2nd hop | Invalid UL | 2nd hop |
| index: 0 | | | 0 | 1 | | 1 |

(b) 2nd example (case 1, N=4, M=2)

FIG. 29

| slot n | slot n+1 | slot n+2 | slot n+3 | slot n+4 | slot n+5 | slot n+6 | slot n+7 | slot n+8 | slot n+9 | slot n+10 |
|---|---|---|---|---|---|---|---|---|---|---|
| 1st hop | 1st hop | 2nd hop | Invalid UL | Invalid UL | 1st hop | 2nd hop | Invalid UL | 1st hop | 1st hop | 2nd hop |
| index: 0 | 0 | 1 | 1 | 2 | 2 | 3 | 3 | 4 | 4 | 5 |

(a) 1st example (case 2, N=8, M=2)

| slot n | slot n+1 | slot n+2 | slot n+3 | slot n+4 | slot n+5 | slot n+6 | slot n+7 | slot n+8 | slot n+9 | slot n+10 |
|---|---|---|---|---|---|---|---|---|---|---|
| 1st hop | 1st hop | 2nd hop | Invalid UL | Invalid UL | 2nd hop | 1st hop | Invalid UL | 1st hop | 2nd hop | 2nd hop |
| index: 0 | 0 | 1 | | | 1 | 2 | | 2 | 3 | 3 |

(b) 2nd example (case 2, N=8, M=2)

FIG. 30

| | slot n | slot n+1 | slot n+2 | slot n+3 | slot n+4 | slot n+5 | slot n+6 | slot n+7 | slot n+8 | slot n+9 | slot n+10 |
|---|---|---|---|---|---|---|---|---|---|---|---|
| case 1) N=4 M=2 | 1st hop | Invalid UL | Invalid UL | 2nd hop | 2nd hop | Invalid UL | 1st hop | | | | |
| index: | 0 | | | 1 | 1 | | 2 | | | | |

(a) 3rd example (case 1, N=4, M=2)

| | slot n | slot n+1 | slot n+2 | slot n+3 | slot n+4 | slot n+5 | slot n+6 | slot n+7 | slot n+8 | slot n+9 | slot n+10 |
|---|---|---|---|---|---|---|---|---|---|---|---|
| case 2) N=8 M=2 | 1st hop | 1st hop | 2nd hop | Invalid UL | Invalid UL | 1st hop | 1st hop | Invalid UL | 2nd hop | 2nd hop | 1st hop |
| index: | 0 | 0 | 1 | | | 2 | 2 | | 3 | 3 | 4 |

(b) 3rd example (case 2, N=8, M=2)

| | slot n | slot n+1 | slot n+2 | slot n+3 | slot n+4 | slot n+5 | slot n+6 | slot n+7 |
|---|---|---|---|---|---|---|---|---|
| 2nd hop | | repetition#2 | | | | | | |
| 1st hop | repetition#1 | | | | | | | |

N=4, M(4)=2

| | slot n | slot n+1 | slot n+2 | slot n+3 | slot n+4 | slot n+5 | slot n+6 | slot n+7 |
|---|---|---|---|---|---|---|---|---|
| 2nd hop | | | repetition#3 | repetition#4 | | | | |
| 1st hop | repetition#1 | repetition#2 | | | | | | |

N=8, M(8)=4

| | slot n | slot n+1 | slot n+2 | slot n+3 | slot n+4 | slot n+5 | slot n+6 | slot n+7 |
|---|---|---|---|---|---|---|---|---|
| 2nd hop | | | | | repetition#5 | repetition#6 | repetition#7 | repetition#8 |
| 1st hop | repetition#1 | repetition#2 | repetition#3 | repetition#4 | | | | |

| slot 0 | slot 1 | slot 2 | slot 3 | slot 4 | slot 5 |
|--------|--------|--------|--------|--------|--------|
| 0 | 1 | 1 | 1 | 0 | 1 |

(a) First method

| slot 0 | slot 1 | slot 2 | slot 3 | slot 4 | slot 5 |
|--------|--------|--------|--------|--------|--------|
| 0 | 0 | 0 | 1 | 1 | 0 |

(b) Second method

FIG. 39

| slot 0 | slot 1 | slot 2 | slot 3 | slot 4 | slot 5 |
|--------|--------|--------|--------|--------|--------|
| 0 | 1 | 2 | 3 | 0 | 1 |

(a) 1st example

| slot 0 | slot 1 | slot 2 | slot 3 | slot 4 | slot 5 |
|--------|--------|--------|--------|--------|--------|
| 0 | 1 | 2 | 0 | 1 | 0 |

(b) 1st example

FIG. 40

| slot 0 | slot 1 | slot 2 | slot 3 | slot 4 | slot 5 |
|---|---|---|---|---|---|
| 0 | 1 | 0 | 1 | 2 | 3 |

(a) 1st example

| slot 0 | slot 1 | slot 2 | slot 3 | slot 4 | slot 5 |
|---|---|---|---|---|---|
| (0,2) | (1,2) | (0, 4) | (1, 4) | (2,4) | (3,4) |

(b) 1-1st example

FIG. 59
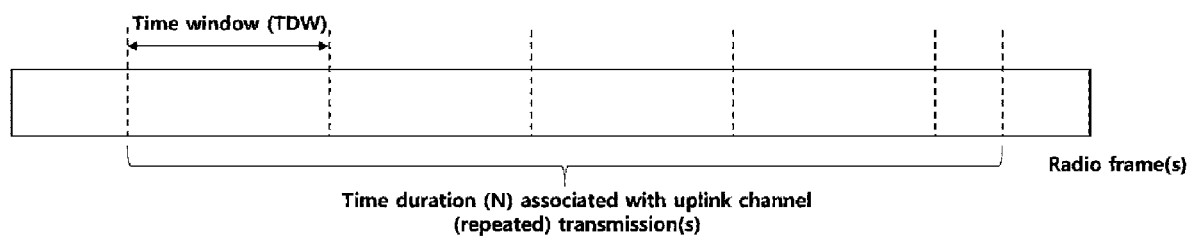
(a) Case when M < N
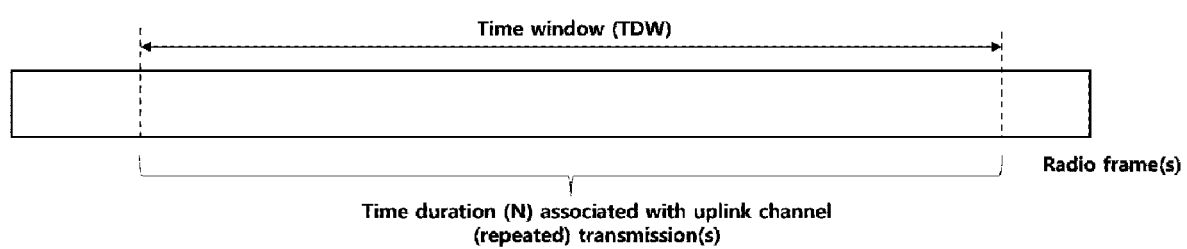

METHOD FOR TRANSMITTING UPLINK CHANNEL IN WIRELESS COMMUNICATION SYSTEM AND APPARATUS THEREFOR

This application is a continuation of pending PCT International Application No. PCT/KR2022/014496, which was filed on Sep. 27, 2022, and which claims priority under 35 U.S.C 119(a) to Korean Patent Application No. 10-2021-0127439 filed with the Korean Intellectual Property Office on Sep. 27, 2021, Korean Patent Application No. 10-2021-0151431 filed with the Korean Intellectual Property Office on Nov. 5, 2021, Korean Patent Application No. 10-2021-0183237 filed with the Korean Intellectual Property Office on Dec. 20, 2021, and Korean Patent Application No. 10-2022-0023264 filed with the Korean Intellectual Property Office on Feb. 22, 2022. The disclosures of the above patent applications are incorporated herein by reference in their entirety.

TECHNICAL FIELD

The present specification relates to a wireless communication system and, more particularly, to a method for transmitting an uplink channel and a device therefor.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture. For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (COMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

The present disclosure is to provide a method for efficiently performing a wireless signal transmission or reception process, and an apparatus therefor.

The technical problems to be solved in the present disclosure are not limited to the above-described technical problems, and other unmentioned technical features can be clearly understood by those who skilled in the art to which the present disclosure belongs from the description below.

Solution to Problem

As an aspect of the present disclosure, provided is a user equipment (UE) used in a wireless communication system, the UE including a communication module, and a process configured to control the communication module, wherein the processor is configured to perform transmission of an uplink channel on a slot set, and transmit a demodulation reference signal (DMRS) for the transmission of the uplink channel on the slot set, wherein when a joint channel estimation operation is configured, the DMRS is transmitted so that phase continuity and power consistency are maintained over multiple consecutive slots within a time window, and when a length of the time window is not configured by a base station, the time window is determined based on a smaller value between following values: (1) a number of slots including the transmission of the uplink channel; and (2) a maximum number of slots in which the UE can maintain the phase continuity and power consistency according to UE capability.

As another aspect of the present disclosure, provided is a method used by a user equipment (UE) in a wireless communication system, the method including performing transmission of an uplink channel on a slot set, and transmitting a demodulation reference signal (DMRS) for the transmission of the uplink channel on the slot set, wherein when a joint channel estimation operation is configured, the DMRS is transmitted so that phase continuity and power consistency are maintained over multiple consecutive slots within a time window, and when a length of the time window is not configured by a base station, the time window is determined based on a smaller value between following values: (1) a number of slots including the transmission of the uplink channel; and (2) a maximum number of slots in which the UE can maintain the phase continuity and power consistency according to UE capability.

Preferably, when the joint channel estimation operation is not configured, the DMRS may be used for slot-based separate channel estimation.

Preferably, when the length of the time window is configured by the base station, the time window may be determined as being configured by the base station.

Preferably, the number of slots including the transmission of the uplink channel may correspond to a number of slots from a slot in which the transmission of the uplink channel starts to a slot in which the transmission of the uplink channel ends.

Preferably, the number of slots including the transmission of the uplink channel may correspond to a number of consecutive slots including the transmission of the uplink channel.

Preferably, the uplink channel may include a PUCCH repetition transmission or a PUSCH repetition transmission.

Preferably, the uplink channel may include a PUSCH repetition transmission type A, a PUSCH repetition transmission type B, a PUSCH transmission having a transport block size (TBS) determined with reference to multiple slots, or a PUSCH repetition transmission having a TBS determined with reference to multiple slots.

Advantageous Effects of Invention

According to the present disclosure, a wireless signal transmission or reception process can be efficiently performed.

The technical problems to be solved in the present disclosure are not limited to the above-described technical problems, and other unmentioned technical features can be clearly understood by those who skilled in the art to which the present disclosure belongs from the description below.

BRIEF DESCRIPTION OF DRAWINGS

FIG. 9 is a diagram for explaining signal carrier communication and multiple carrier communication.

FIG. 12 illustrates a method of scheduling a physical uplink shared channel (PUSCH) in a time domain.

FIG. 13 illustrates a method of scheduling a PUSCH in a frequency domain.

FIG. 14 illustrates repeated transmission of a PUSCH.

FIG. 29 illustrates a slot index determination method for PUCCH frequency hopping according to an example of the present disclosure.

FIG. 30 illustrates a slot index determination method for PUCCH frequency hopping according to an example of the present disclosure.

FIG. 31 illustrates a slot index determination method for PUCCH frequency hopping according to an example of the present disclosure.

FIG. 33 illustrates a method for mapping a PUCCH repetition to a frequency hop according to an example of the present disclosure.

FIG. 34 illustrates a method for mapping a PUCCH repetition to a frequency hop according to an example of the present disclosure.

FIG. 35 illustrates a method for mapping a PUCCH repetition to a frequency hop according to an example of the present disclosure.

FIG. 39 illustrates a TDW indication method of a UE.

FIG. 40 illustrates a TDW indication method according to an example of the present disclosure.

FIG. 41 illustrates a TDW indication method according to an example of the present disclosure.

FIG. 42 illustrates a TDW indication method according to an example of the present disclosure.

FIGS. 58 and 59 illustrate an uplink channel transmission method according to an example of the present disclosure.

BEST MODE FOR CARRYING OUT THE INVENTION

Figure 1:
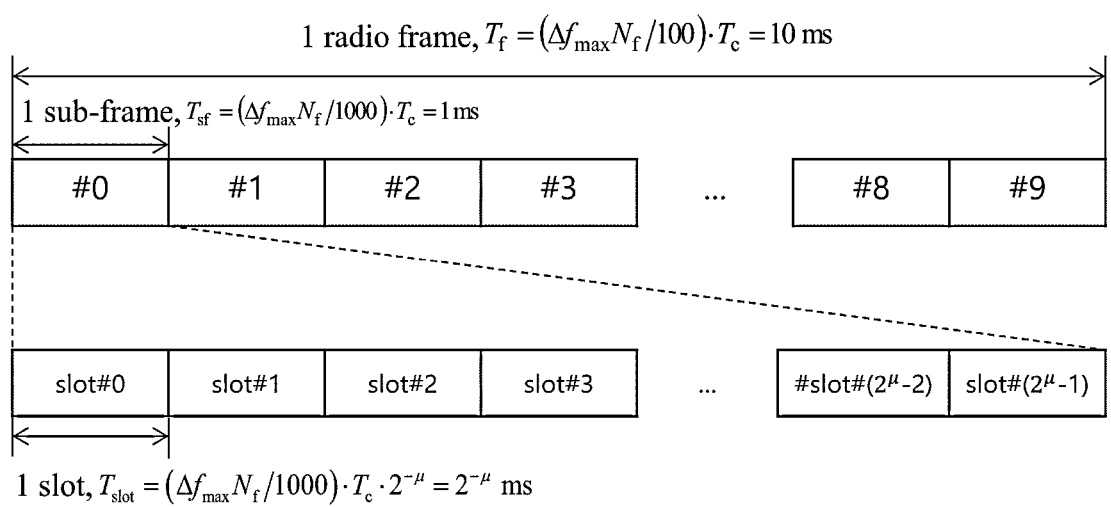
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (cMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configure an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta_{fmax}N_f/100)*T_c$). In addition, the wireless frame includes 10 subframes (SFs) having equal sizes. Herein, $\Delta fmax=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one subframe. Each subframe has a length of 1 ms and may include one or more slots according to a subcarrier spacing. More specifically, in the 3GPP NR system, the subcarrier spacing that may be used is $15*2^\mu$ kHz, and u can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
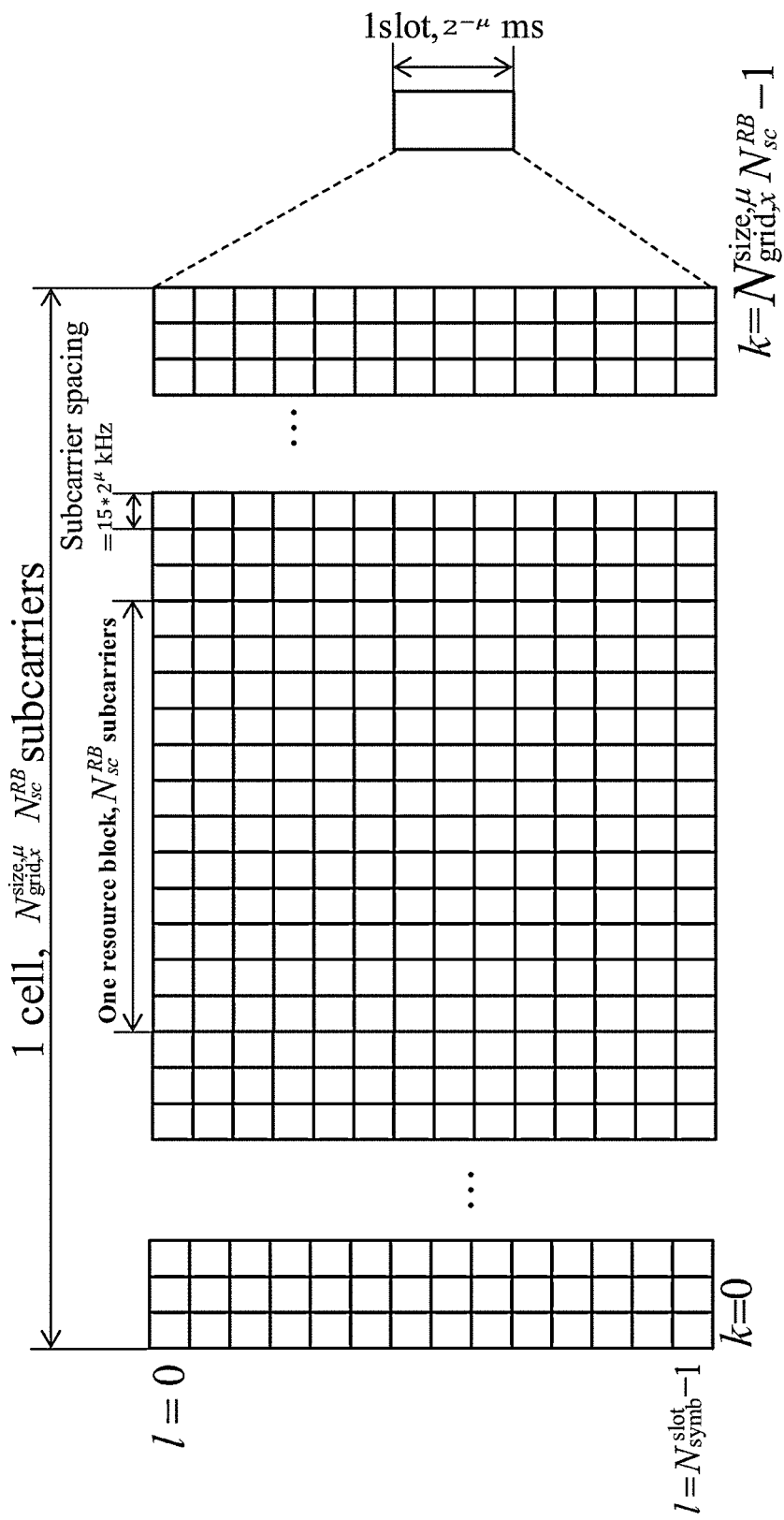
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent μ (x is DL or UL), and $N^{slot}_{symb}$ represents the number of OFDM symbols in a slot. NRBsc is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency ($f_c$).

One RB may be defined by NRBsc (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal cannot change a DL symbol or a UL symbol configured with the cell-specific RRC signal into another symbol type. The UE-specific RRC signal may signal the number of DL symbols among the Nslotsymb symbols of the corresponding slot for each slot, and the number of UL symbols among the Nslotsymb symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE may transmit a preamble through a physical random access channel (PRACH) (S103), and receive a random access response (RAR) message for the preamble from the base station through the PDCCH and the corresponding PDSCH (S104). In this case, the preamble in steps S103 and S104 may be described as message 1 (Msg1),

TABLE 1

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | X | X | X | U | U |
| 5 | D | D | D | D | D | D | D | D | D | D | D | X | X | X | 33 | D | D | D | D | D | D | D | D | X | X | X | X | U | U |
| 6 | D | D | D | D | D | D | D | D | D | X | X | X | X | X | 34 | D | X | U | U | U | U | U | U | U | U | U | U | U | U |
| 7 | D | D | D | D | D | D | D | D | X | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | X | X | X | X | U | U | U | U | U | U | U | U | U |
| 14 | X | X | X | X | X | U | U | U | U | U | U | U | U | U | 42 | D | D | X | X | X | U | U | U | U | U | U | U | U | U |
| 15 | X | X | X | X | X | X | U | U | U | U | U | U | U | U | 43 | D | D | D | D | D | D | D | X | X | X | X | X | X | U |
| 16 | D | X | X | X | X | X | X | X | X | X | X | X | X | X | 44 | D | D | D | D | D | X | X | X | X | X | X | U | U | U |
| 17 | D | D | X | X | X | X | X | X | X | X | X | X | X | X | 45 | D | D | D | D | D | D | X | X | U | U | U | U | U | U |
| 18 | D | D | D | X | X | X | X | X | X | X | X | X | X | X | 46 | D | D | D | D | X | U | D | D | D | D | D | X | U | U |
| 19 | D | X | X | X | X | X | X | X | X | X | X | X | X | U | 47 | D | D | X | U | U | U | D | D | X | U | U | U | U | U |
| 20 | D | D | X | X | X | X | X | X | X | X | X | X | X | U | 48 | D | X | U | U | U | U | D | X | U | U | U | U | U | U |
| 21 | D | D | D | X | X | X | X | X | X | X | X | X | X | U | 49 | D | D | D | X | X | U | D | D | D | X | X | U | U | U |
| 22 | D | X | X | X | X | X | X | X | X | X | X | X | U | U | 50 | D | D | X | X | U | U | D | D | X | X | U | U | U | U |
| 23 | D | D | X | X | X | X | X | X | X | X | X | X | U | U | 51 | D | X | X | U | U | U | D | X | X | U | U | U | U | U |
| 24 | D | D | D | X | X | X | X | X | X | X | X | X | U | U | 52 | D | X | X | X | U | D | X | X | X | X | X | X | X | U |
| 25 | D | X | X | X | X | X | X | X | X | X | U | U | U | U | 53 | D | D | X | X | X | U | D | D | X | X | X | X | U | U |
| 26 | D | D | X | X | X | X | X | X | X | X | X | U | U | U | 54 | X | X | X | X | X | X | D | D | D | D | D | D | D | D |
| 27 | D | D | D | X | X | X | X | X | X | X | X | U | U | U | 55 | D | D | X | X | X | U | U | U | D | D | D | D | D | D |
| 56~255 | | | | | | | | | | | | | | | Reserved | | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
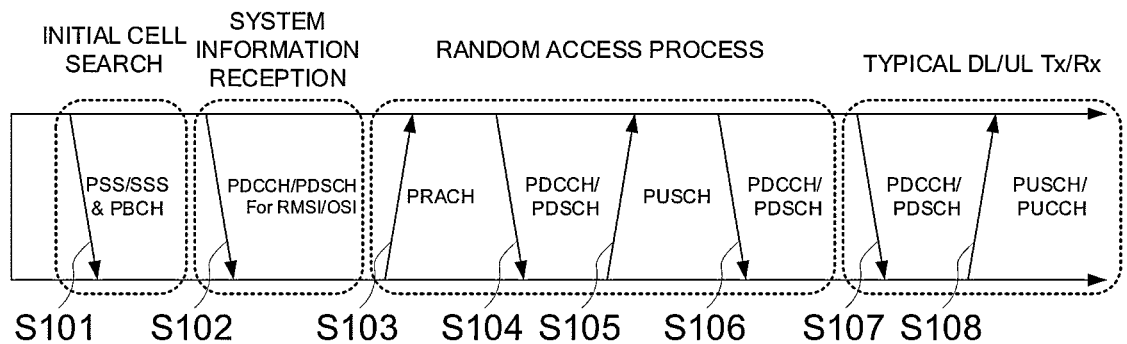
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

and the random access response may be described as a response message or message 2 (Msg2). When a valid random access response is received by the UE, the UE transmits data including the identifier of the UE and the like to the base station through a physical uplink shared channel (PUSCH) indicated by the UL grant transmitted through the PDCCH from the base station (S105). In this case, the data including the own identifier of step S105 and the PUSCH including the data may be described as message 3 (Msg3). Also, the PUSCH including the data may be described as Message 3 PUSCH (Msg3 PUSCH). Next, the UE waits for reception of the PDCCH as an indication of the base station for collision resolution. When the UE successfully receives the PDCCH through its own identifier and receives the corresponding PDSCH (S106), the random access process ends. In this case, the PDCCH and PDSCH of step S106 may be described as message 4 (Msg 4). During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
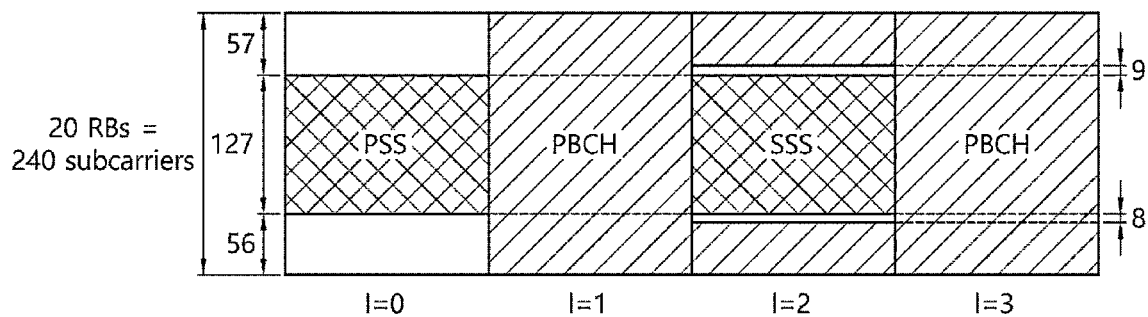
FIGS. 4A and 4B illustrate an SS/PBCH block for initial cell access in a 3GPP NR system.
Figure 4B:
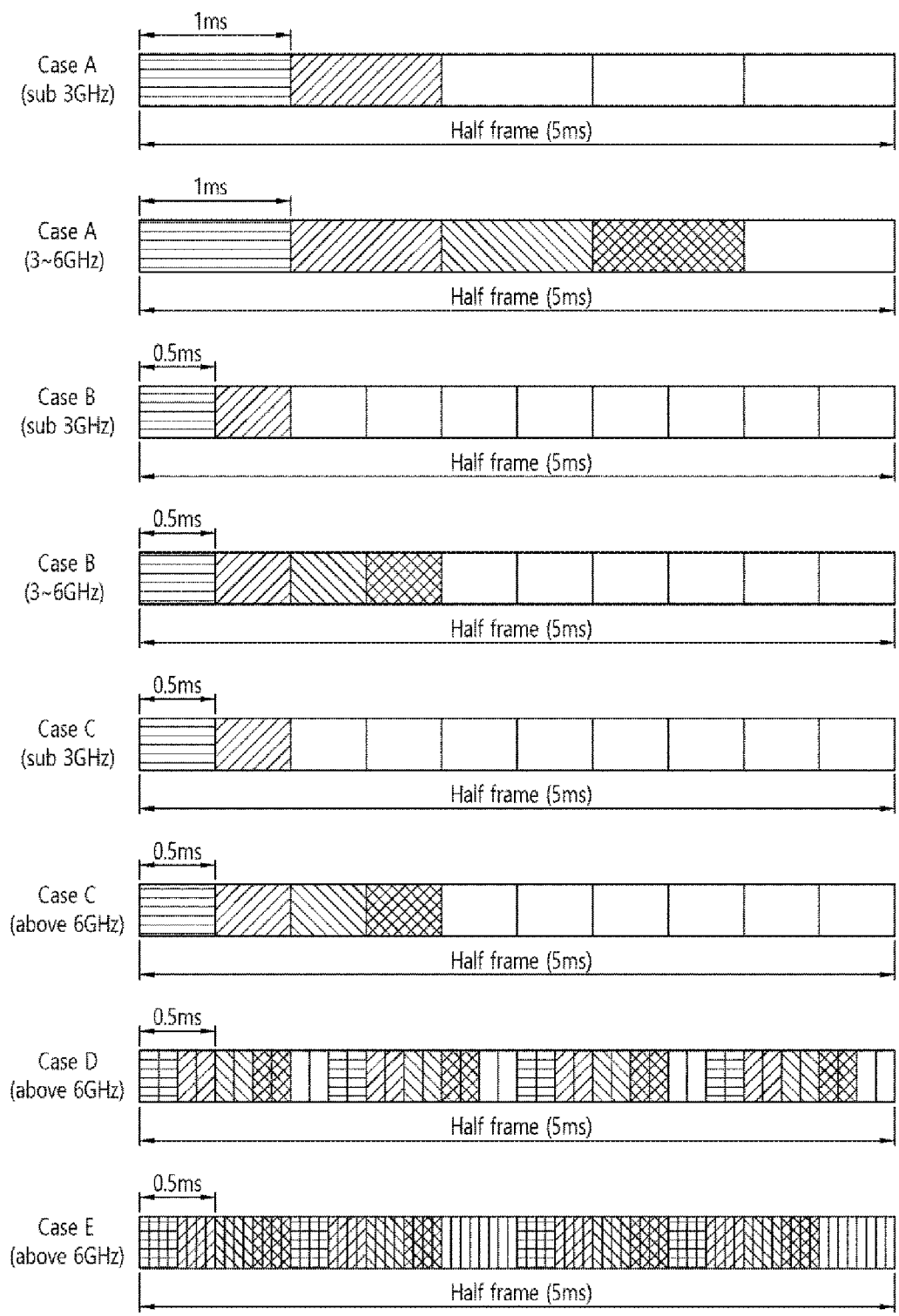

FIGS. 4a and 4b illustrate an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4a, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4a and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID NcellID=3N(1)ID+N(2)ID can be uniquely defined by the index N(1)ID ranging from 0 to 335 indicating a physical-layer cell-identifier group and the index N(2)ID ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence dPSS(n) of the PSS is as follows.

$$d_{PSS}(n) = 1 - 2x(m)$$

$$m = (n + 43N_{ID}^{(2)}) \bmod 127$$

$$0 \le n < 127$$

Here, $x(i + 7) = (x(i + 4) + x(i)) \bmod 2$ and is given as, $$[x(6)\ x(5)\ x(4)\ x(3)\ x(2)\ x(1)\ x(0)] = [1\ 1\ 1\ 0\ 1\ 1\ 0]$$

Further, the sequence dSSS(n) of the SSS is as follows.

$$d_{SSS}(n) = [1 - 2x_0((n + m_0) \bmod 127)][1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

-continued $$x_0(i+7) = (x_0(i+4) + x_0(i)) \bmod 2$$

Here, $x_1(i+7) = (x_1(i+1) + x_1(l)) \bmod 2$ and is given as, $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

A radio frame with a 10 ms length may be divided into two half frames with a 5 ms length. Referring to FIG. 4b, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ($\{2, 8\}+14*n$)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is $\{4, 8, 16, 20\}+28*n$. In this case, n=0 at a carrier frequency of 3 GHz or less. In addition, it may be n=0, 1 at carrier frequencies above 3 GHZ and below 6 GHz. In the case C, the subcarrier spacing is 30 kHz and the starting time point of the SS/PBCH block is the ($\{2, 8\}+14*n$)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ($\{4, 8, 16, 20\}+28*n$)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ($\{8, 12, 16, 20, 32, 36, 40, 44\}+56*n$)-th symbol. In this case, at a carrier frequency of 6 GHz or more, n=0, 1, 2, 3, 5, 6, 7, 8.

Figure 5A:
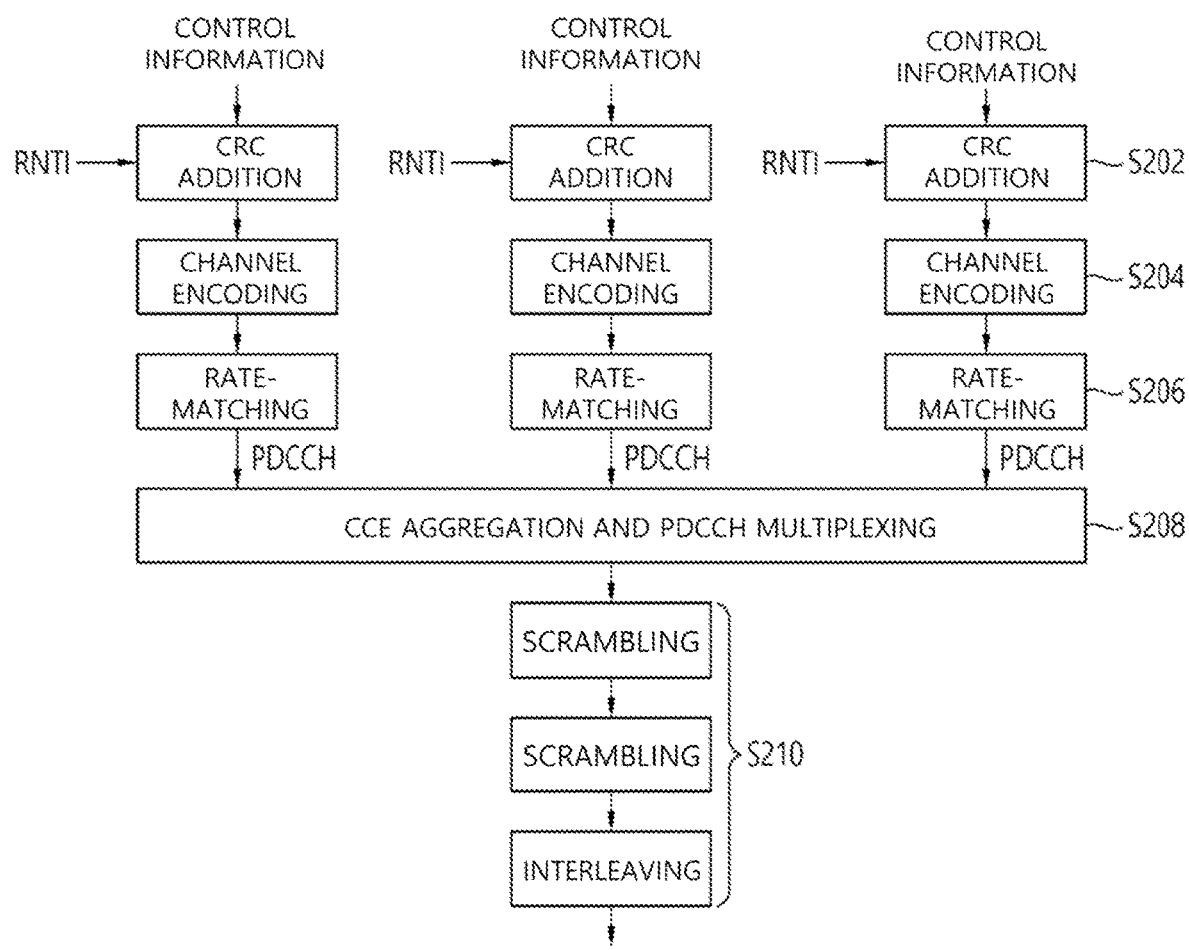
FIG. 5A and FIG. 5B illustrate a procedure for transmitting control information and a control channel in a 3GPP NR system.
Figure 5B:
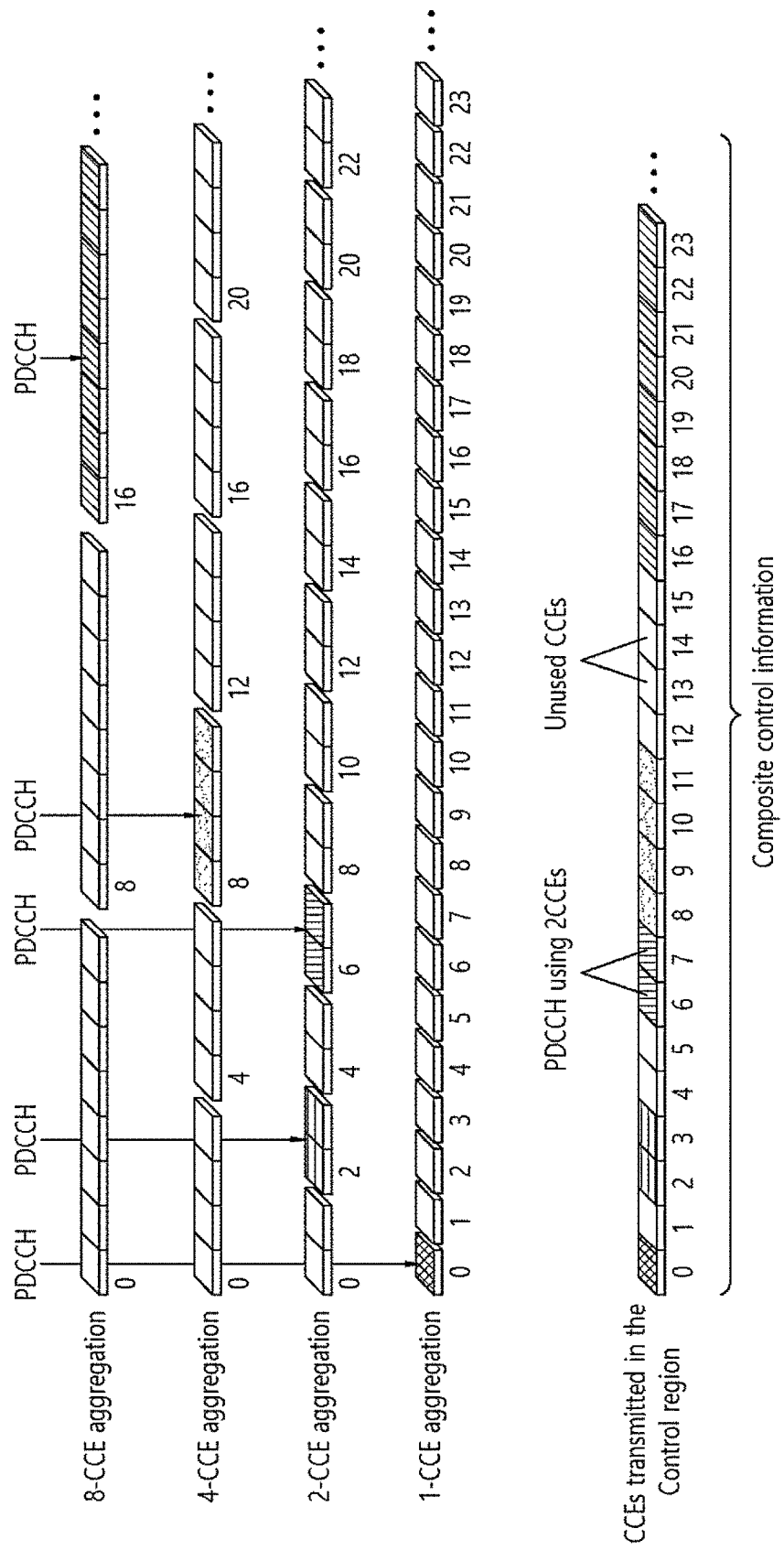

FIGS. 5a and 5b illustrate a procedure for transmitting control information and a control channel in a 3GPP NR system. Referring to FIG. 5a, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5b is a diagram related to a CCE aggregation level and the multiplexing of a PDCCH and illustrates the type of a CCE aggregation level used for one PDCCH and CCE(s) transmitted in the control area according thereto.

Figure 6:
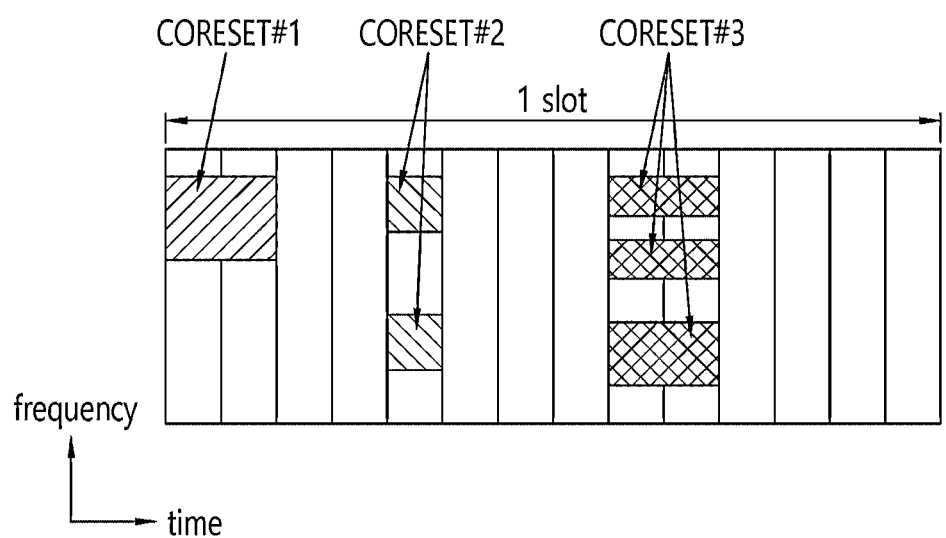
FIG. 6 illustrates a control resource set (CORESET) in which a physical downlink control channel (PDCCH) may be transmitted in a 3GPP NR system.

FIG. 6 illustrates a control resource set (CORESET) in which a physical downlink control channel (PDCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 6, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
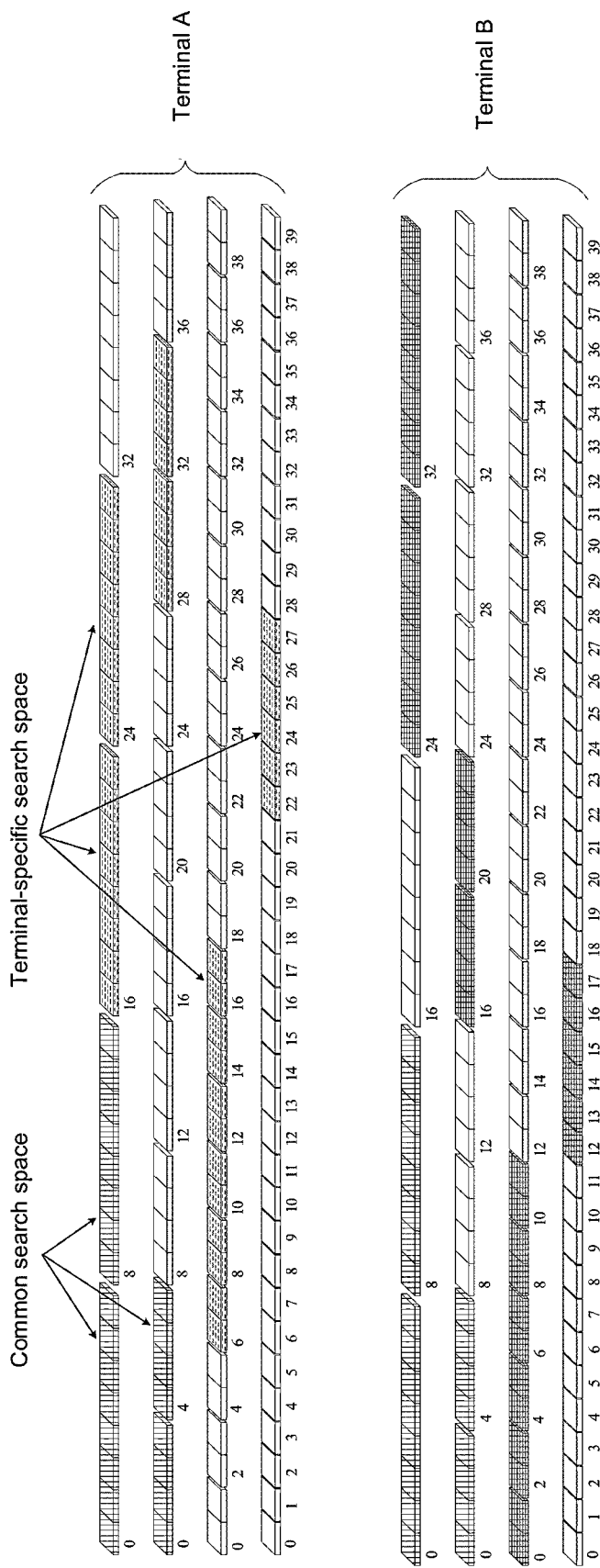
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of an uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value mcs according to the Mbit bit UCI (Mbit=1 or 2). In addition, a sequence in which a base sequence of length 12 is cyclically shifted based on a predetermined CS value mcs may be mapped to 1 OFDM symbol and 12 REs of 1 RB and transmitted. When the number of cyclic shifts available to the UE is 12 and Mbit=1, 1 bit UCI 0 and 1 may be mapped to two cyclic shifted sequences having a difference of 6 cyclic shift values, respectively. In addition, when Mbit=2, 2 bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is Mbit=1, may be BPSK-modulated. The UE may modulate UCI, which is Mbit=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d(Msymbol−1). Here, Msymbol may be Mbit/2. Through this, the UE may obtain a frequency diversity gain. More specifically, Mbit bit UCI (Mbit>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates Mbit bits UCI (Mbit>2) with π/2-Binary Phase Shift Keying (BPSK) or QPSK to generate a complex valued symbol d(0) to d(Msymb−1). Here, when using π/2-BPSK, Msymb=Mbit, and when using QPSK, Msymb=Mbit/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP in the DCI scheduling the PDSCH to change the DL BWP of the UE. In the case of an uplink carrier (or cell) operating in FDD, the base station may include a BPI indicating the activated BWP in the DCI scheduling the PUSCH to change the UL BWP of the UE.

Figure 8:
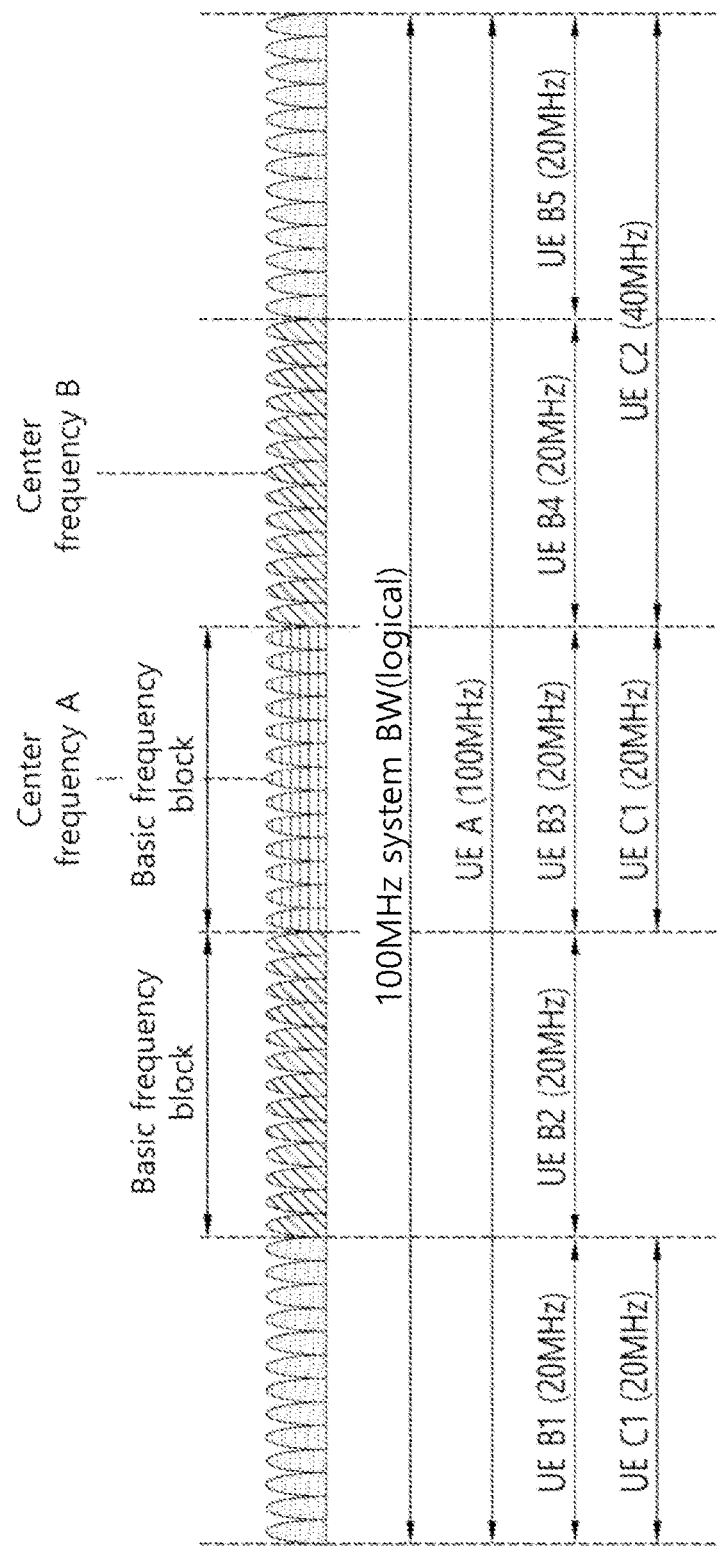
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs B1~B5 can use only a 20 MHZ bandwidth and perform communication using one component carrier. UEs C1 and C2 may use a 40 MHz bandwidth and perform communication using two component carriers, respectively. The two component carriers may be logically/physically adjacent or non-adjacent. UE C1 represents the case of using two non-adjacent component carriers, and UE C2 represents the case of using two adjacent component carriers.

FIG. 9 is a drawing for explaining signal carrier communication and multiple carrier communication. Particularly, FIG. 9(*a*) shows a single carrier subframe structure and FIG. 9(*b*) shows a multi-carrier subframe structure.

Referring to FIG. 9(*a*), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(*b*), three 20 MHz component carriers (CCs) can be aggregated into each of UL and DL, so that a bandwidth of 60 MHz can be supported.

Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
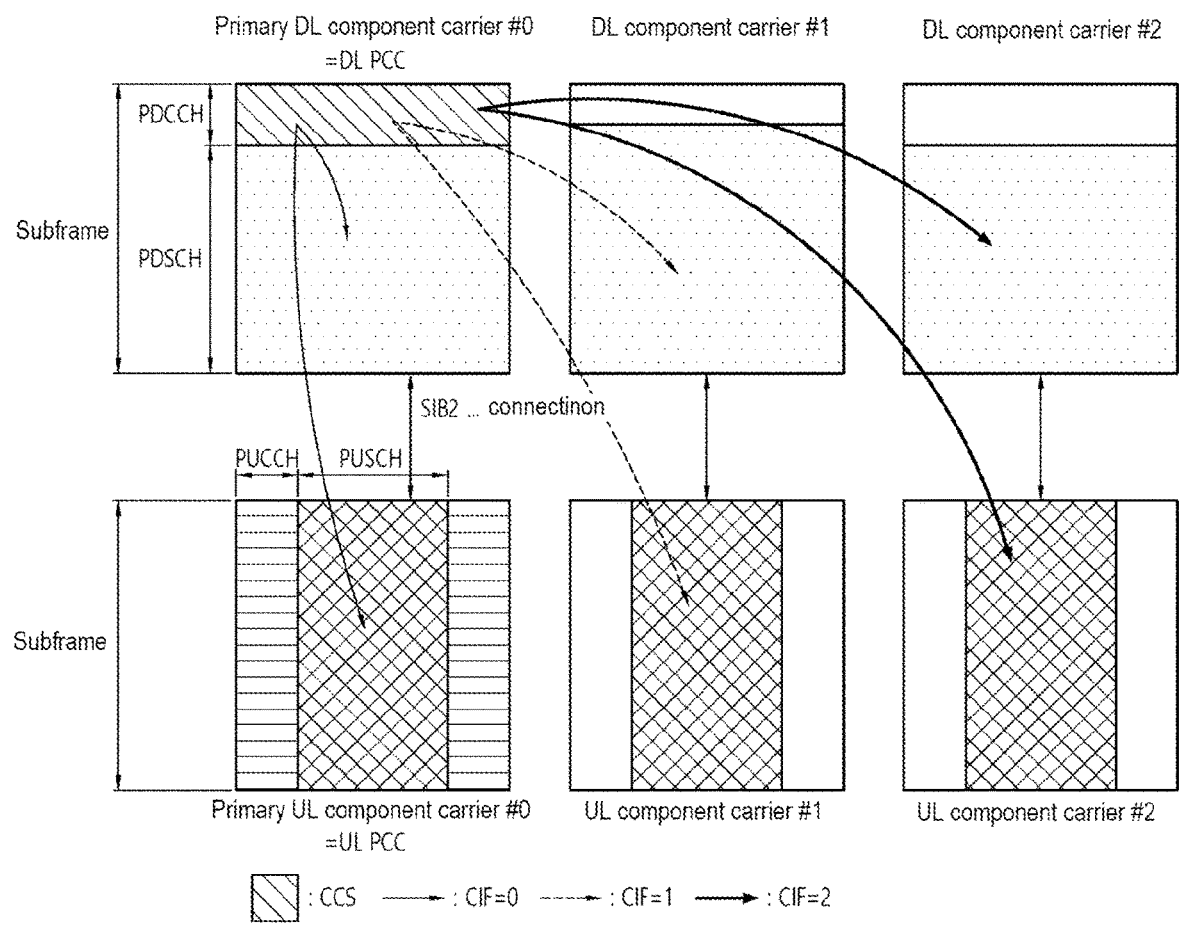
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC.

Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
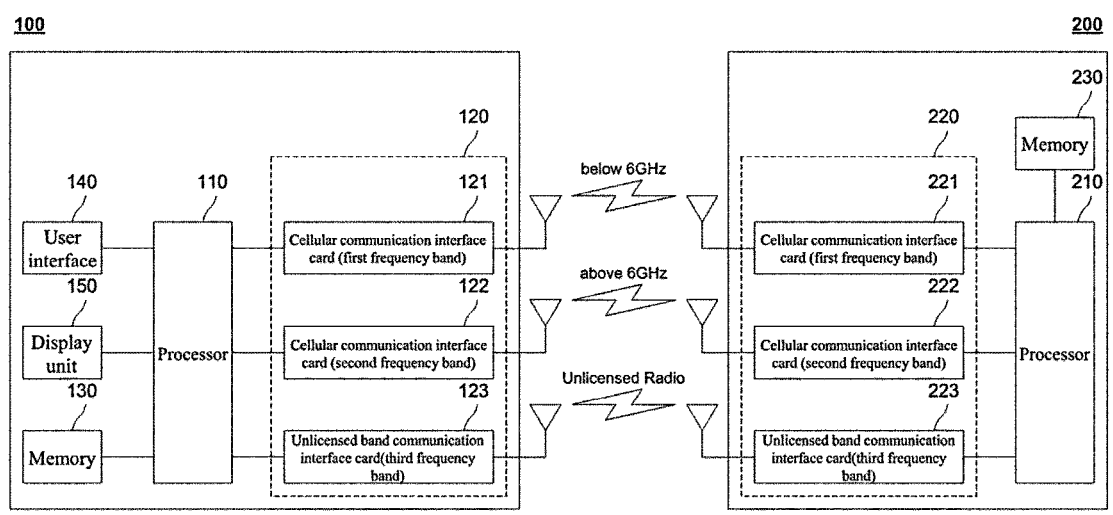
FIG. 11 is a block diagram showing the configurations of a UE and a base station according to an embodiment of the present disclosure.

FIG. 11 is a block diagram showing the configurations of a UE and a base station according to an embodiment of the present disclosure.

In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self-diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHZ. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHZ. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHZ, 6 GHZ, 7 GHZ, or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHZ. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHZ, 5 GHZ, 6 GHZ, 7 GHZ, or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

FIG. 12 illustrates a method of scheduling a physical uplink shared channel in a time domain according to an embodiment of the present disclosure.

A terminal may transmit uplink data to a base station through a PUSCH. The base station may schedule (PUSCH scheduling), for the terminal, to transmit uplink data through the PUSCH. i) In a dynamic grant (DG) method, the base station may perform PUSCH scheduling via DCI included in a PDCCH. Alternatively, ii) in a configured grant (CG) method, the terminal may transmit uplink data to the base station through a PUSCH according to a resource and a transmission method preconfigured for the terminal by the base station.

In this case, DCI included in a PDCCH may include PUSCH scheduling information. For example, the DCI may include time domain information (time-domain resource assignment (TDRA)) and frequency domain information (frequency-domain resource assignment (FDRA)). The terminal may receive DCI transmitted in a control resource set and a search space, and may perform operations (e.g., uplink data transmission through the PUSCH) indicated via the DCI. In this case, a DCI format for PUSCH scheduling may be DCI formats 0_0, 0_1, and 0_2. DCI of DCI formats 0_0, 0_1, and 0_2 may include a TDRA field including time domain information of the PUSCH. In this case, the time domain information may include K2, which is an offset value between a slot in which the PDCCH is transmitted from the base station and a slot in which the terminal transmits the PUSCH. In addition, the DCI may include a start and length indication value (SLIV) which is a joint-coded value of a starting symbol index (S) of the PUSCH and a symbol length (L, number) of the PUSCH in a slot indicated by K2. If the terminal receives the DCI in slot n, a slot in which the PUSCH is scheduled may a be floor $(n*2\mu PUSCH/n*2\mu PDCCH)+K2$ slot. μPUSCH and μPDCCH may refer to a subcarrier spacing (SCS) of a cell in which the PUSCH is scheduled and a cell in which the terminal receives the PDCCH, respectively. floor(x) is a function that returns a largest integer among integers equal to or smaller than x. In the present specification, slot n may refer to a slot indexed with index n.

Referring to FIG. 12(a), a subcarrier spacing of a cell in which the terminal receives a PDCCH and a cell in which a PUSCH is scheduled may be the same. In this case, if the terminal receives the PDCCH in slot n and is indicated that K2 is 4, a slot in which the PUSCH is scheduled may be slot n+K2, that is, slot n+4.

As for a PUSCH scheduling type, there may be two mapping types of PUSCH mapping type A and PUSCH mapping type B. Depending on a PUSCH mapping type, the range of possible values for a starting symbol index and an SLIV of the PUSCH may vary. In PUSCH mapping type A, only resource allocation including a DMRS symbol is possible, and the DMRS symbol may be located in a third or fourth symbol of a slot according to a value indicated by a higher layer. That is, in the case of PUSCH mapping type A, an index (S) of a starting symbol of the PUSCH may be 0, and a length (L) of the PUSCH may have one of values from 4 to 14 (12 for an extended CP) according to a DMRS symbol position. In PUSCH mapping type B, a first symbol of the PUSCH may be a DMRS symbol. Accordingly, S may have a value from 0 to 13 (11 for an extended CP), and L may have one of values from 1 to 14 (12 for an extended CP). In addition, since one PUSCH cannot cross a slot boundary, the sum of S and L should be smaller than or equal to 14 (12 for an extended CP).

Referring to FIG. 12(b), the base station may schedule PUSCH mapping type A in which a third symbol is a DMRS symbol, an index (S) of a starting symbol is 0, and a length (L) is 7, may schedule PUSCH mapping type A in which a fourth symbol is a DMRS symbol, an index (S) of a starting symbol is 0, and a length (L) is 7, and may schedule PUSCH mapping type B in which a first symbol is a DMRS symbol, an index (S) of a starting symbol is 5, and a length (L) is 5. In this case, frequency domain information of the PUSCH indicated in the FDRA field of DCI format 0_0, 0_1, or 0_2 may be divided into two types according to frequency resource allocation types.

FIG. 13 illustrates a method of scheduling a physical uplink shared channel in a frequency domain according to an embodiment of the present disclosure.

Hereinafter, a frequency resource allocation type will be described with reference to FIG. 13.

i) Frequency resource allocation type 0 which is a first type may be a type in which an RBG is configured by bundling a certain number of PRBs according to the number of RBs included in a BWP configured (set) for a terminal, and whether to use the RBG is indicated via a bitmap in units of RBGs. That is, the terminal may determine whether to use a corresponding RBG via a bitmap transmitted from a base station. The number of PRBs included in one RBG may be set (configured) from a higher layer, and as the larger the number of RBs included in a BWP are set (configured) for the terminal, the more PRBs may be set (configured). Referring to FIG. 13(a), a BWP size set (configured) for the terminal may be 72 PRBs, and one RBG may include 4 PRBs. In this case, the terminal may determine four PRBs as one RBG in ascending order from PRB 0, and each RBG may be indexed from 0. That is, an RBG including PRBs 0 to PRB 3 may be indexed as RBG 0, and an RBG including PRBs 4 through PRB 7 may be indexed as RBG 1. Up to RBG 17 may be indexed in the same manner, wherein the base station may transmit 1 bit (0 or 1) per RBG, i.e., a total of 18 bits, to the terminal, and the terminal may determine, based on the received 18 bits, whether to use PRBs constituting a corresponding RBG. In this case, if a bit value is 0, the terminal may determine that a PUSCH is not scheduled for any PRB among the PRBs constituting the corresponding RBG. If the bit value is 1, the terminal may determine that a PUSCH is scheduled for all PRBs in the corresponding RBG. In this case, the bit value may be applied in reverse.

ii) Frequency resource allocation type 1 which is a second type may be a type indicating information on consecutive PRBs allocated according to a size of an active BWP or an initial BWP of the terminal. The information on consecutive PRBs may be a resource indication value (RIV) value in which a start index (S) and a length (L) of the consecutive PRBs are jointly coded. Referring to FIG. 13(b), when a BWP size is 50 PRBs, and a PUSCH is scheduled for the terminal from PRB 2 to PRB 11 among the 50 PRBs, a start index of consecutive PRBs may be 2 and a length may be 10. That is, the terminal may determine the start index and the length of consecutive PRBs in which the PUSCH is scheduled, based on an RIV value received from the base station. Specifically, the RIV may be calculated by NsizeBWP*(L−1)+S. NsizeBWP may be the size of BWP configured for the terminal. For example, if the RIV value received by the terminal is 452, calculation of 452 is based on 452=50*(10−1)+2, and therefore the terminal may determine that the start index of consecutive PRBs in which the PUSCH is scheduled is 2 and the length is 10.

Via DCI of DCI format 0_1 or 0_2 for scheduling of the PUSCH, the terminal may be configured, from a higher layer, to use only one of the aforementioned two frequency resource allocation types or dynamically use both the two types. If the terminal is configured to dynamically use the two types, the terminal may determine a type to be used, via 1 bit of a most significant bit (MSB) of an FDRA field of the DCI.

There may be an uplink shared channel transmission method based on a configured grant for URLLC transmission, etc. The uplink shared channel transmission method based on a configured grant may be described as grant-free transmission. The uplink shared channel transmission method based on a configured grant may be a method in which, if the base station configures, for the terminal, available resources for uplink transmission via a higher layer (i.e., RRC signaling), the terminal may transmit an uplink shared channel by using the configured resources. The uplink shared channel transmission method based on a configured grant may be classified into two types depending on whether DCI indicates activation and release. i) Type 1 of the uplink shared channel transmission method based on a configured grant may be a method of configuring a transmission method and resources in advance via a higher layer. ii) Type 2 of the uplink shared channel transmission method based on a configured grant may be a method of configuring configured grant-based transmission via a higher layer, and configuring, via DCI, a method and resources for actual transmission.

The uplink transmission method based on a configured grant may support URLLC transmission. Accordingly, uplink transmission may be repeatedly performed on multiple slots to ensure high reliability. In this case, a redundancy version (RV) sequence may be one of {0, 0, 0, 0}, {0, 2, 3, 1}, and {0, 3, 0, 3}, and an RV corresponding to a (mod(n−1, 4)+1)th value may be used in an nth repeated transmission. That is, an RV corresponding to a value obtained by adding 1 to a remainder of dividing n−1 by 4 may be used. In addition, the terminal configured to repeatedly transmit an uplink channel may start repeated transmission only in a slot having an RV value of 0. However, if an RV sequence is {0, 0, 0, 0} and an uplink channel is configured to be repeatedly transmitted in 8 slots, the terminal may not start repeated transmission in an 8th slot. The terminal may terminate repeated transmission when a UL grant having the same HARQ process ID is received or when the number of repeated transmissions configured via a higher layer is reached or a periodicity is exceeded. The UL grant may refer to DCI for PUSCH scheduling.

As described above, in order to improve PUSCH transmission/reception reliability between a base station and a terminal in a wireless communication system, the base station may configure for the terminal to repeatedly transmit a PUSCH.

FIG. 14 illustrates repeated transmission of a physical uplink shared channel according to an embodiment of the present disclosure.

Repeated PUSCH transmission performed by a terminal may be of two types. i) First, repeated PUSCH transmission type A will be described. When a terminal receives DCI of DCI format 0_1 or 0_2 included in a PDCCH for PUSCH scheduling from a base station, the terminal may repeatedly transmit a PUSCH on K consecutive slots. A K value may be configured from a higher layer or may be a value included in a TDRA field of the DCI so as to be configured for the terminal. For example, referring to FIG. 14A, the terminal may receive the PDCCH for PUSCH scheduling in slot n, and a K2 value may be configured from DCI included in the received PDCCH. In this case, if the K2 value is 2 and the K value is 4, the terminal may start repeated PUSCH transmission in slot n+K2, and may repeatedly transmit a PUSCH until slot n+K2+K−1. That is, the terminal starts repeated PUSCH transmission in slot n+2 and repeatedly transmits a PUSCH until slot n+5. In this case, time and frequency domain resources in which the PUSCH is transmitted in each slot may be the same as those indicated in the DCI. That is, the PUSCH may be transmitted in the same symbol and PRB(s) within a slot. ii) Next, repeated PUSCH transmission type B will be described. Repeated PUSCH transmission type B may be a type used for the terminal to perform low-latency repeated PUSCH transmission in order to satisfy URLLC requirements, etc. The terminal may be configured with a symbol (S) in which repeated PUSCH transmission starts and a length (L) of the repeated PUSCH transmission, via the TDRA field of the DCI transmitted by the base station. In this case, the starting symbol (S) and the length (L) may be for a temporarily obtained nominal PUSCH rather than an actual PUSCH actually transmitted by the terminal. A separate symbol may not exist between nominal PUSCHs configured to be repeatedly transmitted. That is, nominal PUSCHs may be consecutive in the time domain. The terminal may determine an actual PUSCH from the nominal PUSCHs. One nominal PUSCH may be determined to be one or multiple actual PUSCHs. The base station may configure, for the terminal, symbols unavailable for repeated PUSCH transmission type B. Symbols unavailable for repeated PUSCH transmission type B may be described as invalid symbols. The terminal may exclude invalid symbols from among resources configured to transmit nominal PUSCHs. As described above, nominal PUSCHs are configured to be repeatedly transmitted on consecutive symbols, but if invalid symbols are excluded, resources for nominal PUSCH transmission become inconsecutive. An actual PUSCH may be configured to be transmitted on consecutive symbols configured for one nominal PUSCH transmission except for invalid symbols. In this case, if consecutive symbols cross a slot boundary, an actual PUSCH actually transmitted based on the slot boundary may be divided. Invalid symbols may include downlink symbols configured for the terminal by the base station. Referring to FIG. 14B, the terminal may be scheduled with PUSCH transmission having a length of 5 symbols starting from a 12th symbol of a first slot (slot n), and may be configured with 4 times of type B repeated transmission. In this case, resources scheduled for a first nominal PUSCH (nominal #1) may include symbol (n,11), symbol (n,12), symbol (n,13), symbol (n+1,0), and symbol (n+1,1). Resources scheduled for a second nominal PUSCH (nominal #2) may include symbol (n+1,2), symbol (n+1,3), symbol (n+1,4), symbol (n+1,5), and symbol (n+1,6). Resources scheduled for a third nominal PUSCH (nominal #3) may include symbol (n+1,7), symbol (n+1,8), symbol (n+1,9), symbol (n+1,10), and symbol (n+1,11). Resources scheduled for a fourth nominal PUSCH (nominal #4) may include symbol (n+1, 12), symbol (n+1,13), symbol (n+2,0), symbol (n+2,1), and symbol (n+2,2). In this case, symbol (n,k) represents symbol k of slot n. That is, k may be a value starting from 0 to 13 for a normal CP, and may be a value from 0 to 11 for an extended CP. Invalid symbols may be configured to be symbols 6 and 7 of slot n+1. In this case, in order to determine an actual PUSCH, a last symbol of the second nominal PUSCH (nominal #2) may be excluded, and a first symbol of the third nominal PUSCH (nominal #3) may be excluded. The first nominal PUSCH (nominal #1) may be divided into two actually transmitted actual PUSCHs (actual #1 and actual #2) by a slot boundary. Each of the second nominal PUSCH (nominal #2) and the third nominal PUSCH (nominal #3) may be distinguished into one actual PUSCH (actual #3 and actual #4) by combining consecutive symbols except for an invalid symbol. Finally, the fourth nominal PUSCH (nominal #4) is divided into two actually transmitted (actual) PUSCHs (actual #5 and actual #6) by a slot boundary. The terminal finally transmits actually transmitted (actual) PUSCHs. One actual PUSCH should include at least one DMRS symbol. Accordingly, when repeated PUSCH transmission type B is configure, if a total length of the actual PUSCH is one symbol, the actual PUSCH may be omitted without being transmitted. This is because the actual PUSCH with one symbol may not include information other than a DMRS.

In order to obtain diversity gain in the frequency domain, frequency hopping may be configured for uplink channel transmission.

For repeated PUSCH transmission type A, one of intra-slot frequency hopping, in which frequency hopping is performed within a slot, and inter-slot frequency hopping, in which frequency hopping is performed in each slot, may be configured for the terminal. If intra-slot frequency hopping is configured for the terminal, the terminal may divide the PUSCH in half in the time domain in a slot for transmitting the PUSCH and transmit one half of the PUSCH in a scheduled PRB, and may transmit the other half in a PRB obtained by adding an offset value to the scheduled PRB. In this case, two or four offset values may be configured according to an active BWP size via a higher layer, and one of the values may be configured for (indicated to) the terminal via DCI. If inter-slot frequency hopping is configured for the terminal, the terminal may transmit the PUSCH in a scheduled PRB in a slot having an even-numbered slot index, and may transmit the PUSCH in a PRB obtained by adding an offset value to the scheduled PRB in an odd-numbered slot.

For repeated PUSCH transmission type B, one of inter-repetition frequency hopping, in which frequency hopping is performed at a nominal PUSCH boundary, and inter-slot frequency hopping, in which frequency hopping is performed in every slot, may be configured for the terminal. If inter-repetition frequency hopping is configured for the terminal, the terminal may transmit actual PUSCH(s) corresponding to an odd-numbered nominal PUSCH on a scheduled PRB, and the terminal may transmit actual PUSCH(s) corresponding to an even-numbered nominal PUSCH on a PRB obtained by adding an offset value to the scheduled PRB. In this case, two or four offset values may be configured according to an active BWP size via a higher layer, and one of the values may be configured for (indicated to) the terminal via DCI. If inter-slot frequency hopping is configured for the terminal, the terminal may transmit the PUSCH in a scheduled PRB in a slot having an even-numbered slot index, and may transmit the PUSCH in a PRB obtained by adding an offset value to the scheduled PRB in an odd-numbered slot.

When the terminal performs repeated PUSCH transmission, if a symbol scheduled for PUSCH transmission in a specific slot overlaps with a semi-statically configured DL symbol or a symbol configured for reception of an SS/PBCH block, the terminal may not transmit an overlapping PUSCH on a slot including the overlapping symbol. In addition, the overlapping PUSCH may be delayed and may not be transmitted even on a subsequent slot.

If the terminal receives DCI of DCI format 1_0, 1_1, or 1_2 for PUCCH scheduling, the terminal needs to transmit a PUCCH to the base station. In this case, the PUCCH may include uplink control information (UCI), and UCI may include at least one of HARQ-ACK, a scheduling request (SR), and channel state information (CSI). HARQ-ACK may be HARQ-ACK indicating whether the terminal has successfully received two types of channels. A first type may be HARQ-ACK for a PDSCH when the terminal is scheduled with the PDSCH via DCI of DCI format 1_0, 1_1, or 1_2. A second type may be HARQ-ACK for DCI when the DCI of DCI format 1_0, 1_1, or 1_2 is DCI indicating release of a semi-persistently scheduled (SPS) PDSCH. For PUCCH transmission including HARQ-ACK, a "PDSCH-to-HARQ_feedback timing indicator" field of DCI may indicate K1 which is information (value) for a slot in which the scheduled PUCCH is transmitted. Here, K1 may be a non-negative integer value. DCI of DCI format 1_0 may indicate one of {0, 1, 2, 3, 4, 5, 6, 7} as a K1 value. The K1 value that can be indicated in DCI of DCI format 1_1 or 1_2 may be set (configured) from a higher layer.

A method of determining a slot in which a PUCCH including a first type HARQ-ACK is transmitted will be described. An uplink slot overlapping with a last symbol in which a PDSCH corresponding to HARQ-ACK is transmitted may exist. In this case, if an index of the overlapping uplink slot is m, the terminal may transmit a PUCCH including HARQ-ACK on slot m+K1. The index of the uplink slot may be a value determined based on a subcarrier spacing of a BWP in which the PUCCH is transmitted. If the terminal is configured with downlink slot aggregation, a last symbol in which a PDSCH is transmitted may refer to a last scheduled symbol within a last slot among slots in which the PDSCH is transmitted.

Figure 15:
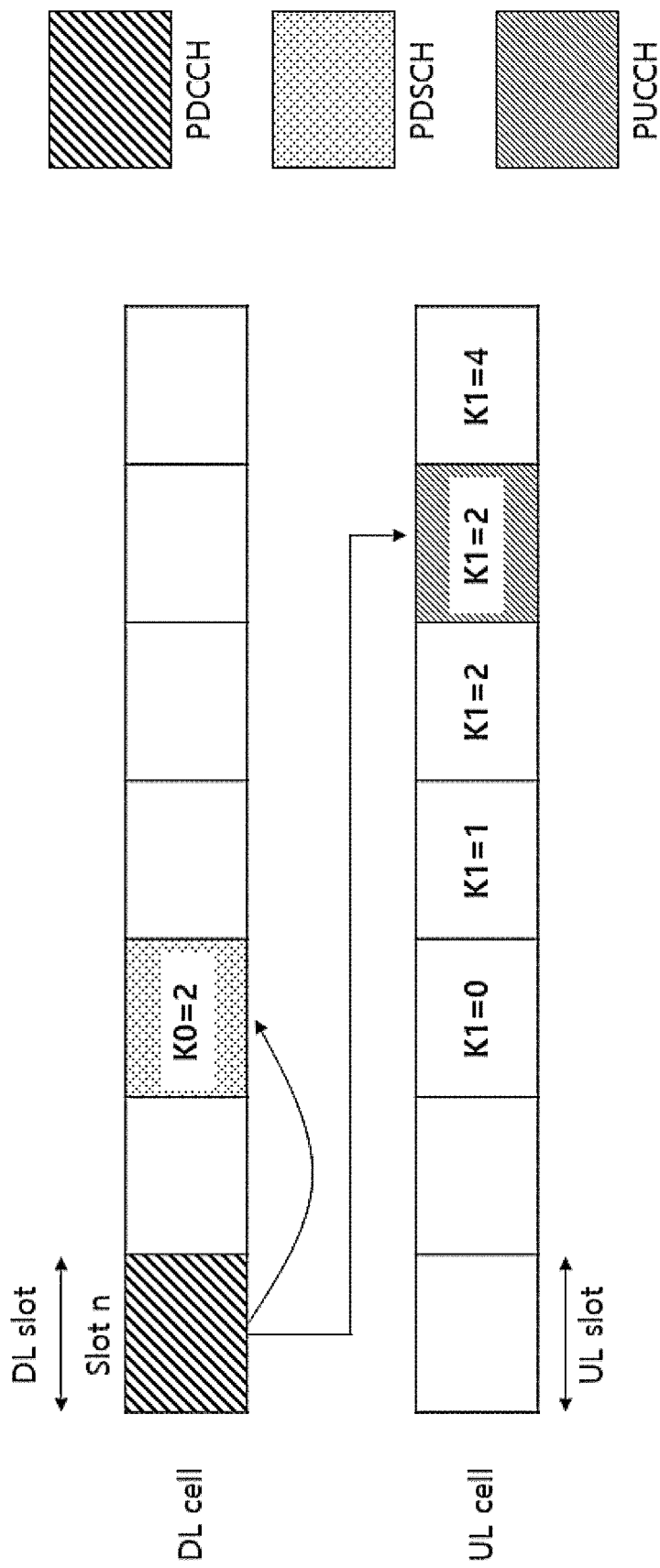
FIG. 15 illustrates a method of scheduling a PUSCH.

FIG. 15 illustrates a method of scheduling a physical uplink control channel according to an embodiment of the present disclosure.

Referring to FIG. 15, a subcarrier spacing of a DL BWP in which a PDCCH is received, a subcarrier spacing of a DL BWP scheduled for a PDSCH, and a subcarrier spacing of a UL BWP in which a PUCCH is transmitted may be the same. A terminal may receive a PDCCH for scheduling of a PUCCH and a PDSCH from a base station in slot n. In this case, a K0 value and a K1 value may be configured (indicated) to be 2 and 3 respectively, by DCI included in the PDCCH received in slot. For example, if a last symbol in which the PDSCH is transmitted is symbol n+K0 (i.e., symbol n+2), the terminal may transmit HARQ-ACK for the PDSCH on slot n+2+K1 (i.e., slot n+5). In this case, HARQ-ACK for the PDSCH may be included in the PUCCH.

Figure 16:
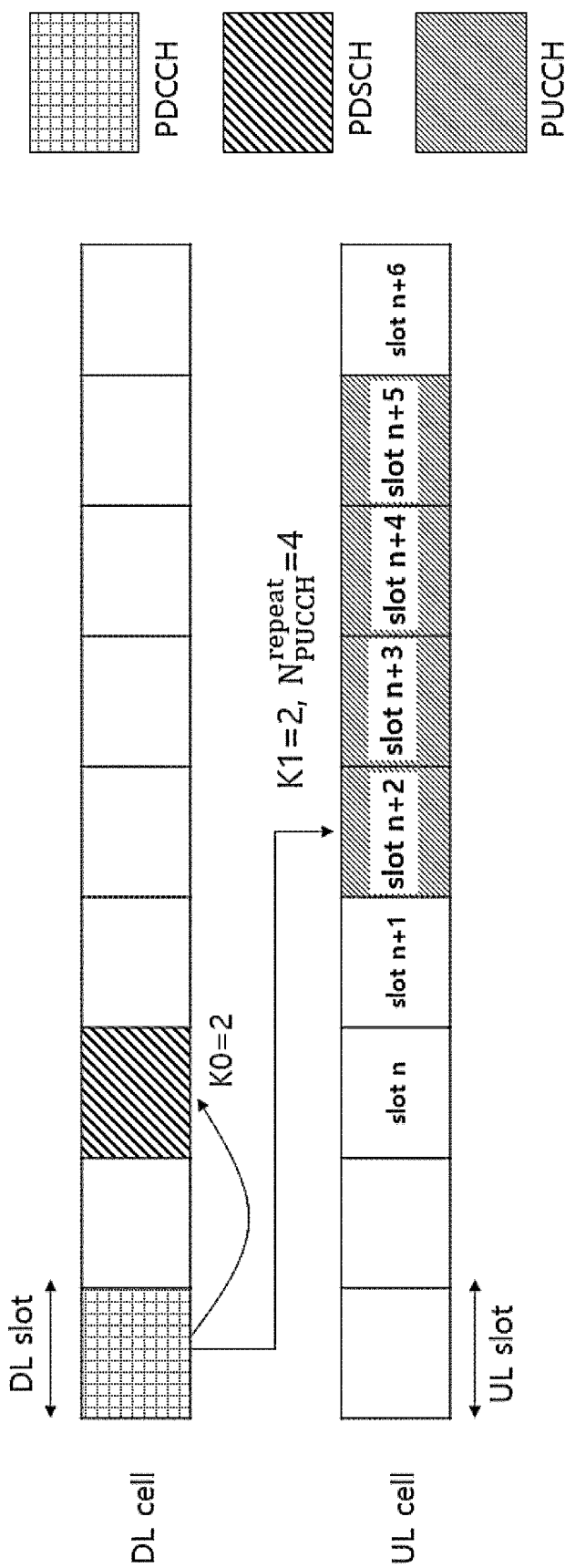
FIG. 16 illustrates repeated transmission of a PUSCH.

FIG. 16 illustrates repeated transmission of a physical uplink control channel according to an embodiment of the present disclosure.

In order to secure wide coverage in the NR system, a terminal may repeatedly transmit a long PUCCH on 2, 4, or 8 slots. In this case, a format of the long PUCCH may be PUCCH format 1, 3, or 4. If the terminal repeatedly transmits the PUCCH, the same UCI may be repeatedly transmitted in every slot. Referring to FIG. 16, when PDSCH reception is terminated in slot n, and a K1 value is 2, the terminal may transmit the PUCCH on slot n+K1 (i.e., slot n+2). When a base station configures the number of repeated PUCCH transmission to be 4 (NrepeatPUCCH=4), the terminal may repeatedly transmit the PUCCH from slot n+2 to slot n+5. In this case, symbol configurations of repeatedly transmitted PUCCHs may be the same. That is, repetitively transmitted PUCCHs may start from the same symbol in each slot and may include the same number of symbols.

Even for PUCCH transmission, frequency hopping may be applied to obtain diversity gain in the frequency domain. If intra-slot frequency hopping is applied, the terminal may divide the time domain of a slot for transmitting the PUCCH in half and transmit a half of the PUCCH on a first PRB and may transmit the other half of the PUCCH on a second PRB. The first PRB and the second PRB may be configured via a higher layer for configuration of PUCCH resources. If inter-slot frequency hopping is applied, the terminal may transmit the PUCCH on a first PRB of a slot having an even-numbered slot index and may transmit the PUCCH on a second PRB of a slot having an odd-numbered slot index. In addition, when the terminal performs repeated PUCCH transmission, if a symbol of a specific slot scheduled for PUCCH transmission overlaps with a semi-statically configured DL symbol or a symbol configured for reception of an SS/PBCH block, the terminal may not transmit the PUCCH on a slot including the overlapping symbol. The terminal may delay transmission of an untransmitted PUCCH so as to transmit the same on a subsequent slot. In this case, if a symbol of a slot for delayed PUCCH transmission does not overlap with a semi-statically configured DL symbol or a symbol configured for reception of an SS/PBCH block, the terminal may transmit the PUCCH.

Embodiment: Resolution to Coverage Problem of Uplink Channel

For convenience of description, a problem related to uplink channel (e.g., PUSCH or PUCCH) repetition transmission of a UE for enhancement of coverage performance is called an uplink channel coverage problem.

Figure 17:
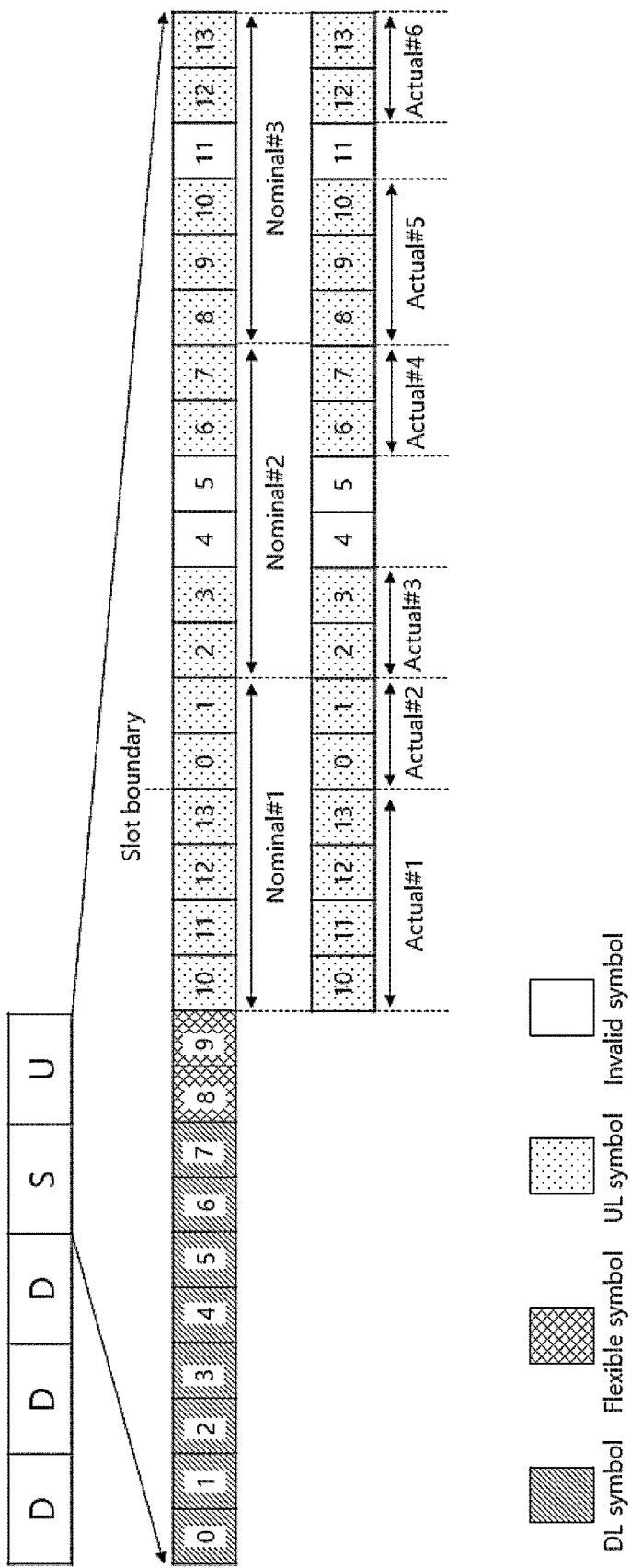
FIG. 17 illustrates a problem occurring when PUSCH repetition transmission is performed in a TDD situation.

FIG. 17 illustrates a PUSCH coverage problem. Referring to FIG. 17, a UE may receive a configuration of PUSCH repetition transmission type B for slot S and/or slot U in a TDD situation. Here, slot D is a slot having all symbols configured with downlink symbols, slot U is a slot having all symbols configured with uplink symbols, and slot s is a slot that is neither slot D nor slot U. Slot S may include at least one flexible symbol. In this case, even though a base station has indicated to that the UE that the length of a nominal PUSCH is six symbols, the length of an actual PUSCH may be two to four symbols due to a slot boundary and an invalid symbol. Each actual PUSCH may need to include at least one DMRS symbol, and if it is assumed that one DMRS symbol is mapped to one actual PUSCH, the length of data symbols through which uplink data can be transmitted in each actual PUSCH are one to three symbols due to. Compared to the existing six symbol PUSCH transmission, a higher coding rate needs to be used when a TB having the same number of bits is transmitted. Therefore, repeated transmission is configured for coverage performance enhancement, but it is difficult to acquire a coding gain due to a high coding rate. Accordingly, simply performing PUSCH repetition transmission type B may cause a coverage problem. In addition, the PUSCH needs to include at least one DMRS symbol, and thus the smaller the number of symbols constituting the actual PUSCH, DMRS overhead gets bigger. The coverage performance of an uplink channel/signal transmitted by the UE at a cell edge may be deteriorated. Accordingly, for PUSCH repetition transmission type B, a resolution method for coverage performance enhancement is required.

Figure 18:
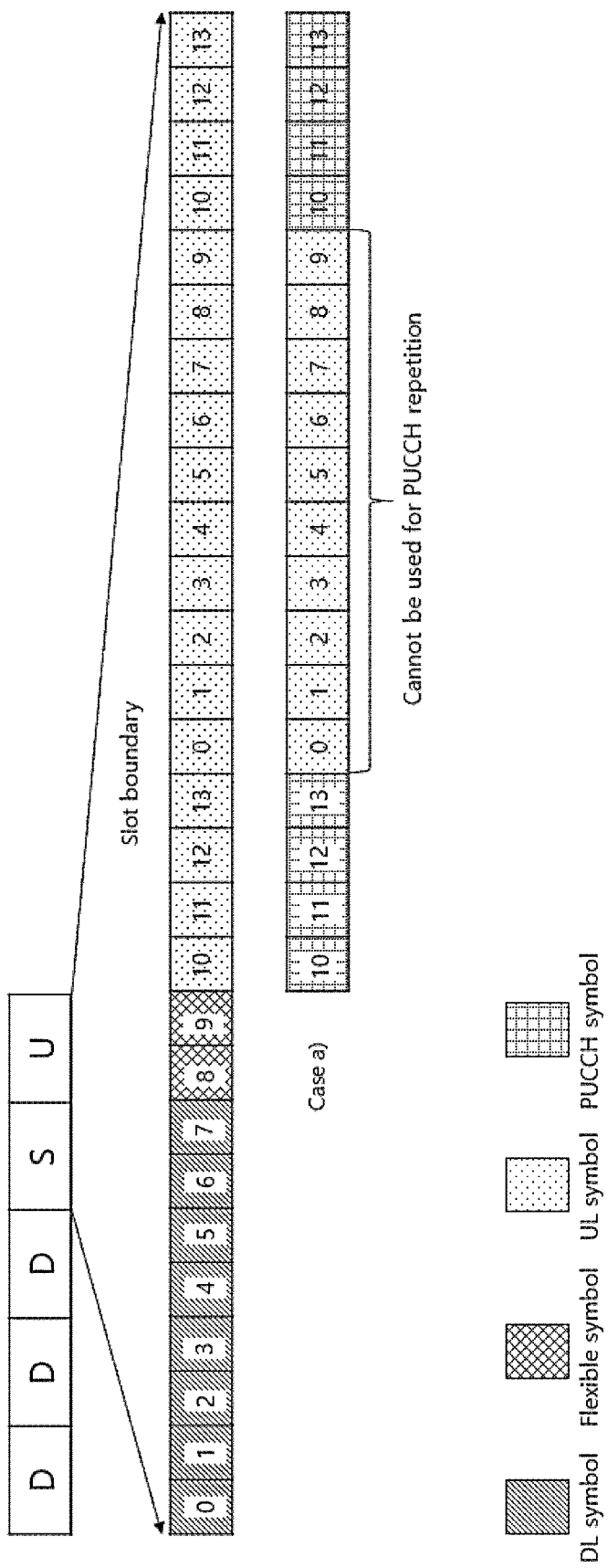
FIG. 18 illustrates a problem occurring when PUCCH repetition transmission is performed in a TDD situation.

FIG. 18 illustrates a PUCCH coverage problem. Referring to FIG. 18, the UE may receive a configuration of PUCCH repetition transmission for slot S and/or slot U in a TDD situation. In Case a, the UE may be configured to transmit a PUCCH having the length of a total of four symbols from $10^{th}$ to $13^{th}$ symbols, and may be configured to repetitively transmit a PUCCH having the same location and length over two slots. In this case, the $0^{th}$ to $9^{th}$ symbols of the second slot cannot be used for PUCCH repetition transmission. As such, if a UL symbol available for PUCCH repetition transmission is restricted, a coverage problem may occur. For more reliable PUCCH transmission, restricted UL symbol use needs to be supported.

To improve the coverage of the uplink channel, the UE may use, for joint channel estimation, a DMRS between different PUSCH repetitions or different PUCCH repetitions.

An example of PUCCH repetition reception using separate channel estimation is as follows. For example, a DMRS of first PUCCH repetition and a DMRS of second PUCCH repetition are transmitted in different symbols. That is, the DMRS of the first PUCCH repetition is transmitted in a first symbol among the symbols to which a first PUCCH is scheduled, and the DMRS of the second PUCCH repetition is transmitted in a second symbol among the symbols to which a second PUCCH is scheduled. The base station may perform channel estimation by using the DMRS received in the first symbol to decode the first PUCCH repetition. In addition, the base station may perform channel estimation by using the DMRS received in the second symbol to decode the second PUCCH repetition.

For the PUCCH repetition reception using the separate channel estimation, channel estimation is performed using DMRSs transmitted in different symbols, respectively, and each PUCCH repetition is decoded using the estimated value. The joint channel estimation for improving the problem above is as follows.

For example, the DMRS of the first PUCCH repetition and the DMRS of the second PUCCH repetition are transmitted in different symbols. That is, the DMRS of the first PUCCH repetition is transmitted in the first symbol among the symbols to which the first PUCCH is scheduled, and the DMRS of the second PUCCH repetition is transmitted in the second symbol among the symbols to which the second PUCCH is scheduled. For the joint channel estimation, the DMRSs transmitted in different PUCCH repetitions need to satisfy phase continuity. For example, the DMRSs transmitted in different PUCCH repetitions may need to satisfy at least one of (i) the same beamforming, (ii) the same quasi-co-location (QCL), and (iii) the same transmission power. If the above condition is satisfied, the base station may perform joint channel estimation by using the DMRS received in the first symbol and the DMRS received in the second symbol to decode the first PUCCH repetition and the second PUCCH repetition. In addition, the base station may receive the first PUCCH repetition and the second PUCCH repetition on the basis of the joint channel estimation value.

Hereinafter, a method for performing joint channel estimation of a PUCCH is described.

Figure 19:
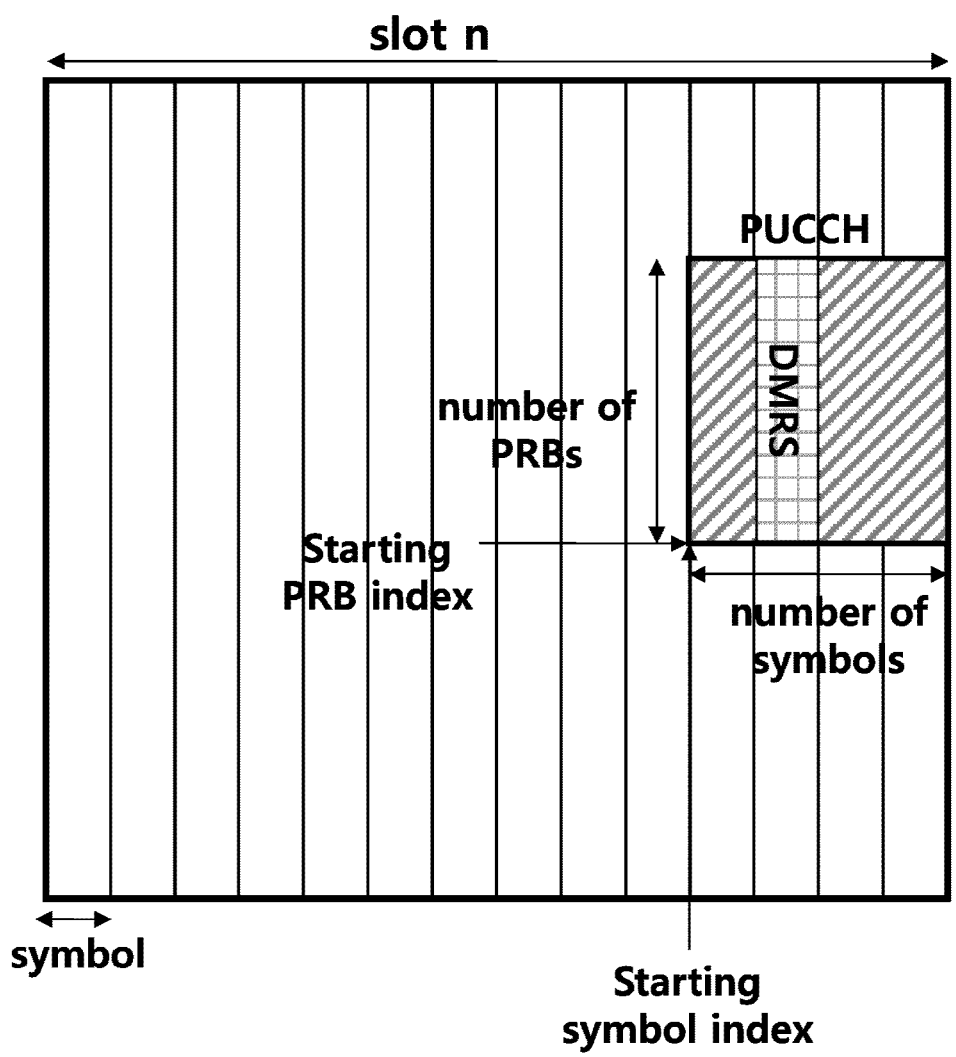
FIG. 19 illustrates a PUCCH resource configuration.

Referring to FIG. 19, when the UE receives configuration/indication information of PUCCH transmission, the configuration/indication information may at least include one piece of the following information.

Start symbol index: is an index of a symbol in which PUCCH transmission starts.

Number of symbols: is the number of symbols used for PUCCH transmission. In a case of PUCCH format 0 or 2, the number of symbols is one of 1 and 2. In a case of PUCCH format 1, 3, or 4, the number of symbols is one of 4 to 14. For convenience of description, PUCCH format 0 or 2 is called a short PUCCH, and PUCCH format 1, 3, or 4 is called a long PUCCH.

Start PRB index: is an index of a PRB in which PUCCH transmission starts.

Number of PRBs: is the number of PRBs used for a PUCCH. A PRB number of PUCCH format 0, 1, or 4 is 1. In a case of PUCCH format 2, a PRB number is one of 1 to 16. In a case of PUCCH format 3, a PRB number is one of 1, 2, 3, 4, 5, 6, 8, 9, 10, 12, 14, 15, and 16.

Max code rate: is a maximum code rate at which a PUCCH format can be transmitted. The UE cannot transmit UCI exceeding the maximum code rate to the PUCCH.

In a case of PUCCH formats 2 and 3, a PRB number may be up to 16. The UE needs to determine one among PRB numbers. A process therefor is as follows. First, the UE may determine the number of bits of UCI to be transmitted via the PUCCH. Here, the number of bits of UCI to be transmitted via the PUCCH is assumed as 0. The UCI may include a CRC. For the PUCCH, the UE may determine the number of REs for transmitting UCI for each PRB. Here, when calculating the number of REs for transmitting the UCI, the number of REs used for the DRMSs may be excluded. the number of REs for transmitting UCI is assumed as N. A modulation order used for PUCCH transmission by the UE is assumed as Q. When it is assumed that the PUCCH has M PRBs, the code rate is acquired according to $O/(M*N*Q)$. As described above, a maximum code rate for transmitting UCI by the PUCCH is determined as a max code rate. Accordingly, code rate $O/(M*N*Q)$ needs to be equal to or less than the maximum code rate. That is, $O/(M*N*Q) \leq$ max code rate needs to be satisfied. To satisfy this, the number of PRBs may be adjusted for PUCCH formats 2 and 3. That is, the UE may select the smallest PRB number satisfying $O/(M*N*Q) \leq$ max code rate among available PRB numbers (M). To prevent too small number of PRBs from being selected, a minimum value of the PRB number may be given. In this case, the UE may select a PRB number no smaller than the minimum value.

The UE may determine a PRB number (M) used for PUCCH transmission according to a UCI bit number (O), the number (N) of REs for transmitting UCI for each PRB by a PUCCH, and/or a modulation order (Q). Here, N may be given as a product of Nsc,crtl and Nsymb-UCI. Nsc,crtl is the number of REs for transmitting UCI in one symbol for each PRB. Nsymb-UCI is the number of symbols for transmitting UCI. That is, in a case of PUCCH format 2, Nsc,crtl is 8, and in a case of PUCCH format 3, Nsc,crtl is 12. In a case of PUCCH format 2, Nsymb-UCI is identical to "number of symbols". In a case of PUCCH format 3, Nsymb-UCI is equal to the number of symbols remaining after excluding a DMRS symbol from the "number of symbols".

Figure 20:
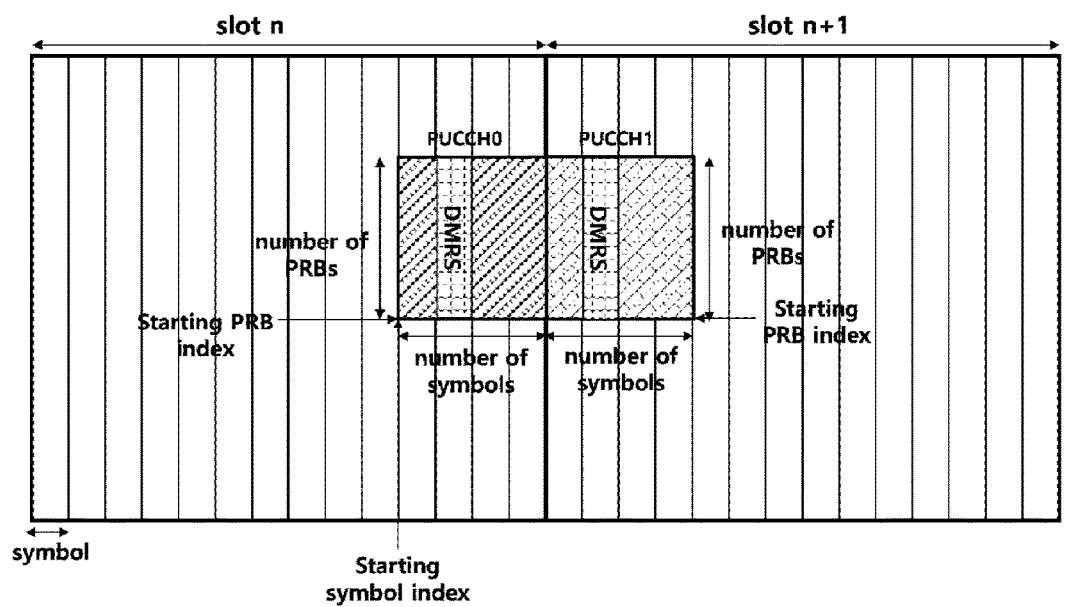
FIG. 20 illustrates a PUCCH repetition occupying the same symbol.

FIG. 20 illustrates an example of applying joint channel coding to PUCCH repetition transmission. Referring to FIG. 20, the same UCI may be repeatedly transmitted in PUCCH0 and PUCCH1 having the same symbol length. In addition, PUCCH0 and PUCCH1 may occupy the same PRB. Here, the number of PRBs may be determined in each PUCCH with reference the above-described method. Each of PUCCH0 and PUCCH1 has a symbol for transmitting a DMRS. The base station may use a DMRS (the $12^{th}$ symbol of slot n) of PUCCH0 and a DMRS (the second symbol of slot n+1) of PUCCH1 for joint channel estimation. The base station may receive UCI repeatedly transmitted in PUCCH0 and PUCCH1 by using the joint channel estimation.

FIGS. 19 and 20 illustrate the joint channel estimation for the PUCCH, but the similar/same joint channel estimation is also applied to the PUSCH. An example of applying the joint channel estimation to the PUSCH is described below in more detail. In the disclosure, the PUSCH to which the joint channel estimation is applicable may include PUSCHs below.

The PUSCH may be a PUSCH including one transport block (TB). Here, for the PUSCH, a TB size (TBS) may be determined with reference to multiple slots and the PUSCH may be transmitted. For example, referring to FIG. 21, the UE may determine one TBS for two slots, slot n and slot n+1, for PUSCH #1. In this case, DMRS symbols may be transmitted in different slots (slot n and slot n+1), but if the DMRS symbols satisfy the joint channel estimation condition over different slots, the base station may perform joint channel estimation. In a case where the TBS is determined with reference to the multiple slots, PUSCH repetition transmission may be applied.

Figure 22:
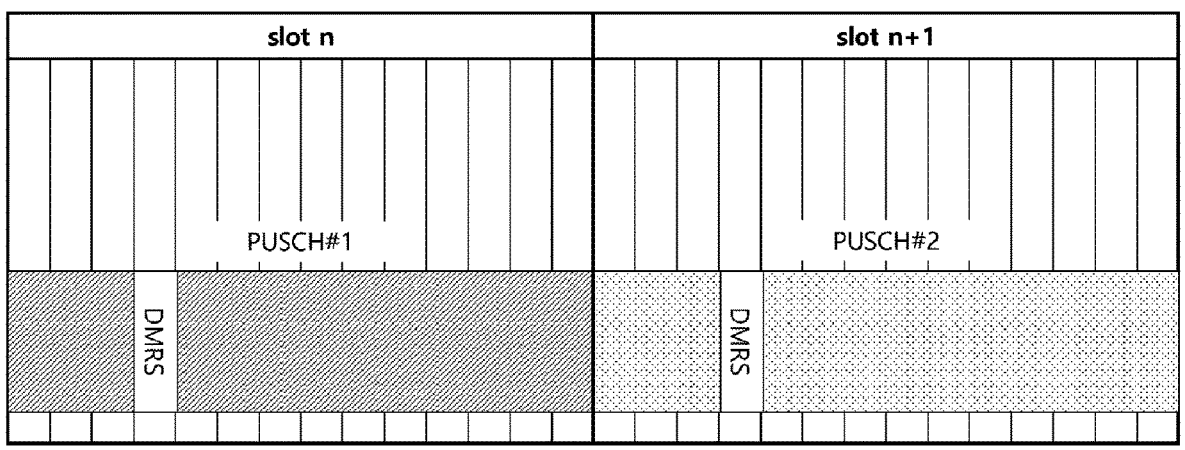
FIG. 22 illustrates scheduling of multiple physical uplink shared channels.

The PUSCH may be PUSCH repetition including one TB. Here, a TBS may be determined with reference to one slot, and the PUSCH may be repeatedly transmitted in multiple slots. For example, the UE may transmit PUSCH repletion 1 in slot n, and may transmit PUSCH repetition 2 in slot n+1. In this case, DRMS symbols may be transmitted in different slots (slot n and slot n+1), but if the DMRS symbols satisfy a join channel estimation condition over different slots, the base station may perform joint channel estimation. Here, the PUSCHs may be PUSCHs including different TBs. Here, the PUSCHs may be scheduled or activated by different pieces of DCI. Alternatively, the PUSCHs may be PUSCHs including different TBs and scheduled or activated by one piece of DCI. For example, referring to FIG. 22, it is assumed that the UE has received indication from the base station that PUSCH #1 is to be transmitted in slot n and PUSCH #2 is to be transmitted in slot n+1. In this case, PUSCH #1 and PUSCH #2 may be scheduled by different pieces of DCI, respectively. PUSCH #1 and PUSCH #2 are transmitted in different slots, and thus the DMRS slots are also transmitted in different slots (slot n and slot n+1), but if the DMRS symbols satisfy the joint channel estimation condition in slot n/n+1, the base station may perform joint channel estimation.

In the disclosure, the joint channel estimation is described for PUCCH or PUSCH (repetitions), but various methods related to the joint channel estimation described in the disclosure are not only limited to the PUSCH or PUCCH (repetition). That is, even in a case other than the PUCCH or PUSCH (repetition) transmission, the various similar or same methods related to the joint channel estimation described in the disclosure may be applied. For example, if DMRSs of an uplink signal satisfy a joint channel estimation condition over multiple slots, the various similar/same methods related to the joint channel estimation described in the disclosure may be applied to the uplink signal.

For convenience of description, to summarize the joint channel estimation condition (or a condition in which joint channel estimation is possible) of the disclosure, the joint channel estimation condition may include at least one of the following conditions. For joint channel estimation of an uplink channel (e.g., PUCCH or PUSCH), the UE may need to transmit the DMRS so as to satisfy the joint channel estimation condition.

1) Same starting PRB index: The PRB start locations of the DRMSs need to be identical between PUCCHs or PUSCHs in the frequency domain.
2) Same number of PRBs: The number of PRBs of the DRMSs between PUCCHs or PUSCHs in the frequency domain.
3) Phase continuity: The DMRSs between PUCCH or PUSCHs need to maintain phase continuity (e.g., the same phase).
4) Same beamforming: The DMRSs between PUCCHs or PUSCHs need to satisfy the same beamforming.
5) Same transmit power (or Power consistency): The UE needs to transmit the DMRSs between PUCCHs or PUSCHs at the same transmission power.
6) Same quasi-co-location (QCL): The DMRs between PUCCHs or PUSCHs need to satisfy the same QCL.

Here, the starting PRB, PRB number, beamforming, and QCL may be constantly maintained during uplink channel transmissions on the basis of higher-layer configuration information or scheduling information received from the base station. The starting PRB may vary in the slot or between slots according to whether frequency hopping is applied. The phase of the DMRS may vary in units of slots/symbols on the basis of a slot/symbol index. The transmission power of the DMRS may vary in units of slots on the basis of the higher-layer configuration information, the power control command, and/or the like. Here, the starting PRB, the PRB number, or the like may be included in a condition required to maintain phase continuity and power identity/consistency. Accordingly, unless described otherwise, when the UE operates to satisfy a joint channel estimation condition, it may mean that the DMRSs operate to satisfy 3) and 5) over multiple slots.

In addition, the joint channel estimation in the disclosure may be interchangeably used with DMRS-bundling.

Frequency Hopping Method

A problem to be solved in the disclosure relates to a frequency hopping method when DMRSs between different uplink channel repetitions transmitted by a UE are used for joint channel estimation to enhance the coverage of an uplink channel. Hereinafter, for convenience of description, the disclosure is described for a PUCCH, but the technical idea of the disclosure is also applied the same to a PUSCH.

Figure 23:
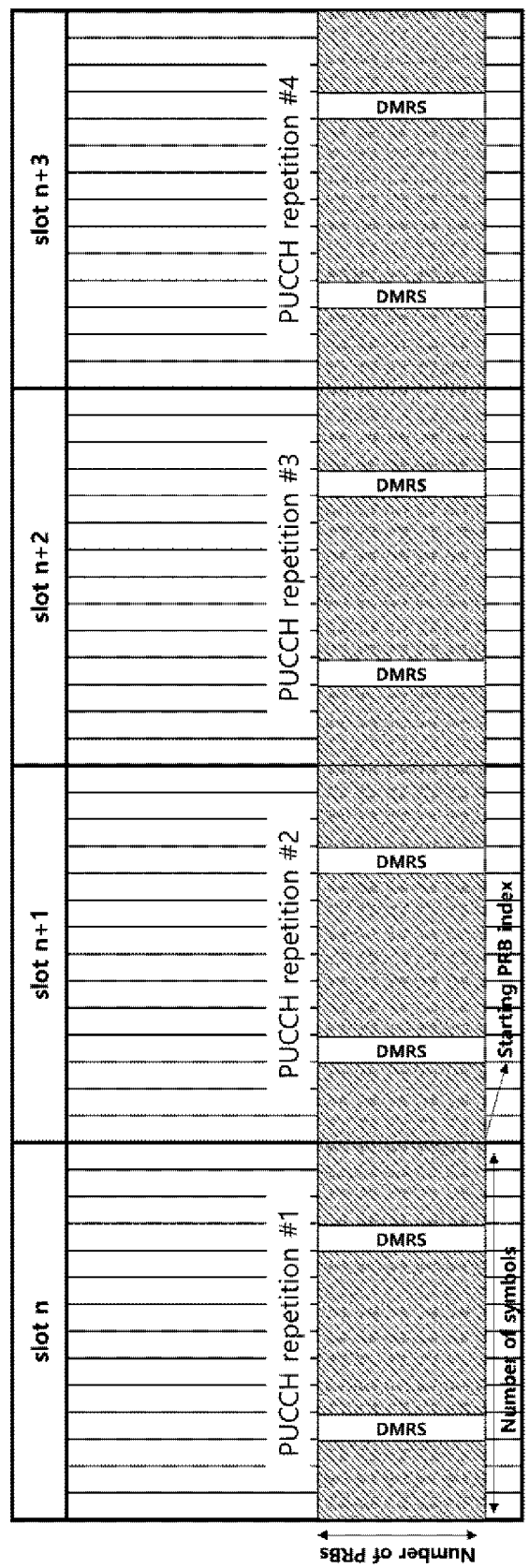
FIG. 23 illustrates PUCCH repetition transmission.

First, a joint channel estimation method using DMRSs between PUCCH repetitions transmission is described. FIG. 23 illustrates PUCCH repetition transmission. Referring to FIG. 23, it is assumed that the UE has received indication that a PUCCH is to be repeatedly transmitted during four slots from slot n. In this case, for joint channel estimation between PUCCH repetitions, the DMRS transmitted by the UE needs to satisfy at least one, or preferably, all of the above-described joint channel estimation conditions.

The DMRSs of PUCCH repetitions #1 to 4 of FIG. 23 satisfy the same staring PRB index and PRB number, and thus the DMRSs of PUCCH repetitions #1 to 4 may be used for joint channel estimation if the phase continuity, the same beamforming, the same transmission power, and the same QCL are satisfied. For example, the base station may perform channel estimation by joint-decoding the DMRSs of PUCCH repetitions #1 to 4.

The UE may be configured or may receive indication so as to repeatedly transmit a PUCCH through frequency hopping for not only joint channel estimation using the DMRS but also a frequency diversification gain. The hopping methods below may be configured or indicated for the UE by the base station.

Figure 24:
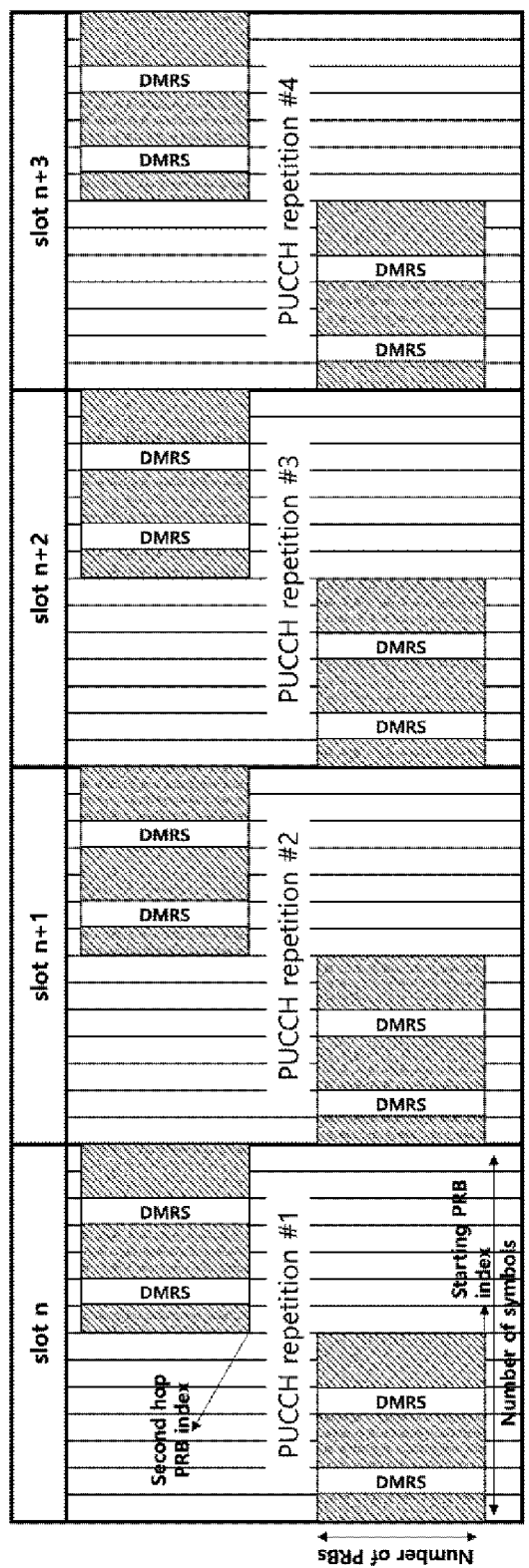
FIG. 24 illustrates PUCCH repetition transmission and intra-slot frequency hopping.

Intra-slot frequency hopping: The UE divides a PUCCH in half in the time domain within a slot in which PUCCH transmission is indicated, and maps the same to two hops. Here, the PUCCH may or may not be repeated transmission. When the length/number of symbols to which the PUCCH is allocated in one slot is $N^{PUCCH,s}_{symb}$, $floor(N^{PUCCH,s}_{symb}/2)$ symbols may be mapped to the first hop, and $N^{PUCCH,s}_{symb}-floor(N^{PUCCH,s}_{symb}/2)$ symbols may be mapped to the second hop. Referring to FIG. 24, it is assumed that the UE has received indication that the PUCCH is to be repeatedly transmitted for four slots from slot n and intra-slot frequency hopping is to be performed. In this case, the length $N^{PUCCH,s}_{symb}$ of the symbol to which the PUCCH is allocated in one slot is 14. The UE may map the first $floor(N^{PUCCH,s}_{symb}/2)=7$ symbols of the PUCCH to the first hop, and map the next $N^{PUCCH,s}_{symb}-floor(N^{PUCCH,s}_{symb}/2)=7$ symbols of the PUCCH to the second hop in slots n, n+1, n+2, and n+3. The first hop may be transmitted in a first frequency band, and the second hop may be transmitted in a second frequency band. As many PRBs as $N_{PRB}$ from the starting PRB index are configured as PRBs of the first hop, and as many PRBs as $N_{PRB}$ from the second hop PRB index are configured as PRBs of the second hop.

In a similar scheme, in a case of PUSCH repetition transmission, the UE may divide a PUSCH in half in the time domain in a slot to which PUSCH repetition transmission is indicated, and may the same to two hops. Here, the PUSCH may or may not be repeated transmission. When the length/number of symbols to which the PUSCH is allocated in one slot is $N^{PUCCH,s}_{symb}$, $floor(N^{PUCCH,s}_{symb}/2)$ symbols may be mapped to the first hop, and $N^{PUCCH,s}_{symb}-floor(N^{PUCCH,s}_{symb}/2)$ symbols may be mapped to the second hop. As many PRBs as the number of PRBs scheduled from $RB_{start}$ may be configured as PRBs of the first hop, and as many PRBs as the number of PRBs scheduled from $\{(RB_{start}+RB_{offset}) \bmod N^{size}_{BWP}\}$ may be configured as PRBs of the second hop. Here, $RB_{start}$ indicates a starting PRB index within a UL BWP, $RB_{offset}$ indicates a frequency hopping offset value configured by the base station, and $N^{size}_{BWP}$ indicates the number of PRBs constituting the UL BWP.

Figure 25:
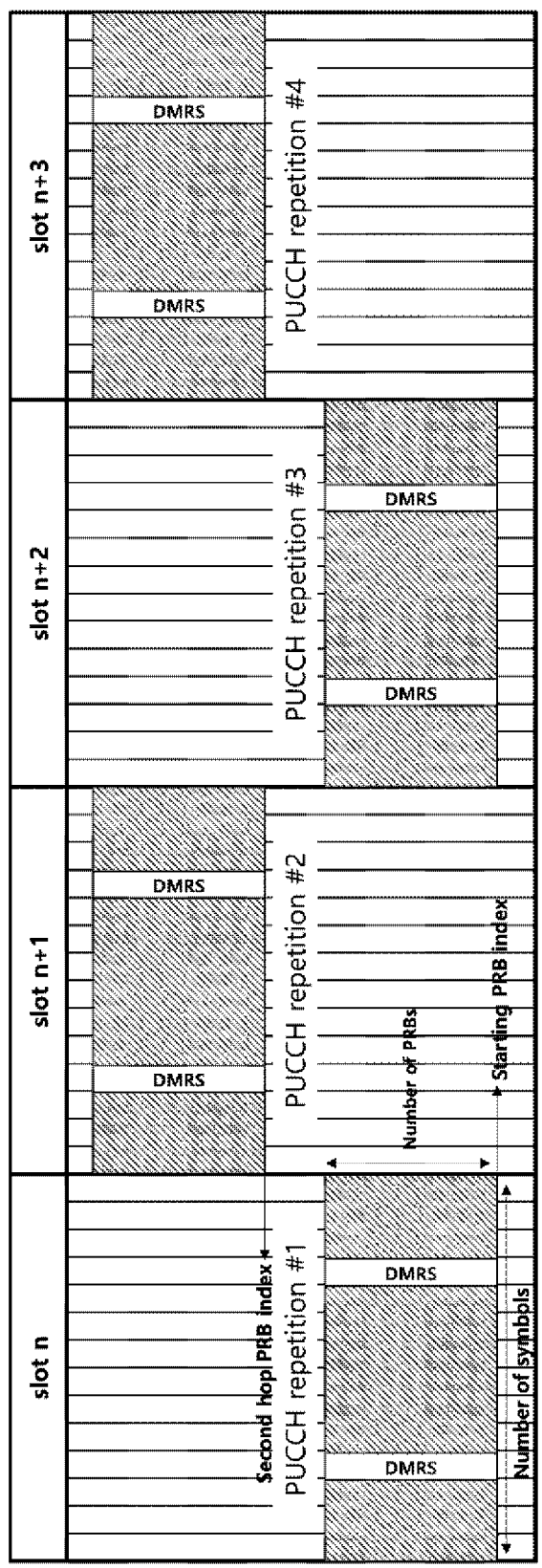
FIG. 25 illustrates PUCCH repetition transmission and inter-slot frequency hopping.

Inter-slot frequency hopping: A repetition transmission slot index may be sequentially numbered with reference to the first slot of PUCCH repetition transmission. Here, the repetition transmission slot index of the first slot of the PUCCH repetition transmission may be 0. Referring to FIG. 25, it is assumed that the UE has received indication of PUCCH repetition transmission for four slots from slot n and inter-slot frequency hopping. In this case, a repetition transmission slot index of slot n of the first slot of the PUCCH repetition transmission may be 0. In addition, repetition transmission slot indices of slots n to n+3 may be sequentially 0, 1, 2, and 3. In this case, for example, the UE may map a PUCCH to the first hop in a slot corresponding to an even-numbered repetition transmission slot index, and may map a PUCCH to the second hop in a slot corresponding to an odd-numbed repetition transmission slot index. Here, as many PRBs as the number of PRBs from the starting PRB may be configured as PRBs of the first hop, and as many PRBs as the number of PRBs from the second hop PRB index may be configured as PRBs of the second hop. That is, the UE may transmit a PUCCH in the first hop in slot n and slot n+2, and transmit a PUCCH in the second hope in slot n+1 and slot n+3.

In a similar scheme, in a case of PUSCH repetition transmission, the UE may map a PUSCH to the first hop or the second hop with reference to an absolute slot index in a radio frame of a slot including the PUSCH repetition transmission. For example, if the index in the radio frame of the slot including the PUSCH repetition transmission is an even number, the corresponding PUSCH repetition transmission may be mapped to the first hop. In addition, if the index in the radio frame of the slot including the PUSCH repetition transmission is an odd number, the corresponding PUSCH repetition transmission may be mapped to the second hop. As many PRBs as PRBs scheduled from $RB_{start}$ may be configured as PRBs of the first hop, and as many PRBs as the number of PRBs scheduled from $\{(RB_{start}+RB_{offset}) \bmod N^{size}_{BWP}\}$ may be configured as PRBs of the second hop. Here, $RB_{start}$ indicates a starting PRB index within a UL BWP, $RB_{offset}$ indicates a frequency hopping offset value configured by the base station, and $N^{size}_{BWP}$ indicates the number of PRBs constituting the UL BWP.

During PUCCH repetition transmission through frequency hopping, the DMRS of the first hop and the DMRS of the second hop are transmitted in different PRBs, and thus joint channel estimation between PUCCH repetition transmissions is impossible. In the disclosure, various frequency hopping methods for a frequency diversification gain according to frequency hopping and coverage enhancement through joint channel estimation using the DMRS is described.

In the following examples, the UE may transmit the first hop in the frequency domain in a first PRB, and transmit the second hop in the frequency domain in a second PRB. The UE may determine, as the first PRB, "number of PRBs" PRBs from a PRB corresponding to the starting PRB index, and determine, as the second PRB, "number of PRBs" PRBs from a PRB corresponding to the second hop PRB index. Alternatively, the UE may determine, as the first PRB, as many PRBs as the number of PRBs scheduled from $RB_{start}$, and determine, as the second PRB, as many PRBs as the number of PRBs scheduled from $\{(RB_{start}+RB_{offset}) \bmod N^{size}_{BWP}\}$. Here, $RB_{start}$ indicates a starting PRB index within a UL BWP, $RB_{offset}$ indicates a frequency hopping offset value configured by the base station, and $N^{size}_{BWP}$ indicates the number of PRBs constituting the UL BWP.

In the following examples, the inter-slot frequency hopping is assumed. For example, the UE may map the PUCCH repetition transmission to the first (or second hop) in the even-numbered repetition transmission slot index, and map the PUCCH repetition transmission to the second (or first) hop in the odd-numbered repetition transmission index.

According to a first example of the disclosure, the UE may maintain the same PUCCH repetition transmission slot index for a specific number (hereinafter, M) of slots. In addition, the UE may sequentially increase the PUCCH repetition transmission slot index every specific number of slots. Here, the specific number may be the number of PUCCH repetitions for joint-decoding of DMRS symbols for joint channel estimation. It is assumed that the UE has received indication that a PUCCH is to be repetitively transmitted in N slots, and the specific number is M. In this case, a repetition transmission slot index for M (consecutive) slots with reference to the first slot of the indicated PUCCH repetition transmission is determined to be 0. The repetition transmission slot index may be sequentially increased every M consecutive slots. Here, the repetition transmission slot index may be determined regardless of whether there is PUCCH repetition transmission. Thereafter, the UE may map a PUCCH to the first hop in a slot corresponding to the even-numbered repetition transmission slot index. In addition, the UE may map a PUCCH to the second hop in a slot corresponding to the odd-numbered repetition transmission slot index. Here, as many PRBs as "number of PRBs" PRBs from the starting PRB index are configured as PRBs of the first hop, and as many PRBs as "number of PRBs" PRBs from the second hop PRB index are configured as PRBs of the second hop.

Figure 26:
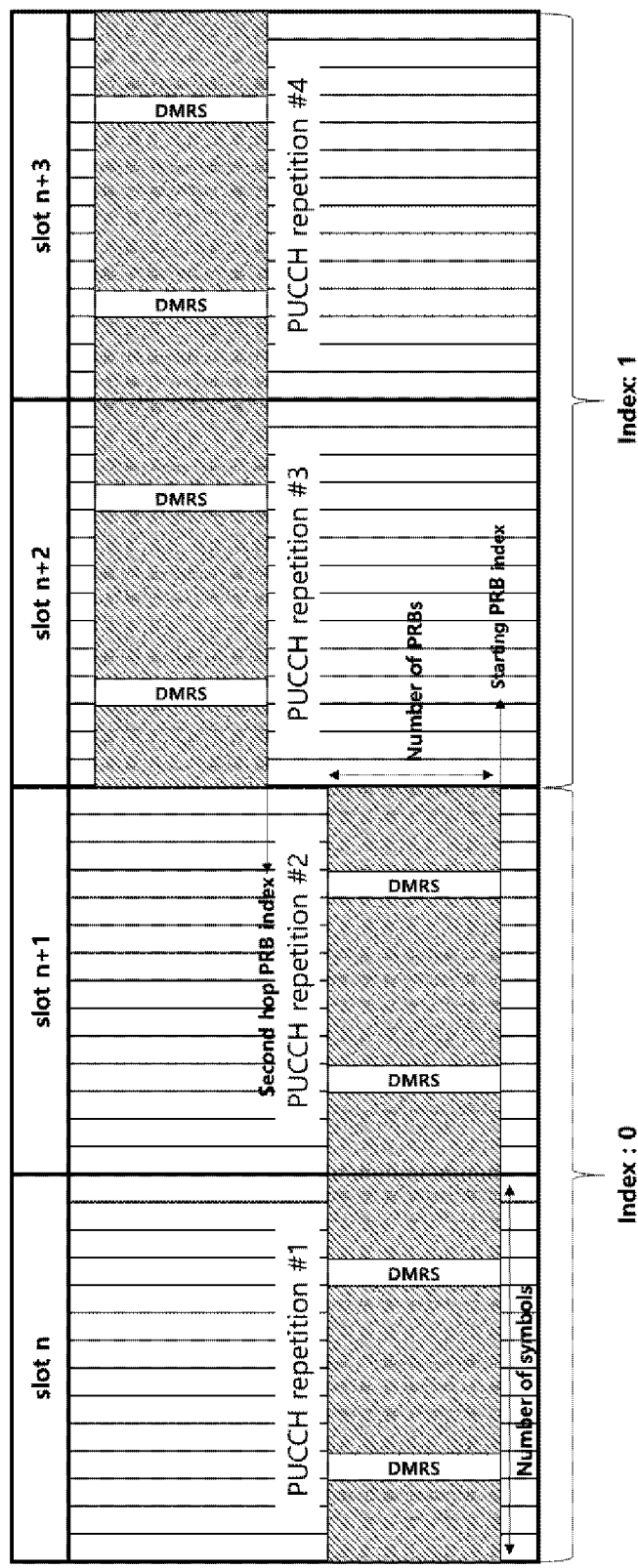
FIG. 26 illustrates a slot index determination method for PUCCH frequency hopping according to an example of the present disclosure.

For example, referring to FIG. 26, it is assumed that the UE has received an indication that N=4 and M=2 are configured and a PUCCH is to be repetitively transmitted from slot n. The UE may determine the repetition transmission slot index for M=2 slots from slot n, i.e., slot n and slot n+1, to be 0, and may determine the repetition transmission slot index for two slots from slot n+2, i.e., slot n+2 and slot n+3, to be 1. The repetition transmission slot index of slot n and slot n+1 is 0, and thus the PUCCH of the slot may be transmitted in the first hop, and the repetition transmission slot index of slot n+2 and slot n+3 is 1, and thus the PUCCH of the slot may be transmitted in the second hop.

Figure 27:
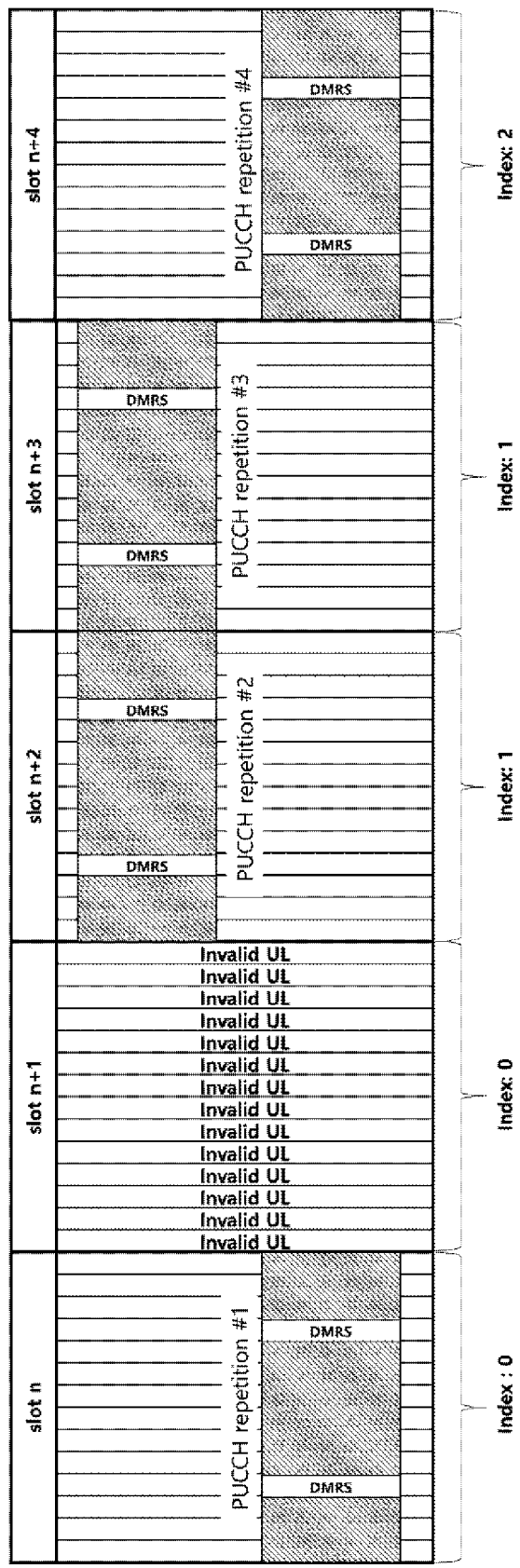
FIG. 27 illustrates a slot index determination method for PUCCH frequency hopping according to an example of the present disclosure.

For example, referring to FIG. 27, it is assumed that the UE has received indication that N=4 and M=2 are configured and the PUCCH is to be repetitively transmitted from slot n. Here, slot n+1 is assumed as a slot in which PUCCH transmission is impossible, and slots n, n+2, n+3, and n+4 are assumed as slots in which PUCCH transmission is possible. The UE may allocate the repetition transmission slot index in units of two slots from slot n. That is, the UE may determine the repetition transmission slot index of slot n/n+1 to be 0, the repetition transmission slot index of slot n+2/n+3 to be 1, and the repetition transmission slot index of slot n+4/n+5 to be 2. The repetition transmission slot index of slot n/n+1 is 0, thus the PUCCH of the slot may be transmitted in the first hop, the repetition transmission slot index of slot n+2/n+3 is 1, thus the PUCCH of the slot may be transmitted in the second hop, and the repetition transmission slot index of slot n+4/n+5 is 2, and thus the PUCCH of the slot may be transmitted in the first hop. The UE needs to transmit the PUCCH in N=4 slots, and thus the PUCCH may be transmitted in four slots, i.e., slot n, slot n+2, slot n+3, and slot n+4, in consideration of whether the PUCCH transmission is possible. Accordingly, the PUCCHs of slot n and slot n+4 may be transmitted in the first hop, and the PUCCHs of slot n+2 and n+3 may be transmitted in the second hop.

In a case of applying the first example to a PUSCH, the repetition transmission slot index may be determined with reference to an absolute slot index in a radio frame. For example, according to the first example, it is assumed that the UE has received indication that a PUSCH is to be repetitively transmitted in N slots, and a specific number is M. In this case, the UE may determine the repetition transmission slot index from the first slot in which the PUSCH repetition transmission is indicated according to floor($n^\mu_s$/M). Here, $n^\mu_s$ is an absolute slot index in a radio frame of a slot including PUSCH repetition transmission having subcarrier spacing u. The repetition transmission slot index floor(n/M) may sequentially increase every M consecutive slots. Here, the repetition transmission slot index may be determined regardless of whether there is PUSCH repetition transmission. Hereinafter, when the repetition transmission slot index floor($n^\mu_s$/M) of the slot including the PUSCH repetition transmission is an even number, the UE may map the same to the first hop, and when the repetition transmission slot index floor($n^\mu_s$/M) of the slot including the PUSCH repetition transmission is an odd number, the UE may map the same to the second hop. As many PRBs as the number of PRBs scheduled from $RB_{start}$ may be configured as PRBs of the first hop, and as many PRBs as the number of PRBs scheduled from $\{(RB_{start}+RB_{offset}) \bmod N^{size}_{BWP}\}$ may be configured as the PRB of the second hop. Here, $RB_{start}$ indicates a starting PRB index within a UL BWP, $RB_{offset}$ indicates a frequency hopping offset value configured by the base station, and $N^{size}_{BWP}$ indicates the number of PRBs constituting the UL BWP.

In the first example above, the first UE maintains the same repetition slot index in M consecutive slots regardless of whether the PUCCH is transmitted. In addition, the PUCCHs transmitted in the M consecutive slots are transmitted in the same frequency band. The PUCCH cannot be transmitted in some of the M consecutive slots, and thus the number of slots in which the PUCCH is transmitted among the M consecutive slots may be equal to or smaller than M. An example for solving this problem is as follows.

According to a second example of the disclosure, the UE may maintain the same PUCCH repetition transmission slot index for a specific number of slots in which PUCCH repetition transmission is possible. In addition, the UE may sequentially increase every specific number of slots in which PUCCH repetition transmission is possible. Here, the specific number may be the number of PUCCH repetitions for joint-decoding of DMRS symbols for joint channel estimation. It is assumed that the UE has received indication that a PUCCH is to be repetitively transmitted in N slots, and the specific number is M. In this case, a repetition transmission slot index for M slots in which a PUCCH can be transmitted is determined to be 0 with reference to the first PUCCH repetition transmission of the indicated PUCCH repetition transmission. The repetition transmission slot index may be sequentially increased every M slots in which PUCCH transmission is possible.

Figure 28:
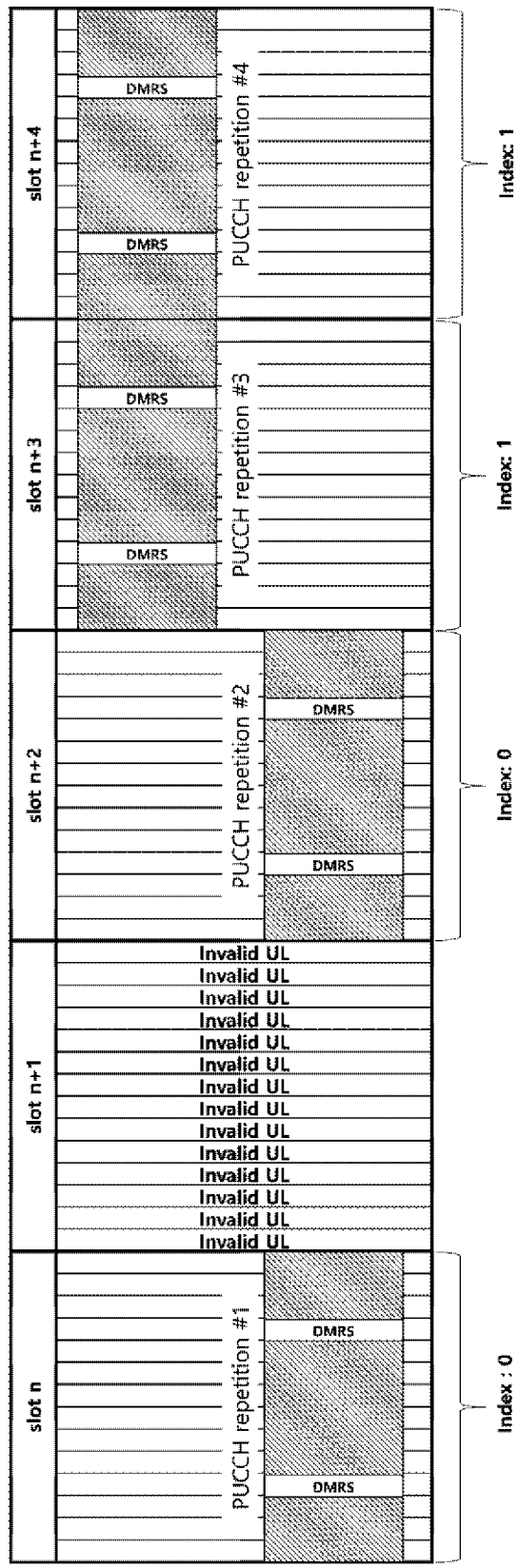
FIG. 28 illustrates a slot index determination method for PUCCH frequency hopping according to an example of the present disclosure.

For example, referring to FIG. 28, it is assumed that the UE has received indication that N=4 and M=2 are configured and a PUCCH is to be repetitively transmitted from slot n. Here, slot n+1 is assumed as a slot in which PUCCH transmission is impossible, and slots n, n+2, n+3, and n+4 are assumed as slots in which PUCCH transmission is possible. The UE may determine the repetition transmission slot index for M=2 slots, in which PUCCH repetition transmission is possible, from slot n, i.e., slot n and slot n+2, to be 0, and may determine the repetition transmission slot index for slot n+3 and slot n+4 to be 1. Accordingly, the PUCCHs of slot n and slot n+2 may be transmitted in the first hop, and the PUCCHs of slot n+3 and n+4 may be transmitted in the second hop.

In a case of applying the second example to a PUSCH, the repetition transmission slot index may be determined with reference to a relative slot index in a radio frame, in which PUSCH repetition transmission is possible. That is, according to the second example, it is assumed that the UE has received indication that a PUSCH is to be repetitively transmitted in N slots, and a specific number is M. In this case, the UE may determine the repetition transmission slot index, in which PUSCH transmission is possible, from the first slot in which the PUSCH repetition transmission is indicated according to floor($n^\mu_s$/M). Here, $n^\mu_s$ is a relative slot index in a radio frame of a slot having subcarrier spacing u, in which PUSCH repetition transmission is possible. The repetition transmission slot index floor($n^\mu_s$/M) may sequentially increase every M slots in which PUSCH transmission in which PUSCH transmission is possible. Thereafter, when the repetition transmission slot index of the slot including PUSCH repetition transmission is an even number, the UE may map the corresponding PUSCH to the first hop. In addition, when the repetition transmission slot index of the slot including the PUSCH repetition transmission is an odd number, the UE may map the corresponding PUSCH to the second hop. As many PRBs as the number of PRBs scheduled from $RB_{start}$ may be configured as PRBs of the first hop, and as many PRBs as the number of PRBs scheduled from $\{(RB_{start}+RB_{offset}) \bmod N^{size}_{BWP}\}$ may be configured as the PRB of the second hop. Here, $RB_{start}$ indicates a starting PRB index within a UL BWP, $RB_{offset}$ indicates a frequency hopping offset value configured by the base station, and $N^{size}_{BWP}$ indicates the number of PRBs constituting the UL BWP.

Referring to FIG. 28, it is assumed that slot n+1 is a slot in which PUSCH transmission is impossible, and slot n (nμs=0), slot n+2 (nμs=1), slot n+3 (nμs=2), and slot n+4 (nμs=3) are slots in which PUSCH transmission is possible. The UE may determine the repetition transmission slot for M=2 slots in which PUSCH repetition transmission is possible, i.e., slot n and slot n+2, to be 0, and determine the repetition transmission slot index for slot n+3 and slot n+4 to be 1. Accordingly, the PUSCHs of slot n and slot n+2 may be transmitted in the first hop, and the PUSCHs for slot n+3 and slot n+4 may be transmitted in the second hop.

Through the first example and the second example above, the UE may determine a slot in which the PUCCH is transmitted in the first (or second) hop and a slot in which the PUCCH is transmitted in the second (or first) hop. It is preferable to transmit the PUCCH in the same PRB in consecutive slots in consideration of joint channel estimation.

For example, referring to FIG. 26, the PUCCH is transmitted in the first hop in two consecutive slots, slot n and slot n+1, and thus joint channel estimation is possible using DMRSs of slot n and slot n+1. In addition, the PUCCH is transmitted in the second hop in two consecutive slots, slot n+2 and slot n+3, and thus joint channel estimation is possible using DMRSs of slot n+2 and slot n+3.

For example, referring to FIG. 27, the PUCCH is transmitted in the second hop in two consecutive slots, slot n+2 and slot n+3, and thus joint channel estimation is possible using DMRSs of slot n+2 and slot n+3. However, the PUCCH is transmitted in the same hop in slot n and slot n+4, but joint channel estimation using DMRSs of slot n and slot n+4 is impossible due to a time interval (i.e., non-consecutive) between two slots.

For example, referring to FIG. 28, the PUCCH is transmitted in the second hop in two consecutive slots, slot n+3 and slot n+4, and thus joint channel estimation using DMRSs of the PUCCH of slot n+3 and slot n+4 is possible. However, the PUCCH is transmitted in the same hop in slot n and slot n+2, but joint channel estimation using DMRSs of slot n and slot n+2 is impossible due to a time interval (i.e., non-consecutive) between two slots.

As such, it is preferable for the UE to transmit the PUCCH in the same hop in available consecutive slots.

More specifically, the first example and the second example are described with reference to FIGS. 29 and 30.

In FIG. 29, it is assumed that the UE has received indication that that N=4 and M=2 are configured and a PUCCH is to be repetitively transmitted from slot n. Here, slot n+1, slot n+2, and slot n+5 are assumed as slots in which PUCCH transmission is impossible, and slot n, slot n+3, slot n+4, and slot n+6 are assumed as slots in which PUCCH transmission is possible. The UE needs to transmit the PUCCH in N=4 slots, and thus may transmit the PUCCH in slot n, slot n+3. Slot n+4, and slot n+6.

Referring to FIG. 29a, the UE may determine a hop in a slot in which a PUCCH is to be transmitted according to the first example. Specifically, M=2 slots are grouped, and the same repetition transmission slot index may be determined regardless of whether the PUCCH is transmitted. In addition, the repetition transmission slot index may sequentially increase every M=2 slots. Here, the repetition transmission slot index for slot n corresponding to the first slot of PUCCH repetition transmission is 0. Accordingly, the repetition transmission slot index for slot n and slot n+1 is 0, the repetition transmission slot index for slot n+2 and slot n+3 is 1, the repetition transmission slot index for slot n+4 and slot n+5 is 2, and the repetition transmission slot index for slot n+6 is 3. The UE may transmit the PUCCH in the first hop in slot n and slot n+4, the repetition transmission slot indices of which are even numbers. In addition, the UE may transmit the PUCCH in the second hop in slot n+3 and slot n+6, the repetition transmission slot indices of which are odd numbers.

Referring to FIG. 29b, the UE may determine a hop in a slot in which a PUCCH is to be transmitted according to the second example. Specifically, M=2 slots in which PUCCH transmission is possible are grouped, and the same repetition transmission slot index may be determined. In addition, the repetition transmission slot index may sequentially increase every M=2 slots in which PUCCH transmission is possible. Here, the repetition transmission slot index for slot n corresponding to the first slot of PUCCH repetition transmission is 0. Accordingly, the repetition transmission slot index for slot n and slot n+3 is 0, and the repetition transmission slot index for slot n+4 and slot n+6 is 1. The UE may transmit the PUCCH in the first hop in slot n and slot n+3, the repetition transmission slot indices of which are even numbers. In addition, the UE may transmit the PUCCH in the second hop in slot n+4 and slot n+6, the repetition transmission slot indices of which are odd numbers.

In FIG. 29, according to the first example and the second example, it may be identified that the PUCCHs are transmitted in different hops in slot n+3 and slot n+4. Referring to FIG. 29a, according to the first example, the UE may transmit the PUCCH in the second hop in slot n+3, and transmit the PUCCH in the first hop in slot n+4. Referring to FIG. 29b, according to the second example, the UE may transmit the PUCCH in the first hop in slot n+3, and may transmit the PUCCH in the second hop in slot n+4.

In FIG. 30, it is assumed that the UE has received indication that that N=8 and M=2 are configured and a PUCCH is to be repetitively transmitted from slot n. Here, slot n+3, slot n+4, and slot n+7 are assumed as slots in which PUCCH transmission is impossible, and slot n, slot n+1, slot n+2, slot n+5, slot n+6, slot n+8, slot n+9, and slot n+10 are assumed as slots in which PUCCH transmission is possible. The UE needs to transmit the PUCCH in N=8 slots, and thus may transmit the PUCCH in slot n, slot n+1, slot n+2, slot n+5, slot n+6, slot n+8, slot n+9, and slot n+10.

Referring to FIG. 30a, the UE may determine a hop in a slot in which a PUCCH is to be transmitted according to the first example. Specifically, M=2 slots are grouped, and the same repetition transmission slot index may be determined regardless of whether the PUCCH is transmitted. In addition, the repetition transmission slot index may sequentially increase every M=2 slots. Here, the repetition transmission slot index for slot n corresponding to the first slot of PUCCH repetition transmission is 0. Accordingly, the repetition transmission slot index for slot n and slot n+1 is 0, the repetition transmission slot index for slot n+2 and slot n+3 is 1, the repetition transmission slot index for slot n+4 and slot n+5 is 2, the repetition transmission slot index for slot n+6 and slot n+7 is 3, the repetition transmission slot index for slot n+8 and slot n+9 is 4, and the repetition transmission slot index for slot n+10 is 5. The UE may transmit the PUCCH in the first hop in slot n, slot n+1, slot n+5, slot n+8, and slot n+9, the repetition transmission slot indices of which are even numbers. In addition, the UE may transmit the PUCCH in the second hop in slot n+2, slot n+6, and slot n+10, the repetition transmission slot indices of which are odd numbers.

Referring to FIG. 30b, the UE may determine a hop in a slot in which a PUCCH is to be transmitted according to the second example. Specifically, M=2 slots in which PUCCH transmission is possible are grouped, and the same repetition transmission slot index may be determined. In addition, the repetition transmission slot index may sequentially increase every M=2 slots in which PUCCH transmission is possible. Here, the repetition transmission slot index for slot n corresponding to the first slot of PUCCH repetition transmission is 0. Accordingly, the repetition transmission slot index for slot n and slot n+1 is 0, the repetition transmission slot index for slot n+2 and slot n+5 is 1, the repetition transmission slot index for slot n+6 and slot n+8 is 2, and the repetition transmission slot index for slot n+9 and slot n+10 is 3. The UE may transmit the PUCCH in the first hop in slot n, slot n+1, slot n+6, and slot n+8, the repetition transmission slot indices of which are even numbers. In addition, the UE may transmit the PUCCH in the second hop in slot n+2, slot n+5, slot n+9, and slot n+10, the repetition transmission slot indices of which are odd numbers.

In FIG. 30, according to the first example and the second example, it may be identified that the PUCCHs are transmitted in different hops in slot n+5 and slot n+6. Referring to FIG. 30a, according to the first example, the UE may transmit the PUCCH in the first hop in slot n+5, and transmit the PUCCH in the second hop in slot n+6. Referring to FIG. 30b, according to the second example, the UE may transmit the PUCCH in the second hop in slot n+5, and may transmit the PUCCH in the first hop in slot n+6. As described above, for joint channel estimation, the PUCCHs need to be transmitted in the same hop in the consecutive slots. However, as shown in FIGS. 29 and 30, when the PUCCHs are transmitted in different hops even though there are consecutive slots, joint channel estimation cannot be performed. An example for resolving this problem is as follows.

According to a third example of the disclosure, the UE may determine the same PUCCH repetition transmission slot index only for slots in which joint channel estimation is possible from among a specific number of slots in which PUCCH repetition transmission is possible. Here, the slots in which the joint channel estimation is possible may be consecutive slots in the time domain in which PUCCH repetition transmission is possible. The specific number may be the number of PUCCH repetitions for joint-decoding of DMRSs symbols for joint channel estimation.

When it is assumed that the UE has received indication that a PUCCH is to be repetitively transmitted in N slots, and the specific number is M, more specifically, the third example is as follows. The UE may group M consecutive slots among slots in which PUCCH transmission is possible, and determine the same repetition transmission slot index therefor. In addition, with respect to consecutive slots among the slots in which PUCCH transmission is possible, the repetition transmission slot index may sequentially increase every M slots. If the number of consecutive slots among the slots in which PUCCH transmission is possible is less than M, the UE may determine the same repetition transmission slot index for the consecutive slot, the number of which is less than M. Different repetition transmission indices may be determined for non-consecutive slots. The repetition transmission slot indices may be sequentially assigned in an ascending order from the most preceding slot to the most subsequent slot among the non-consecutive slots.

The third example may be indicated as follows. Consecutive slots from the first slot of PUCCH repetition transmission may be acquired from among slots in which PUCCH transmission is possible. The consecutive slots may be grouped every M slots, and the repetition transmission slot index may sequentially increase. Here, the repetition transmission slot index of the first slot of PUCCH repetition transmission is 0. That is, if there are M consecutive from the next slot in PUCCH transmission is possible, the repetition transmission slot index of the slot is 1. This process may be performed for consecutive slots. If non-consecutive slots are found, the UE may find consecutive slots after the non-consecutive slots. If the repetition transmission slot index of a slot before the non-consecutive slots is X, the repetition transmission index of the first slot among the consecutive slots after the non-consecutive slots may be X+1. The consecutive slots after the non-consecutive slots may be grouped every M slots, and the repetition transmission slot index may sequentially increase. That is, the repetition transmission slot index for M slots including the first slot among the consecutive slots after the non-consecutive slots is X+1.

Referring to FIG. 31a, the UE may determine a hop in which the PUCCH is to be transmitted according to the third example. Specifically, consecutive M=2 slots in which PUCCH transmission is possible may be grouped, and the same repetition slot index may be determined. For example, the UE may find a slot in which PUCCH transmission is possible and which is consecutive to slot n. There is no slot in which PUCCH transmission is possible and which is consecutive to slot n, the repetition transmission slot index for slot n may be 0. Slot n+1 and slot n+2 are slots in which PUCCH transmission is impossible. The repetition transmission slot index for slot n+3 may be 1. The UE may find slot n+3 and slot n+4 as consecutive slots from slot n+3, in which PUCCH transmission is possible. The UE may assign the same repetition transmission slot index to slot n+3 and slot n+4 corresponding to M=2 consecutive slots from slot n+3, in which PUCCH transmission is possible. Slot n+5 is a slot in which PUCCH transmission is impossible. The repetition transmission slot index for slot n+6 in which PUCCH transmission is possible may be 2. Accordingly, the PUCCH is transmitted in the first hop in slot n and slot n+6, the repetition transmission slot indices of which are even numbers, and the PUCCH is transmitted in the second hop in slot n+3 and slot n+4, the repetition transmission slot indices of which are odd numbers. Compared to FIGS. 29 and 30, the PUCCHs are transmitted in the same hop in slot n+3 and slot n+4, and thus the base station may perform joint channel estimation by using PUCCH DMRSs of slot n+3 and slot n+4.

Referring to FIG. 31b, the UE may determine a hop in a slot in which the PUCCH is to be transmitted according to the third example. Specifically, M=2 consecutive slots in which PUCCH transmission is possible are grouped, and the same repetition transmission slot index may be determined. For example, the UE may find slot n+1 as a slot in which PUCCH transmission is possible and which is consecutive to slot n. Accordingly, the UE may assign, to slot n and slot n+1 corresponding to M=2 consecutive slots from slot n, in which PUCCH transmission is possible, 0 corresponding to the same repetition transmission slot index as that for slot n. The repetition transmission slot index for slot n+2 may be 1. There is no slot in which PUCCH transmission is possible and which is consecutive to slot n+2. Slot n+3 and slot n+4 are slots in which PUCCH transmission is impossible. The repetition transmission slot index for slot n+5 may be 2. The UE may find slot n+5 and slot n+6 as consecutive slots from slot n+5, in which PUCCH is possible. The UE may assign, to slot n+5 and slot n+6 corresponding to M=2 consecutive slots from slot n+5, in which PUCCH transmission is possible, the same repetition transmission slot index as that for slot n+5.

According to a fourth example of the disclosure, the UE may receive a configuration or indication of a period and an offset of a time window for frequency hopping. The UE may apply the period and offset to a slot in which PUCCH repetition transmission is indicated, and map repetition transmissions in the period to the same hop and perform transmission.

Figure 32:
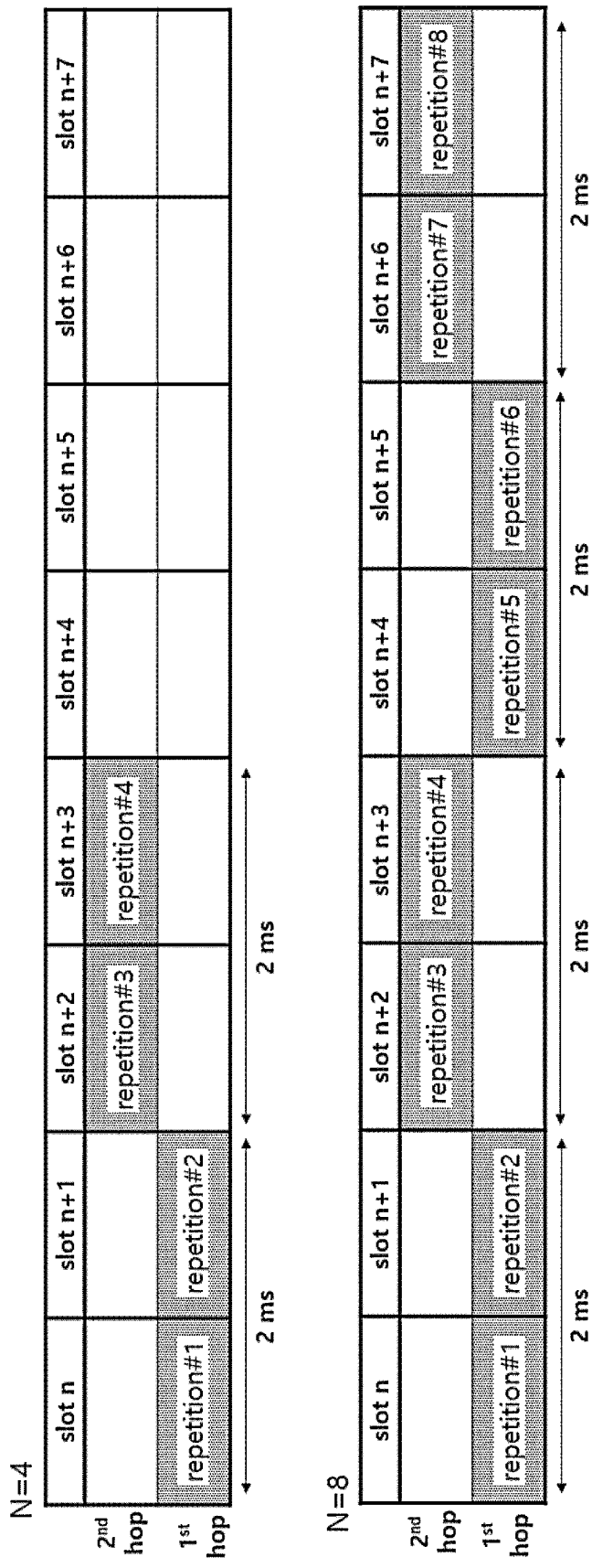
FIG. 32 illustrates a method for mapping a PUCCH repetition to a frequency hop according to an example of the present disclosure.

According to an example, the UE may receive a configuration or indication of the same period and offset, regardless of the configured or indicated number of PUCCH repetition transmissions. For example, referring to FIG. 32, when the UE has received configuration or indication of PUCCH repetition transmission number N=4 or 8 in a cell in which subcarrier spacing is 15 kHz, the UE may apply 2 ms of period and 0 ms of offset in all cases. Accordingly, in a case of N=4 or 8, the UE may map both PUCCH repetition transmissions to one hop and perform transmission.

Figure 33:
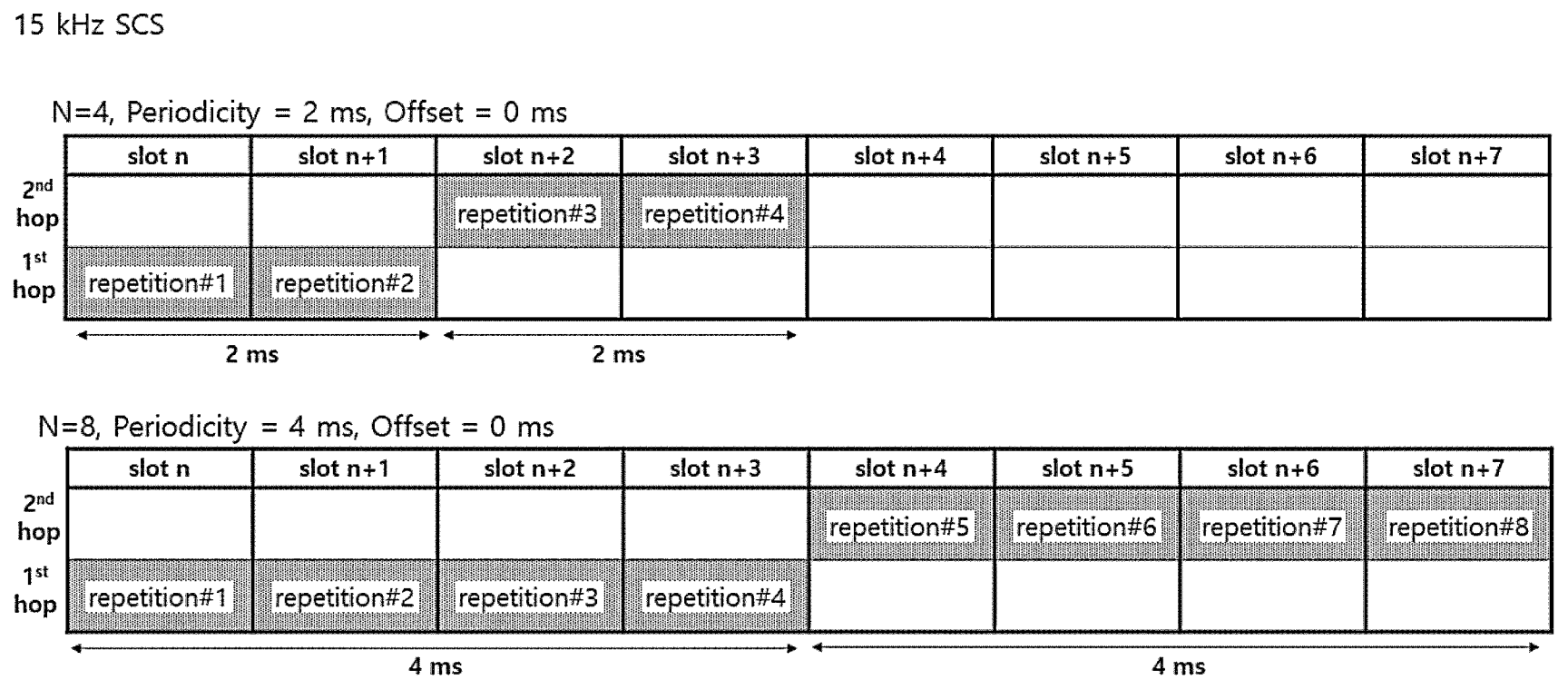

According to another example, the UE may receive a configuration or indication of different periods and offset according to the configured or indicated number of PUCCH repetition transmission. For example, referring to FIG. 33, when the UE has received configuration or indication of 2 ms of period and of 0 ms of offset for N=4 and 4 ms of period and 0 ms of offset for N=8 in a cell in which subcarrier spacing is 15 kHz. Accordingly, the UE may map two PUCCH repetition transmissions to one hop in a case of N=4, and may map four PUCCH repetition transmissions to one hop and perform transmission in a case of N=8.

Method for Determining Number (N) of Repetition Transmission Slots or Specific Number (M)

In the example above, the UE may receive, from the base station, configuration or explicit or implicit indication of the number (N) of repetition transmission slots and/or the specific number (M) of an uplink channel (e.g., PUCCH or PUSCH). Hereinafter, a method for determining the number of repetition transmission slots and/or the specific number by the UE is described in the disclosure.

Figure 34:
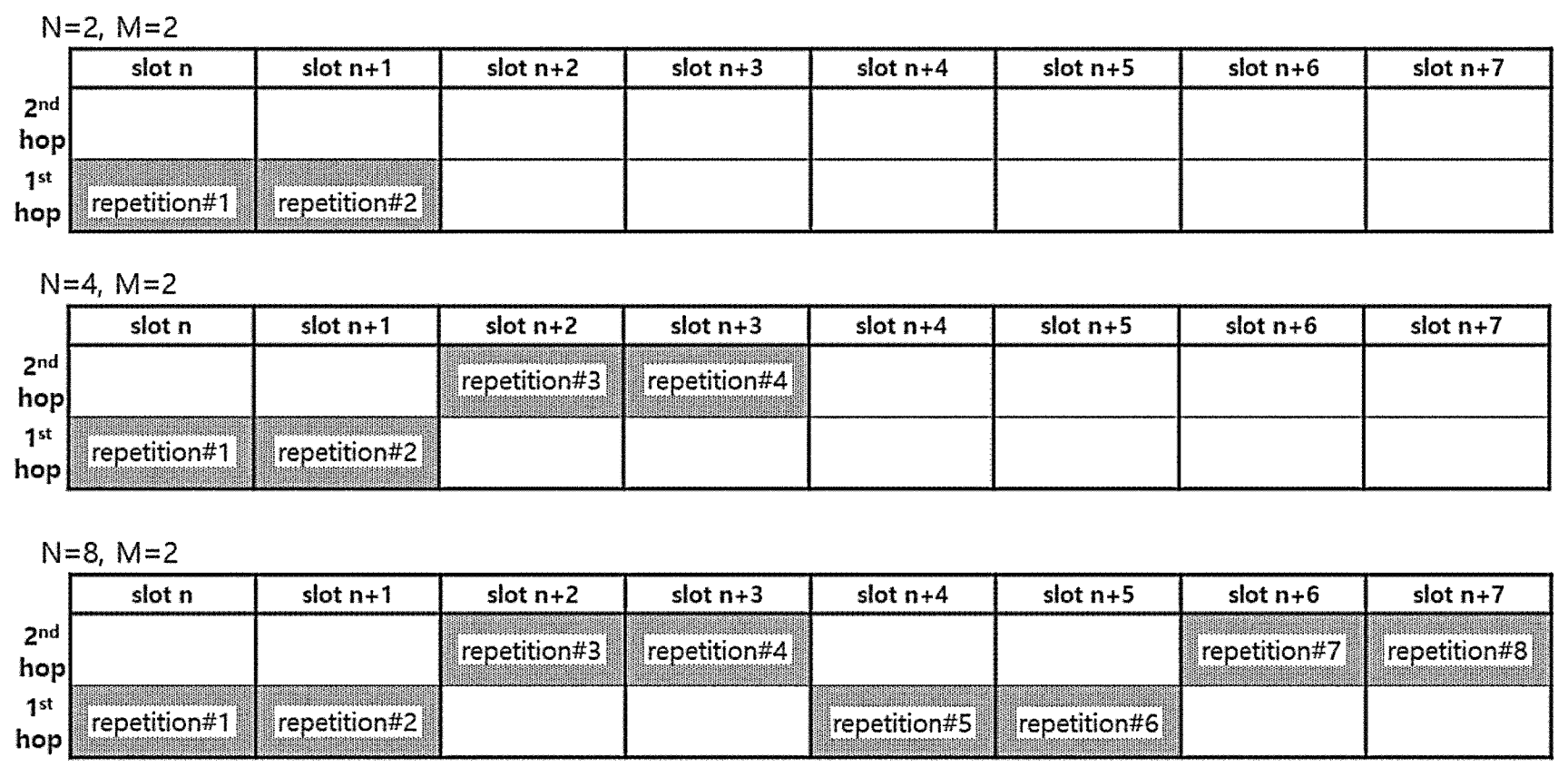

According to a first example, the UE may map PUCCH repetitions to the same frequency hop and transmit the same for a pre-configured number of slots. In this case, the UE may receive a configuration or indication of the same value M regardless of the number (N) of PUCCH repetition transmissions. The UE may map, to the first hop, M slots that are slots preceding in time among slots in which PUCCH transmission is indicated, and map the next M slots to the second hop and perform transmission. Accordingly, joint channel estimation is possible for every M PUCCH repetition transmissions. For example, referring to FIG. 34, when the UE has received configuration or indication of PUCCH repetition transmission number N=2, 4, or 8, the UE may apply M=2 to all cases and perform transmission by mapping two slots to one hop. However, in a case of N=2, two slots are mapped to the same hop, which causes the same result as in a case where no frequency hopping is performed, and thus frequency diversification gain cannot be acquired.

According to a second example, the UE may map PUCCH repetitions to the same frequency hop and perform transmission for a pre-configured number of slots. In this case, the UE may receive a configuration or indication of the pre-configured number of slots with different values of M according to the number of PUCCH repetition transmissions. For example, the UE may receive a configuration or indication of a value of M with a function (e.g., M(N)) of the number N of PUCCH repetition transmissions. Accordingly, the UE may perform flexible frequency hopping according to the number of PUCCH repetition transmissions. For example, referring to FIG. 35, when [N=2, M(2)=1], [N=4, M(4)=2], or [N=8, M(8)=2] is configured/indicated, the UE may map one slot to one hop in a case of N=2, map two slots to one hop in a case of N=4, and map four slots to one hop in a case of N=8.

In the first example and the second example, the UE may always apply the same value of M without an additional configuration from the base station.

In the first example and the second example, the method for mapping a predetermined number of PUCCH repetitions or slots for joint channel estimation from a time point in which PUCCH repetition transmission is indicated to one hop and performing transmission has been described. Hereinafter, a method for performing frequency hopping for PUCCH repetitions and transmitting the same by the UE, without receiving configuration and indication of the number of PUCCH repetitions or slots to be mapped to one hop.

According to a third example, the UE may perform frequency hopping for PUCCH repetitions on the basis of the number of frequency hops, and perform transmission. The UE may determine PUCCH repetition transmission to be mapped to each hop according to the number of hops to which a total of N PUCCH repetition transmissions are to be mapped for transmission. Here, the number of frequency hops refers to the number of PUCCH repetitions in the time domain, which satisfy a condition in which joint channel estimation is possible. That is, referring to FIG. 32, in a case of N=8, there are a total of four frequency hops including frequency hop #1 (repetition #1 and repetition #2), frequency hop #2 (repetition #3 and repetition #4), frequency hop #3 (repetition #5 and repetition #6), and frequency hop #4 (repetition #7 and repetition #8).

Figure 36:
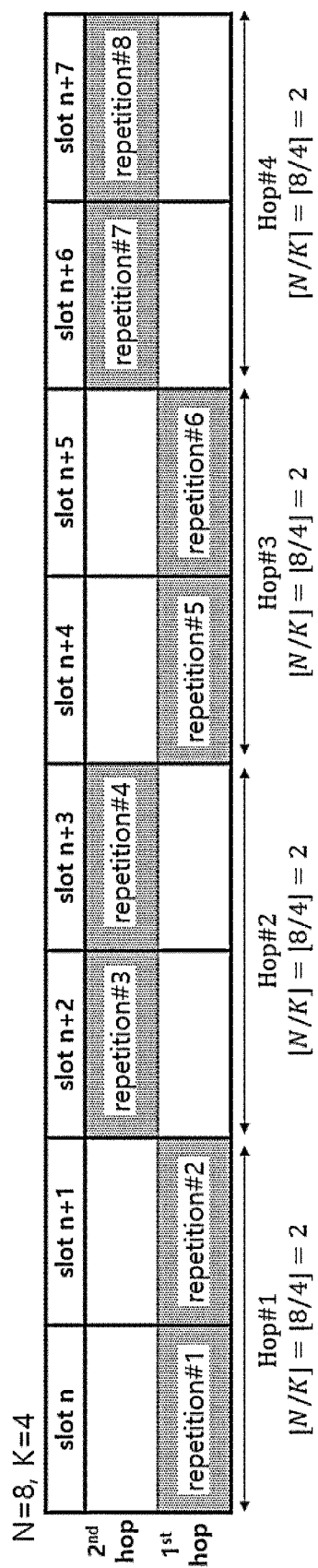
FIG. 36 illustrates a method for mapping a PUCCH repetition to a frequency hop according to an example of the present disclosure.

According to a (3-1)$^{th}$ example, the UE may perform frequency hopping of PUCCH repetitions on the basis of the number of frequency hops configured or indicated from the base station, and perform transmission. The UE may receive a configuration or indication that mapping is to be performed using K frequency hops for a total N number of PUCCH repetition transmissions. For example, the UE may map floor(N/K) PUCCH repetitions to the first hop to the (K−1)$^{th}$ hop in an ascending order, and may map ceil(N/K) PUCCH repetition to K$^{th}$ hop in an ascending order. For example, referring to FIG. 36, when the UE has received indication of a total PUCCH repetition transmission number N=8 and a frequency hop number K=4, the UE may perform transmission by mapping floor(8/4)=2 PUCCH repetitions to frequency hops #1, #2, and #3, and mapping ceil(8/4)=2 PUCCH repetition transmissions to frequency hop #4. That is, the UE may perform transmission by mapping PUCCH repetition transmissions as follows: hop #1=(repetition #1 and repetition #2); hop #2=(repetition #3 and repetition #4); hop #3=(repetition #5 and repetition #6); and hop #4= (repetition #7 and repetition #8). In another example, the UE may perform transmission by mapping ceil(N/K) PUCCH repetitions to the first hop in an ascending hop, and mapping floor(N/K) PUCCH repetitions to the second to K$^{th}$ hops in an ascending order.

Figure 37:
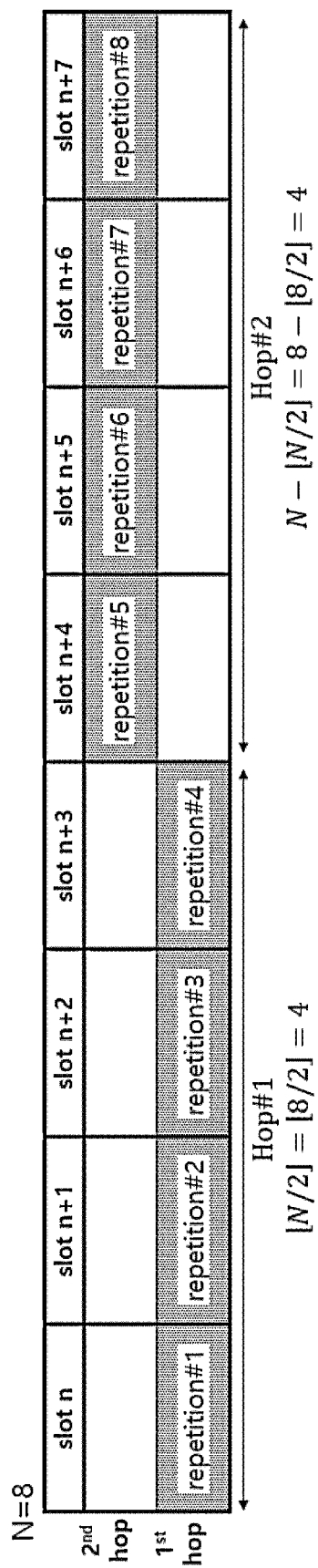
FIG. 37 illustrates a method for mapping a PUCCH repetition to a frequency hop according to an example of the present disclosure.

According to a (3-2)$^{th}$ example, the UE may transmit PUCCH repetitions by performing frequency hopping for the same on the basis of always the same number of frequency hops without indication from the base station. This is a method for distributing the largest number of PUCCH repetitions to equal frequency hops when the UE is configured to perform PUCCH repetition transmission and both frequency hopping and joint channel estimation are applied. For example, the UE may always divide a total N number of PUCCH repetitions to two hops and perform transmission. Similar to the method of dividing PUCCHs symbols in one slot into two equal hops in intra-slot frequency hopping, the UE may perform transmission by mapping floor(N/2) PUCCH repetitions to the first hop in an ascending order, and mapping N-floor(N/2) PUCCH repetitions to the second hop in an ascending order. For example, referring to FIG. 37, when the UE has received indication of a total PUCCH repetition transmission number N=8, the UE may perform transmission by mapping floor(8/2)=4 PUCCH repetitions to frequency hop #1, and mapping ceil(8/2)=4 PUCCH repetitions to frequency hop #2. That is, the UE may perform transmission may mapping PUCCH repetition transmissions as follows: hop #1=(repetition #1 repetition #2, repetition #3, and repetition #4); and hop #2=(repetition #5, repetition #6, repetition #7, and repetition #8). In another example, when performing transmission by always dividing a total N number of PUCCH repetitions into two hops, the UE may perform transmission by mapping ceil(N/2) PUCCH repetitions to the first hop, and mapping floor(N/2) PUCCH repetitions to the second hop.

Time Window Interval Configuration for Joint Coding

Next, for joint channel estimation, the UE may be configured or indicated to satisfy a joint channel estimation condition in a specific time window or a time domain window (TDW) (or bundling window). Here, in the TDW, the above-described (1) PUCCH or PUSCH repetition, (2) a PUCCH or a PUSCH including one TB, and (3) a PUCCH or a PUSCH including different TBs. The UE may determine a TDW to be applied to PUCCH or PUSCH transmission by using the following methods on the basis of explicit/implicit information received from the base station.

As a first method, the UE may receive explicit information of the length of a TDW from the base station. The explicit information may be received through a higher-layer signal (e.g., an RRC signal). The length of the TDW may include the number of slots, the number of symbols, or the number of repetitions. Here, the number of repetitions includes the number of PUCCH repetitions or the number of PUSCH repetitions. When the UE has received information on the length of the TDW from the base station, the UE may transmit a DMRS for the PUCCH or the PUSCH so as to satisfy a joint channel estimation condition in the TDW having the corresponding length. For example, the UE may maintain phase continuity and power consistency of DMRSs over multiple slots/repetitions in the TDW.

When the UE has received information on the length of the TDW, a time point at which the length of the TDW is to be applied. This may be determined by one of the following methods.

- The length of the TDW may be applied from the first symbol of the first slot of radio frame index 0. For example, when the TDW length is given as five slots, five slots from the first slot of radio frame index 0 may be grouped and determined as the TDW. Here, the index of the first slot of radio frame index 0 is 0.
- The TDW length may be applied from the first uplink symbol of the first uplink slot of radio frame index 0. Here, the uplink slot indicates a slot including only uplink symbols. For example, when the TDW length is given as five slots, five slots from the first uplink slots of radio frame index 0 may be grouped and determined as the TDW.
- The TDW length may be applied from the first non-downlink symbol of the first non-downlink slot of radio frame index 0. Here, the non-downlink slot indicates a slot including at least one non-downlink symbol, and the non-downlink symbol indicates a symbol that is not a downlink symbol. Specifically, if the type of a symbol is a downlink symbol, an uplink symbol, or a flexible symbol, the non-downlink symbol indicates an uplink symbol or a flexible symbol. For example, if the TDW length is given as five slots, five slots from the first non-downlink slots of radio frame index 0 may be grouped and determined as the TDW.
- The UE may receive a configuration of an offset value for a starting point of the TDW length. Here, the offset value may be given as the number of slots, the number of symbols, or the number of repetitions. For example, if X slots/symbols/repetitions are given as the offset value of the starting point of the TDW length, the UE may group as many slots/symbols/repetitions from the TDW length after X slots/symbols/repetitions from the starting point, so as to determine the TDW. Here, offset value X is shorter than the length of the TDW. Here, the starting point may be determined according to the example above.
- In a case of PUSCH repetition or PUCCH repetition transmission, the TDW length may be determined from a slot at which the corresponding repetition transmission starts. Here, the PUSCH repetition transmission may include PUSCH repetition transmission type A or PUSCH repetition transmission type B including the same TB. The PUCCH repetition transmission may include the same UCI, and may include PUCCH repetition transmission transmitted in the same PUCCH format.
- In a case of a PUSCH which includes one TB and has a TBS determined with reference to multiple slots, the TDW length may be applied from the first slot in which the corresponding PUSCH transmission starts.
- If a PUSCH which includes one TB and has a TBS determined with reference to multiple slots is repetitively transmitted, the TDW length may be applied from the first slot in which the repetition transmission of the corresponding PUSCH starts.

Figure 38:
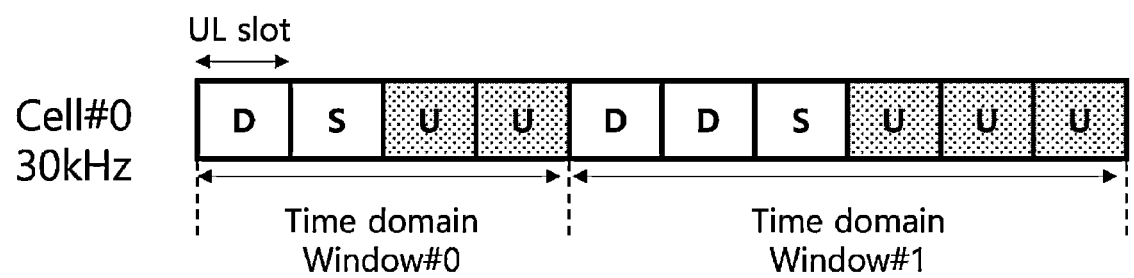
FIG. 38 illustrates a TDW determination method according to an example of the present disclosure.

As another example of the first method, the UE may receive a configuration of one or more TDW lengths. Referring to FIG. 38, when the UE receives TDD configuration, two patterns may be configured for the UE. Here, the two patterns have separate periods, respectively. A first pattern of period is called P, and a second pattern of period is called P2. For reference, P+P2 needs to be one of divisors of 20 ms. Each of the patterns may include a DL symbol, a UL symbol, and a flexible symbol. For reference, the symbols may be positioned in each of the patterns in the sequence of the DL symbol, the flexible symbol, and the UL symbol. For example, referring to FIG. 38, it is assumed that the UE has received configuration of TDD configuration periods P=2 ms and P2=3 ms of a cell, and received a configuration that subcarrier spacing of the TDD configuration is 30 kHz. In this case, it may be difficult to satisfy two patterns with one TDW length. To this end, the UE may receive a configuration of two TDW lengths. Here, the first TDW length may include X1 slots/symbols/repetitions, and the second TDW length may include X2 slots/symbols/repetitions. The UE may configure X slots/symbols/repetitions from a point at which the TDW starts as TDW #0, and may configure the next X2 slots/symbols/repetitions as TDW #1. Such TDWs having different lengths may be repeated. For reference, a value of X1 or X2 may be explicitly configured for the UE by the base station. In another example, the UE may infer the TDD configuration from P and P2 without explicit configuration for the UE by the base station. That is, X1 corresponds to slots/symbols/repetitions corresponding to period P, and X2 corresponds to slots/symbols/repetitions corresponding to period P2.

As a second method, TDW-related information (e.g., a TDW length) may be determined on the basis of implicit information without receiving explicit information of a TDW. When receiving no explicit information of a TDW, the UE may implicitly determine to apply the TDW in a specific interval. The implicit information may include the following items.

Figure 21:
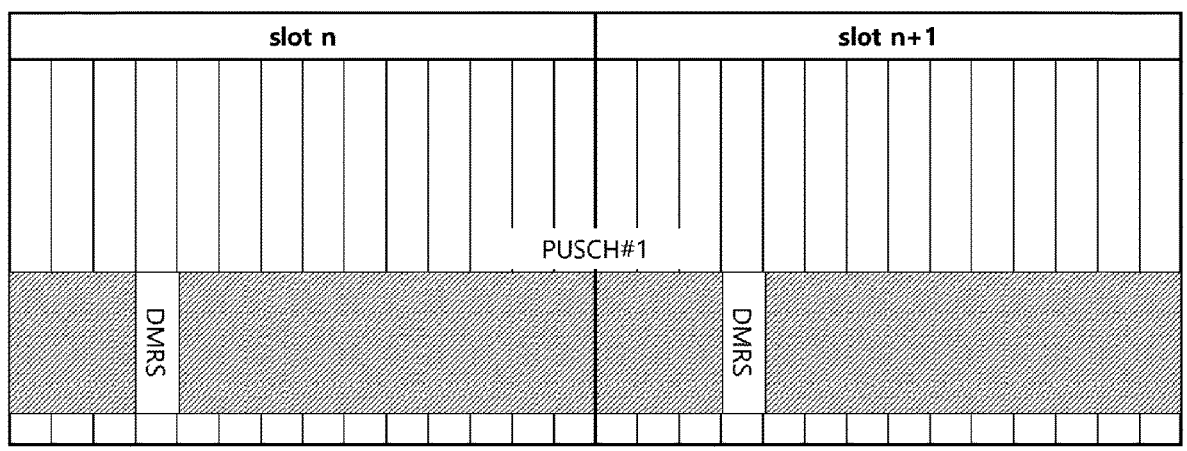
FIG. 21 illustrates scheduling of one physical uplink shared channel.

- Number (e.g., N) of PUCCH or PUSCH repetitions: When the UE has received configuration or indication that a PUCCH or a PUSCH is to be repetitively transmitted, the UE may determine to transmit a PUSCH or a PUCCH by applying the TDW to an interval between a time point at which repetition transmission starts (e.g., slot/symbol) and a time point (e.g., slot/symbol) at which repetition transmission ends. Here, a time interval in which PUCCH or PUSCH repetition transmission is performed may be determined on the basis of the number N of PUCCH or PUSCH repetitions. Accordingly, the TDW length may be determined on the basis of the number of slots associated with the number of PUCCH or PUSCH repetitions, for example, the number of slots including PUCCH or PUSCH repetition transmissions. For example, referring to FIGS. 22 and 23, the TDW length may be determined by the length of a time interval associated with the number (e.g., N) of uplink channel repetitions, for example, the length (e.g., the number of slots) of (consecutive) time intervals including uplink channel repetitions. Referring to FIG. 21, when a TBS is determined with reference to multiple slots (e.g., K), the TDW length may be determined by the length of a time interval related to uplink transmission corresponding to K*N, for example, the length (e.g., the number of slots) of a time interval including uplink transmission corresponding to K*N. Here, the length of a time interval including uplink transmission may be determined by the number of slots or the number of symbols from a time point at which uplink channel repetition transmission starts to a time point at which the repetition transmission ends (on the basis of N). That is, the TDW length may be understood as the number of (consecutive) slots or symbols of the whole interval including the uplink channel repetition transmission. For example, referring to FIG. 27, the TDW length may be determined by the number of consecutive slots from a time point (slot n) at which PUCCH repetition transmission starts to a time point (slot n+4) at which the repetition transmission ends. Accordingly, the UE may transmit the repetitively transmitted PUCCHs or PUSCHs so that joint channel estimation is possible.

Slot configuration: The TDW may be determined according to a slot configuration of the UE in unpaired spectrum. For example, the TDW may include consecutive uplink slots (including uplink channel (repetition) transmissions, for example, in which uplink channel (repetition) transmissions are performed). Here, an uplink slot is a slot including only uplink symbols. In another example, the TDW may include consecutive non-downlink slots (including uplink channel (repetition) transmissions, for example, in which uplink channel (repetition) transmissions are performed). Here, the non-downlink slot indicates a slot including at least one non-downlink symbol, and the non-downlink symbol indicates a symbol that is not a downlink symbol. More specifically, if the type of a symbol is a downlink symbol, an uplink symbol, or a flexible symbol, the non-downlink symbol indicates an uplink symbol or a flexible symbol.

According to the second method, when the same TDW is determined for consecutive non-downlink slots together with consecutive uplink slots, the UE may receive a configuration from the base station so as to monitor a PDCCH in a flexible symbol within the non-downlink slot or receive a downlink signal (e.g., CSI-RS). In this case, when a PDCCH or a downlink signal is received in the corresponding symbol, it is difficult to satisfy a joint channel estimation condition (e.g., phase continuity and power consistency) between a symbol in which the PDCCH or downlink signal is received and a symbol in which the PUSCH is transmitted. Accordingly, when the TDW for uplink joint channel estimation is determined in consideration of consecutive non-downlink slots together with consecutive uplink slots, slots or symbols in which the UE is configured to monitor the PDCCH or receive the downlink signal in the flexible symbol of the non-downlink slot may not be determined to have the same TDW as preceding or subsequent consecutive uplink slots or non-downlink slots. That is, the TDW may be configured to end before a flexible symbol in which the UE is configured to monitor the PDCCH in the non-downlink slot or receive the downlink signal (e.g., terminate the existing maintenance of phase continuity and power consistency), and the TDW may be configured to start after a flexible symbol in which the UE is configured to monitor or receive the downlink signal or the PDCCH in the non-downlink slot (i.e., start new maintenance of phase continuity and power consistency).

However, when a symbol in which the UE is configured to monitor the PDCCH or receive the downlink signal is overlapped with a symbol in which it is indicated to transmit the PUSCH through DCI format 0_0, 0_1, or 0_2 as dynamic scheduling, the UE may transmit the PUSCH and cancel reception of the PDCCH or the downlink signal in the corresponding slot. In this case, even though the UE may transmit the PUSCH to enable joint channel estimation in preceding or subsequent consecutive uplink slots and consecutive non-downlink slots in which the PUSCH is transmitted, the non-downlink slot including the symbol in which the UE is configured to monitor the PDCCH or receive the downlink signal cannot be configured to have the same TDW as the preceding or subsequent consecutive non-downlink slots including PUSCH transmission. The UE may fail to perform PUSCH transmission satisfying the joint channel estimation condition. Accordingly, the base station may fail to perform joint channel estimation.

Figure 53:
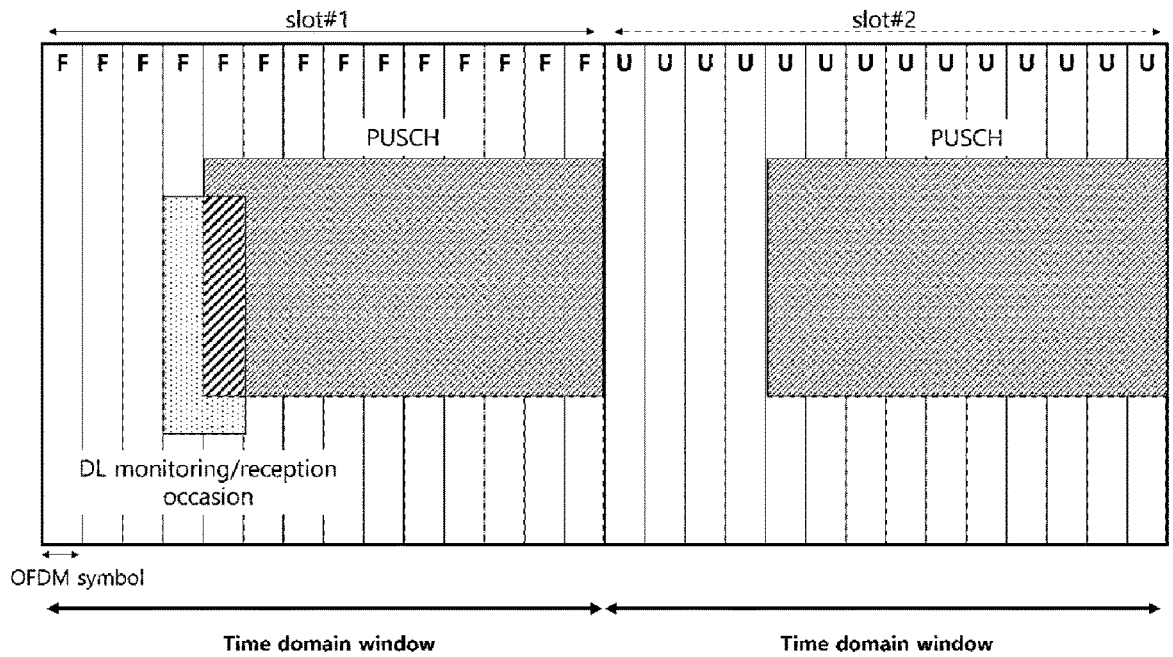
FIG. 53 illustrates a problem occurring when a UE determines a TDW.

For example, referring to FIG. 53, the UE may be indicated through DCI format 0_0, 0_1, or 0_2 as dynamic scheduling to transmit the PUSCH in repetition transmission type A for two slots from slot #1. In this case, slot #1 and slot #2 are consecutive non-downlink and uplink slots. The UE may be configured to monitor the PDCCH in the flexible symbol of slot #1 corresponding to the non-downlink slot, or receive the downlink signal. In this case, the same TDW may not be configured for slot #1 and slot #2. The UE cancels PDCCH or downlink signal reception and transmits the PUSCH in the symbol in which the UE is configured to monitor the PDCCH and receive the downlink signal in slot #1, and thus joint channel estimation is possible for PUSCH transmission of slot #1 and slot #2. However, the same TDW cannot be determined for slot #1 and slot #2 according to the TDW determination method (second method), and thus the UE does not need to satisfy the joint channel estimation condition when performing PUSCH repetition transmission. In addition, even though the joint channel estimation condition is satisfied and the UE transmits the DMRS when performing the PUSCH repetition transmission, the base station expects that the joint channel estimation condition is to be satisfied only within the TDW. Accordingly, the base station may not perform joint channel estimation for the PUSCH repetition transmission transmitted by the UE.

To solve the above-described problem, according to an example of the disclosure, the UE may be configured to monitor a PDCCH or receive a downlink signal in a flexible symbol, and may be configured to configure a TDW as follows according to whether the corresponding symbol is overlapped with a symbol in which PUSCH transmission is indicated through DCI format 0_0, 0_1, or 0_2 as dynamic scheduling.

Figure 54:
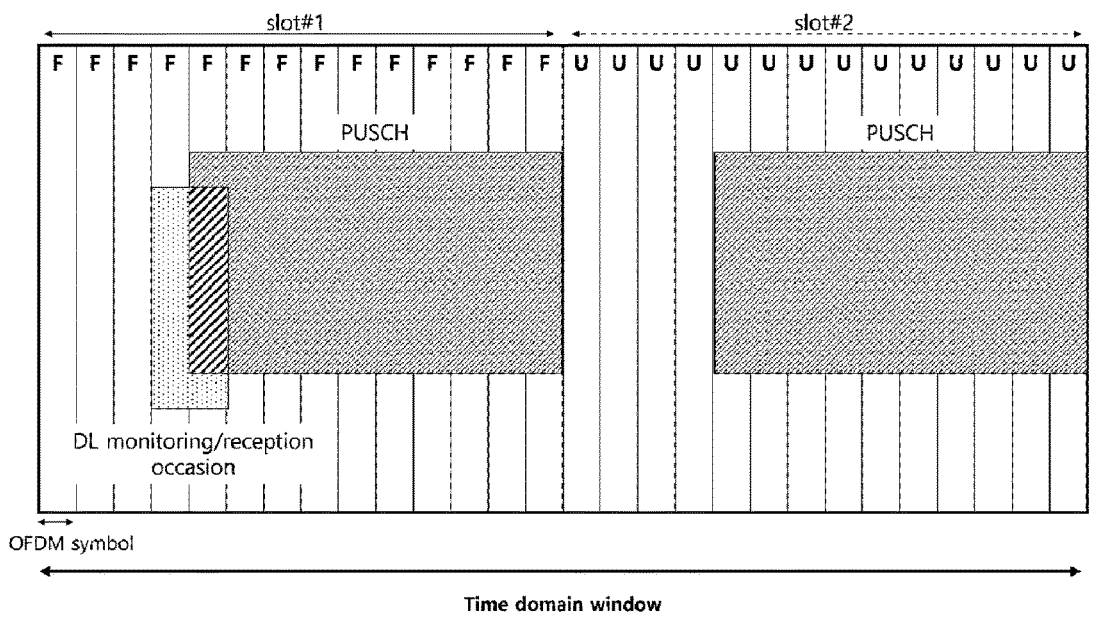
FIG. 54 illustrates a method for determining a TDW according to an example of the present disclosure.

When the symbol in which the UE is configured to monitor the PDCCH or receive the downlink signal is overlapped with the symbol in which dynamically scheduled PUSCH transmission is indicated, the PDCCH or the downlink signal is not received in the corresponding slot or symbol. Accordingly, preceding or subsequence consecutive uplink slots and consecutive non-downlink slots may be configured to have the same TDW. Accordingly, phase continuity and power consistency of DMRSs may be maintained over the preceding or subsequent consecutive uplink slots and consecutive non-downlink slots. For example, referring to FIG. 54, the symbol in which the UE is configured to monitor the PDCCH or receive the downlink signal in slot #1 is overlapped with the symbol in which dynamically scheduled PUSCH transmission is indicated, and thus the PUSCH transmission is prioritized and the UE does not perform the reception of the PDCCH or the downlink signal. Accordingly, when the UE determines the same TDW for slot #1 and slot #2 and performs PUSCH repetition transmission, the UE may perform transmission to satisfy a condition for joint channel estimation.

Figure 55:
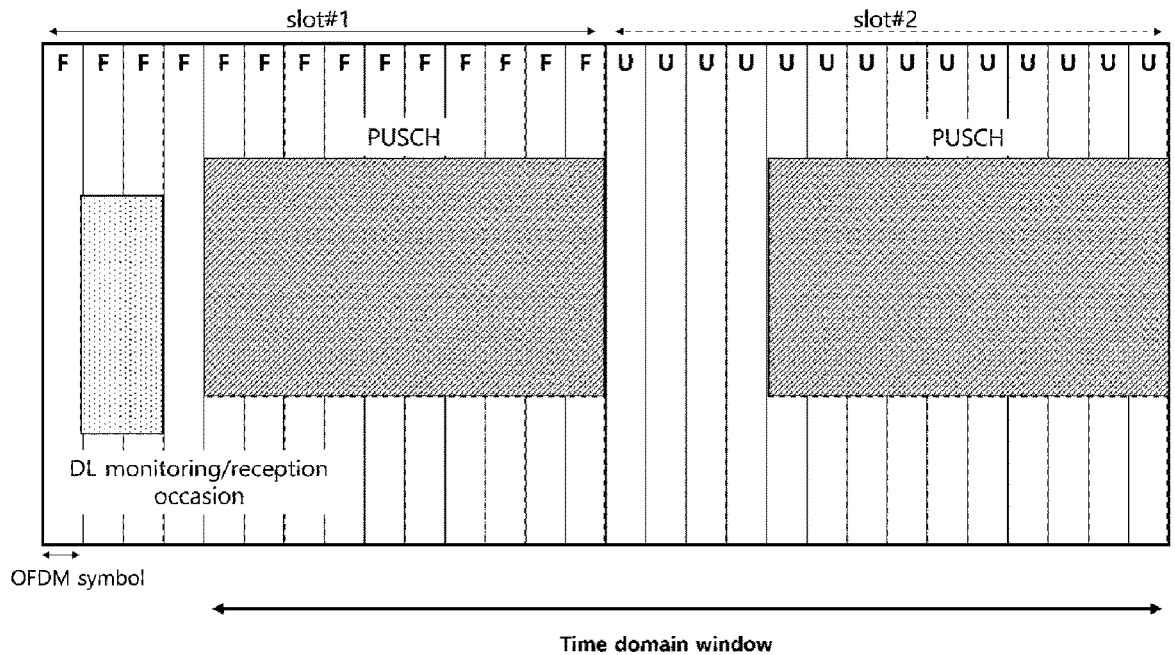
FIG. 55 illustrates a method for determining a TDW according to an example of the present disclosure.

When the symbol in which the UE is configured to monitor the PDCCH or the receive the downlink signal is not overlapped with the dynamically scheduled PUSCH transmission symbol, the configuration for joint channel estimation is satisfied in the corresponding slot except for the symbol in which the PDCCH or the downlink signal is received, and thus the UE may perform the PUSCH transmission. Accordingly, the UE may configure the subsequent consecutive uplink slots and consecutive non-downlink slots to have the same TDW, except for the symbol in which the PDCCH or the downlink signal is received in the corresponding slot. For example, referring to FIG. 55, when the symbol in which the UE is configured to monitor the PDCCH or receive the downlink signal in slot #1 is not overlapped with the symbol in which the PUSCH transmission is included, the PDCCH or the downlink signal may be received. Accordingly, after excluding the symbol in which the PDCCH or the downlink is received from slot #1, when the UE determines the subsequent symbol and slot #2 as the TDW and performs PUSCH repetition transmission, the UE may perform transmission to satisfy the condition for joint channel estimation.

Figure 56:
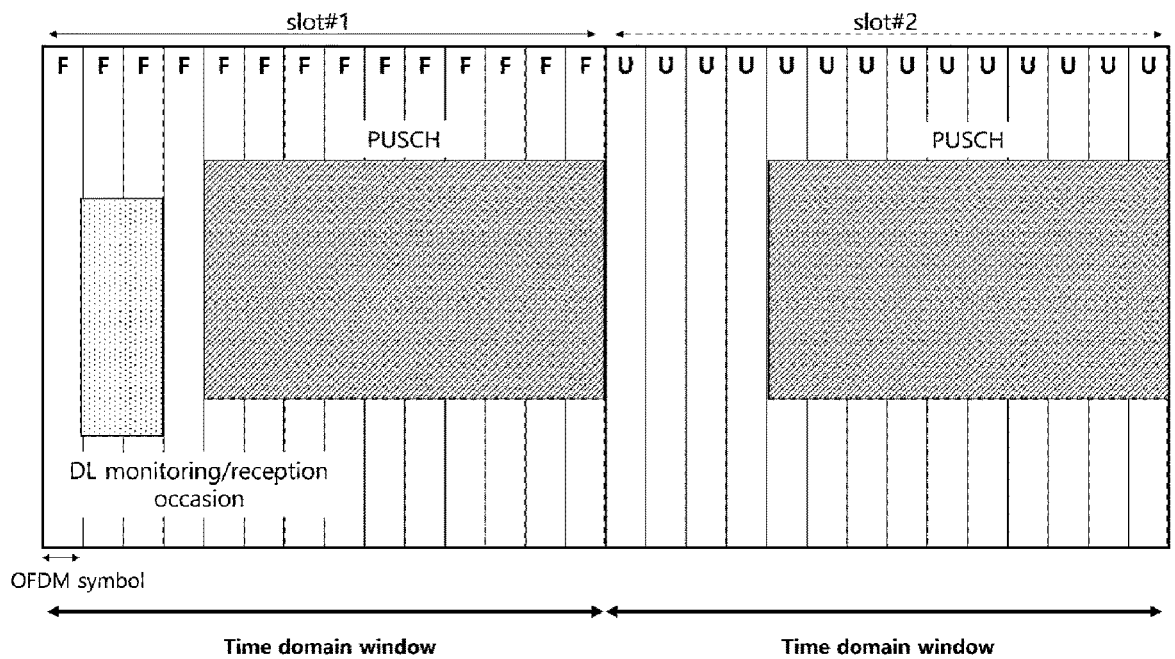
FIG. 56 illustrates a method for determining a TDW according to an example of the present disclosure.

When the symbol in which the UE is configured to monitor the PDCCH or receive the downlink signal is not overlapped with the PUSCH transmission symbol dynamically scheduled in the same slot, the PDCCH or the downlink signal is received in the corresponding slot, and thus it is difficult to satisfy the condition for joint channel estimation. Accordingly, in the corresponding slot, the preceding or subsequent consecutive uplink slots and consecutive non-downlink slots may not be configured to have the same TDW. For example, referring to FIG. 56, even though the symbol in which the UE is configured to monitor the PDCCH or receive the downlink signal in slot #1 is not overlapped with the symbol in which dynamically scheduled PUSCH transmission is indicated in the same slot, the UE performs reception of the PDCCH or the downlink signal in the corresponding slot, and thus the corresponding slot is not configured to be the same TDW for performing joint channel estimation. Accordingly, when the UE determines slot #1 and slot #2 as different TDWs and performs PUSCH repetition transmission, the condition for joint channel estimation may not need to be satisfied.

The method of determining the TDW according to whether, in a case where the UE is configured to monitor the PDCCH or receive the downlink signal in the flexible symbol, the corresponding symbol is overlapped with the symbol in which the PUSCH transmission is indicated through DCI format 0_0, 0_1, or 0_2 as dynamic scheduling, may be applied from a slot after excluding the first slot in which the dynamically scheduled PUSCH transmission starts. In other words, in a case where the base station dynamically performs PUSCH scheduling for the UE, when the base station designates the first slot in which the dynamically scheduled PUSCH transmission starts, the UE may assume that the base station has performed the scheduling for the UE while excluding the slot or the symbol in which the UE is configured to perform monitoring or receive the downlink signal. Accordingly, in the slot indicated by a K2 value corresponding to an offset value between the slot in which the PDCCH is received and the slot in which the UE transmits the PUSCH, the UE may configure the same TDW for the subsequent consecutive uplink slots and consecutive non-downlink slots, regardless of whether the symbol in which the UE is configured to monitor the PDCCH or receive the downlink signal is overlapped with the symbol in which the PUSCH is transmitted through DCI format 0_0, 0_1, or 0_2.

On the other hand, the base station may intentionally configure overlapping for the UE even from the first slot according to the scheduling of the base station. Accordingly, the method of determining the TDW according to whether, in a case where the UE is configured to monitor the PDCCH or receive the downlink signal in the flexible symbol, the corresponding symbol is overlapped with the symbol in which PUSCH transmission is indicated through DCI format 0_0, 0_1, or 0_2 as dynamic scheduling, may be applied from the slot including the first slot in which the dynamically scheduled PUSCH transmission starts.

When the channel for joint channel estimation corresponds to PUSCH or PUCCH repetition transmission in the second method, the TDW length may be applied from the slot in which the corresponding repetition transmission starts. Here, the PUSCH repetition transmission may include PUSCH repetition transmission type A or PUSCH repetition transmission type B including the same TB. In addition, the PUCCH repetition transmission may include the same UCI, and may include PUCCH repetition transmission transmitted in the same PUCCH format. In addition, when the channel for joint channel estimation includes one TB and the PUSCH having the TBS determined with reference to multiple slots is transmitted in the second method, the TDW length may be applied from the first slot in which the corresponding PUSCH transmission starts. In addition, when the channel for joint channel estimation includes one TB and the PUSCH having the TBS determined with reference to multiple slots is repeatedly transmitted in the second method, the TDW length may be applied from the first slot in which the corresponding PUSCH repetition transmission starts.

In the second method, the consecutive uplink slots and consecutive non-downlink slots may include a maximum X of slot/symbols of gap between the consecutive slots. Here, X slots/symbols of gap may include a slot/symbol not used for uplink transmission. That is, the UE may determine the TDW with reference to non-consecutive uplink slots or non-consecutive non-downlink slots including X slots/symbols. X may be a value configured from the base station.

In the second method, when explicit information of the TDW is not received and the TDW (length) is thus determined on the basis of implicit information, a single TDW may be applied for too many slots. Here, the TDW (length) may be determined on the basis of the number (e.g., N) of PUCCH or PUSCH repetition transmissions, or may be configured on the basis of slot configuration. For example, the TDW (length) may be determined on the basis of a time-domain interval (e.g., slot interval/number) in which PUSCH or PUCCH repetition transmission is indicated, and/or may be determined on the basis of the consecutive uplink slots or consecutive non-downlink slots (including uplink channel (repetition) transmission). When a single TDW is applied for too many slots, the complexity of the UE or the base station may be increased. Accordingly, the single TDW may be divided into multiple sub TDWs. Here, joint channel estimation is possible for the PUSCH or the PUCCH included in the sub TDWs. Here, the sub TDWs correspond to final/individual TDWs. The UE may divide the single TDW into multiple sub TDWs on the basis of information below.

According to first information, a single TDW may be divided into multiple sub TDWs on the basis of a sub TDW length. The UE may receive information on one sub TDW length, and divide the TDW into as many sub TDWs as the corresponding length. The length may include the number of slots, the number of symbols, or the number of repetition transmissions. More specifically, the TDW may include N slots/symbols/repetitions (slot/symbol/repetition 0, slot/symbol/repetition 1, . . . , and slot/symbol/repetition N−1), and the sub TDW length may be given as M slots/symbols/repetitions. In this case, the UE may determine one sub TDW by grouping slot/symbol/repetition 0, slot/symbol/repetition 1, . . . , and slot/symbol/repetition M−1, determine another sub TDW by grouping slot/symbol/repetition M, slot/symbol/repetition M+1, . . . , and slot/symbol/repetition 2*M−1, . . . , and determine another sub TDW by grouping slot/symbol/repetition k*M, slot/symbol/repetition k*M+1, . . . , and slot/symbol/repetition N. Here, the slots/symbols/repetitions included in the last sub TDW may be less than M slots/symbols/repetitions. Here, k=floor(N/M).

According to second information, a single TDW may be divided into multiple sub TDWs on the basis of the number of sub TDWs. The UE may receive information on the number of sub TDWs corresponding to the single TDW and divide the single TDW into as many sub TDWs as the received number of sub TDWs. More specifically, the TDW may include slots/symbols/repetitions (slot/symbol/repetition 0, slot/symbol/repetition 1, . . . , and slot/symbol/repetition N−1), and the number of sub TDWs may be given as M. In this case, in one method, the number of slots/symbols/repetitions included in one sub TDW may be ceil (N/M) or floor(N/M). More specifically, N mod M sub TDWs may include ceil(N/M) slots/symbols/repetitions, and M-(N mod M) sub TDWs may include floor(N/M) slots/symbols/repetitions. In another method, the number of slots/symbols/repetitions included in M−1 sub TDWs may be floor(N/M), and the number of slots/symbols/repetitions included in one sub TDW may be N−(M−1)*floor(N/M).

According to third information, the single TDW may be divided into multiple sub TDWs on the basis of a maximum interval. Here, the maximum interval is a maximum time-domain interval in which the UE can maintain the condition for enabling the base station to perform joint channel estimation, and may be determined according to UE capability. That is, the maximum interval may mean a maximum time interval in which the UE can maintain the phase continuity and power identity/consistency of DMRSs according to the UE capability. Accordingly, the maximum interval may not be a value explicitly configured from the base station. The unit of the maximum interval may include the number of slots/symbols/repetitions. The UE capability may be provided to the base station by the UE (e.g., the initial access process). When the TDW length (e.g., the time-domain interval in which PUSCH or PUCCH repetition transmission is indicated, or the number of consecutive uplink slots or consecutive non-downlink slots) determined on the basis of implicit information in the second method exceeds the maximum interval, the UE may divide the TDW into sub TDWs with reference to the maximum interval. Accordingly, it may be understood that the sub TDWs (or the final TDW) may be determined on the basis of a smaller value between (a) the TDW length determined on the basis of the implicit information according the second method and (b) the maximum interval corresponding to a maximum interval which can be configured by the UE (according to the UE capability). Specifically, it is assumed that the TDW includes N slots/symbols/repetitions (slot/symbol/repetition 0, slot/symbol/repetition 1, . . . , and slot/symbol/repetition N−1), and the maximum interval is M slots/symbols/repetitions. Here, in a case of M<N, the UE may determine one sub TDW by grouping slot/symbol/repetition 0, slot/symbol/repetition 1, . . . , and slot/symbol/repetition M−1, determine another sub TDW by grouping slot/symbol/repetition M, slot/symbol/repetition M+1, . . . , and slot/symbol/repetition 2*M−1, . . . , and determine another sub TDW by grouping slot/symbol/repetition (k−1)*M, slot/symbol/repetition (k−1)*M+1, . . . , and slot/symbol/repetition N−1. Here, the slots/symbols/repetitions included in the last sub TDW may be less than M slots/symbols/repetitions. Here, k=floor(N/M).

Figure 58:
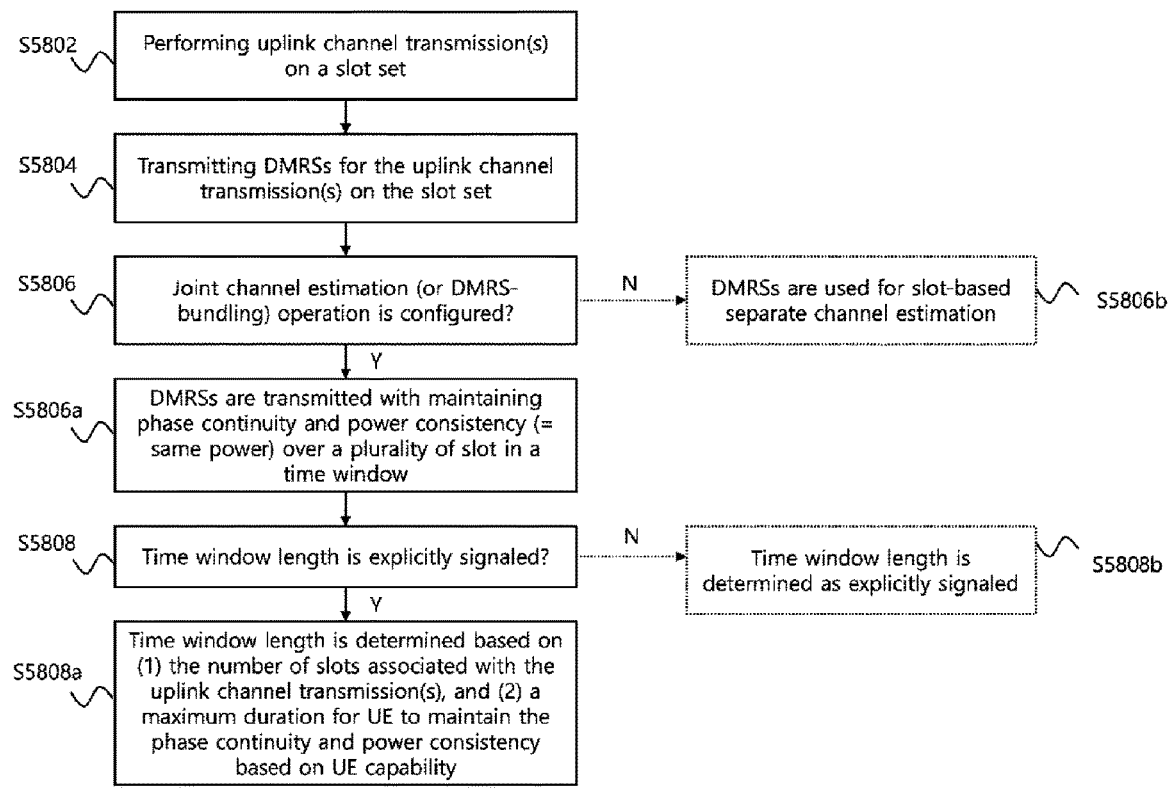

FIGS. 58 and 59 illustrate uplink channel transmission according to an example of the disclosure.

Referring to FIG. 58, the UE may perform (repetition) transmission of an uplink channel on a slot set (S5802). In addition, the UE may transmit DMRSs of the (repetition) transmission of the uplink channel on the slot set (S5804). In this case, when a joint channel estimation operation is configured (S5806), the DMRSs may be transmitted over multiple consecutive slots within a time window (e.g., TDW) so as to maintain phase continuity and power consistency (S5806a). In this case, the base station may perform a joint coding channel on the basis of the DMRSs on the multiple consecutive slots within the time window. The demodulation performance of the uplink channel can be enhanced on the basis of a result of the joint coding channel, and coverage can be improved. When the length of the time window is not configured by the base station (e.g., is not explicitly indicated) (S5808), the time window (e.g., the length of the time window) may be determined on the basis of the following information (S5808a). For example, the length of the time window may be determined on the basis of a smaller value among the following values:

(1) the number N of slots including transmission of the uplink channel; and
(2) a maximum number M of slots in which the UE can maintain phase continuity and power consistency according to UE capability.

Referring to FIG. 59, the length of the time window may be determined on the basis of M in a case of M<N, may be determined on the basis of N in a case of M≥N (FIG. 59b).

When the joint channel estimation operation is not configured (S5806), the DMRSs may be used for slot-based separate channel estimation (S5806b). In addition, when the length of the time window is configured by the base station (e.g., high-layer signaling) (S5808), the length of the time window may be determined as being configured by the base station (S5808b).

Here, N may correspond to the number of slots from a slot at which (repetition) transmission of the uplink channel starts to a slot at which (repetition) transmission of the uplink channel ends. In addition, N may correspond to the number of consecutive slots for (repetition) transmission of the uplink channel. In addition, the uplink channel may include PUCCH repetition transmission or PUSCH repetition transmission. In addition, the uplink channel may include PUSCH repetition transmission type A, PUSCH repetition transmission type B, PUSCH transmission having a transport block size (TBS) determined with reference to multiple slots, or PUSCH repetition transmission a TBS determined with reference to multiple slots.

Next, a method for determining a slot to which the UE applies a TDW so that the base station can perform joint channel estimation is described. When the UE determines the length of the TDW according to the first method and the second method, the slot to which the UE applies a TDW may be determined as follows.

Physical slot-based determination method: The UE may determine a slot to which the TDW is applied on the basis of a physical slot. Specifically, the UE may apply the TDW length determined according to the first method and the second method during consecutive physical slots from a time point at which the TDW starts.

Figure 51:
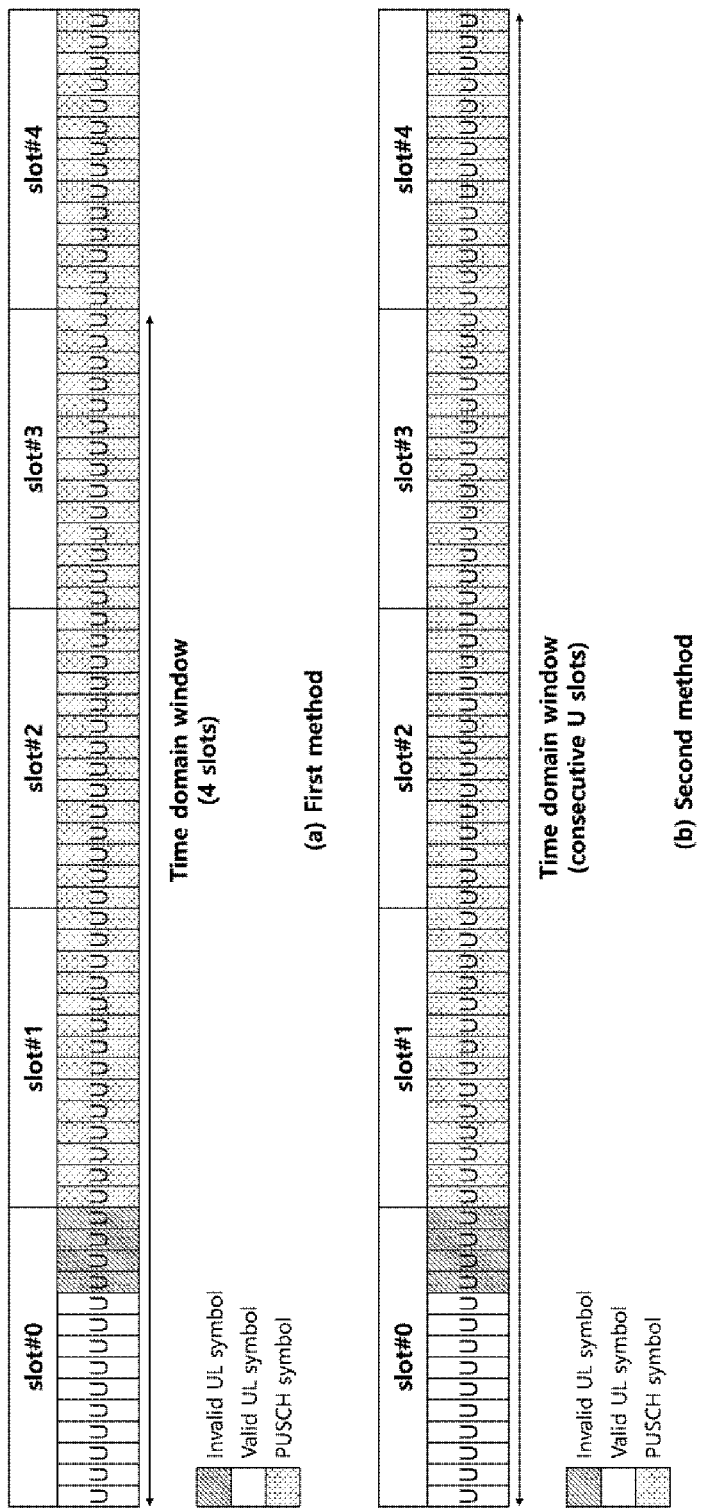
FIG. 51 illustrates a method for determining a slot to which a TDW is applied according to an example of the present disclosure.

For example, referring to FIG. 51a, the UE may be configured to repetitively transmit the PUSCH during slots from slot #0 to 4. In addition, according to the first method, the TDW length may be explicitly indicated to be four slots. Accordingly, the UE may determine one of four slots corresponding to slot #0, slot #1, slot #2, and slot #3. In this case, PUSCH transmission is impossible in slot #0, and thus the UE may defer and perform PUSCH repetition transmission. However, the TDW is based on four physical slots from a time point at which start of PUSCH repetition transmission is indicated, and thus the PUSCH repetition transmission in slot #4 may not include the same TDW. That is, actual PUSCH repetition transmission from the UE is performed in slot #1, slot #2, slot #3, and slot #4, but joint channel estimation by the base station is performed in slot #0, slot #1, slot #2, and slot #3, and thus it is difficult to acquire a gain through joint channel estimation for the PUSCH repetition transmission in slot #4. The UE may maintain/satisfy, with reference to the TDW, the condition (e.g., phase continuity and power consistency) for enabling the base station to perform joint channel estimation. In this case, the UE may maintain the joint channel estimation condition in slot #0, slot #1, slot #2, and slot #3. Accordingly, the UE may perform PUSCH transmission to maintain the joint channel estimation condition only in slot #1, slot #2, and slot #3 in which the actual PUSCH repetition transmission occurs, and the PUSCH transmitted in deferred slot #4 may be transmitted to the base station regardless of the joint channel estimation condition.

For example, referring to FIG. 51b, the UE may be configured to repetitively transmit the PUSCH for four slots from slot #0. In addition, according to the second method, the length of the TDW may be determined with reference to consecutive uplink slots. Accordingly, the UE may determine, as one TDW, five slots corresponding to slot #0, slot #1, slot #2, slot #3, and slot #4. In this case, PUSCH transmission is impossible in slot #0, and thus the UE may defer the PUSCH repetition to slot #4 and perform transmission. However, the TDW is based on consecutive uplink slots from a time point at which start of the PUSCH repetition transmission is indicated, and thus slot #0 not including the actual PUSCH repetition transmission may be included in the TDW. That is, the UE performs the actual PUSCH repetition transmission in slot #1, slot #2, slot #3, and slot #4, but slot #0, slot #1, slot #2, slot #3, and slot #4 are determined to have the same TDW. Accordingly, when another uplink signal/channel transmission is indicated in slot #0, it may be difficult for the UE to satisfy the condition for joint channel estimation. The UE may maintain/satisfy, with reference to the TDW, the condition (e.g., phase continuity and power consistency) for enabling the base station to perform joint channel estimation. In this case, the UE may maintain the joint channel estimation condition in slot #0, slot #1, slot #2, slot #3, and slot #4. Accordingly, the UE may perform PUSCH transmission to maintain the joint channel estimation condition in slot #1, slot #2, slot #3, and slot #4 in which the actual PUSCH repetition transmission occurs. Accordingly, for the PUSCH transmitted in deferred slot #4, the UE may transmit the PUSCH to the base station while maintaining the joint channel estimation condition. However, for another uplink signal/channel transmission, it is difficult to satisfy the condition enabling the base station to perform joint channel estimation. Accordingly, for uplink signal/channel transmission other than the same PUSCH repetition transmission in slot #0, the UE may perform uplink signal/channel transmission to the base station regardless of the condition for enabling the joint channel estimation to be performed.

Available slot-based determination method: The UE may determine, on the basis of a slot in which PUSCH transmission is possible, a slot to which the TDW is applied. Specifically, the UE may apply the TDW length determined according to the first method and the second method for slots in which actual PUSCH transmission is possible from a time point at which the TDW starts. Here, the slot in which the PUSCH transmission is possible refers to a slot in which time and frequency domain resources configured or indicated for PUSCH transmission are available for PUSCH transmission in the corresponding slot. In other words, the slot to which the TDW is applied may include only a slot in which PUSCH transmission is possible among consecutive uplink slots and consecutive non-downlink slots.

Figure 52:
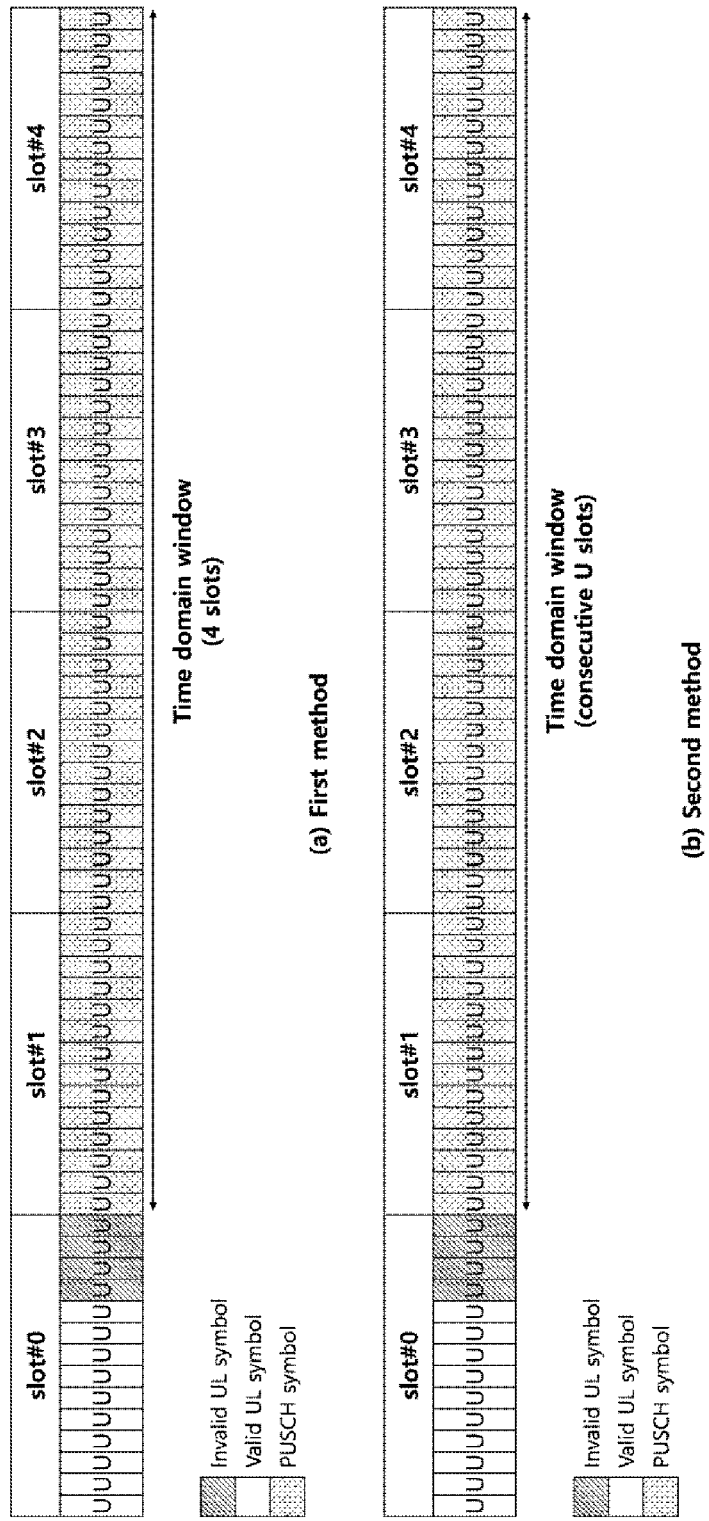
FIG. 52 illustrates a method for determining a slot to which a TDW is applied according to an example of the present disclosure.

For example, referring to FIG. 52a, the UE may be configured to repetitively transmit the PUSCH for four slots from slot #0. In addition, according to the first method, the TDW length may be explicitly indicated as four slots. In this case, the indicated PUSCH transmission is impossible in slot #0, and thus the UE may defer PUSCH repetition to slot #4 and perform transmission. In this case, the UE may determine the slots to which the TDW is applied as slot #1, slot #2, slot #3, and slot #4 with reference to the slot in which the actual PUSCH repetition transmission is possible. In this method, all PUSCH repetition transmissions are included in the same TDW, and thus the performance enhancement can be expected through joint channel estimation for uplink PUSCH transmission by the base station. The UE maintains/performs, with reference to the slots included in the TDW, the condition (e.g., phase continuity and power consistency) for enabling the base station to perform joint channel estimation. In this case, the UE may perform transmission while maintaining the joint channel estimation condition in slot #1, slot #2, slot #3, and slot #4 in which the actual PUSCH repetition transmission occurs. That is, the UE may transmit the PUSCH to the base station while maintaining the joint channel estimation condition also in slot #4 so that the base station can perform joint channel estimation also for the PUSCH transmitted in deferred slot #4.

For example, referring to FIG. 52b, the UE may be configured to repetitively transmit the PUSCH for four slots from slot #0. In addition, according to the second method, the TDW length may be determined with reference to consecutive uplink slots. Here, the TDW length according to the second method may be from slot #0 to slot #4. In this case, PUSCH transmission is impossible in slot #0, and thus the UE may defer the PUSCH repetition to slot #4 and perform transmission. The UE may determine the slots to which the TDW is applied to be slot #1, slot #2, slot #3, and slot #4 with reference to the slot in which the actual PUSCH repetition transmission including the same TB is possible. In this method, only the PUSCH repetition transmission including the same TB, except for another uplink signal/channel, is to be included in the same TDW, and thus the condition for joint channel estimation can be satisfied. The UE may perform, with reference to the slots included in the TDW, the condition (e.g., phase continuity and power consistency) for enabling the base station to perform joint channel estimation. In this case, the UE may perform PUSCH transmission while maintaining the joint channel estimation condition in slot #1, slot #2, slot #3, and slot #4 in which the actual PUSCH repetition transmission including the same TB occurs. That is, the UE may transmit the PUSCH while maintaining the joint channel estimation condition also in slot #4 so that the base station can perform joint channel estimation also for the PUSCH transmitted in deferred slot #4. However, in a case of another uplink signal/channel transmission, except for the PUSCH repetition transmission including the same TB within the TDW length determined with reference to consecutive uplink slots according to the second method, the UE performs uplink signal/channel transmission to the base station regardless of the condition for enabling the base station to perform joint channel estimation.

Frequency Hopping and Joint Channel Coding

In the description above, during frequency hopping of the UE, a specific number M corresponding to a hopping interval which may be included in one frequency hop and a TDW length corresponding to a time interval for joint channel estimation may be separately configured. For convenience of description, hereinafter, the TDW explicitly or implicitly configured (by the base station) is called L.

The base station may configure, for the UE, whether DMRSs used for PUSCH or PUCCH transmission of the UE are bundled, so that the base station can perform joint channel estimation when the UE transmits the PUSCH or the PUCCH. That is, the UE may be configured by the UE so that DMRS bundling for PUSCH or PUCCH transmission is to be enabled (DMRS-Bundling=enable) or disabled (DMRS-Bundling=disable). When "DMRS-Bundling=enable" is configured, the UE may transmit the PUSCH or the PUCCH to the base station while satisfying the condition for enabling the base station to perform joint channel estimation. When "DMRS-Bundling=disable" is configured, the UE may transmit the PUSCH or the PUCCH to the base station regardless of the condition for enabling the base station to perform joint channel estimation. In the disclosure, the terms "joint channel coding" and "DMRS bundling" may be interchangeably used.

Configuring DMRS bundling to be enabled or disabled for PUSCH or PUCCH transmission so that the base station performs joint channel estimation for the PUSCH or PUCCH transmission performed by the UE may be performed separately from the above-described TDW length L explicitly or implicitly configured from the base station.

The UE may need to determine a TDW and a slot index (repetition transmission slot index) for frequency hopping according to whether M and L are configured. For example, the UE may be configured to enable the joint channel estimation and transmit the PUSCH or the PUCCH via inter-slot frequency hopping. In this case, according to a value configured between M and L from the base station, the UE may need to determine the value to be applied as the TDW length and slot index for frequency hopping. Here, the slot index for frequency hopping may be determined regardless of the joint channel estimation. That is, the UE may perform PUSCH or PUCCH transmission to the base station regardless of the condition for enabling the base station to perform joint channel estimation within the same frequency hop. Specifically, the UE may perform PUSCH or PUCCH transmission to the base station without maintaining phase continuity and power identity/consistency of the DMRSs over multiple slots/symbols/repetitions within the same frequency hop.

Case where both M and L are configured: The slot index for frequency hopping may be determined on the basis of M, and the TDW length for joint channel estimation may be determined on the basis of L.

Case where M is configured and L is not configured: The slot index for frequency hopping may be determined on the basis of M, and the TDW length may be determined on the basis of a TDW default value. Here, the TDW default value may be a smaller value between (a) a maximum interval corresponding to a maximum interval which can be configured by the UE to enable the base station to perform joint channel estimation (on the basis of UE capability) and (b) a timer domain interval in which PUSCH or PUCCH repetition transmission is indicated.

Case where M is not configured and L is configured: The slot index for frequency hopping may be determined on the basis of L, and the TDW length may be determined on the basis of L.

Case where neither M nor L is configured: The slot index for frequency hopping may be determined on the basis of a single slot (M=1), and the TDW length may be determined on the basis of the above-described TDW default value.

When neither M or L is configured, the UE determines the slot index for hopping on the basis of the single slot, and thus PUSCH or PUCCH transmissions in the consecutive slots may be mapped to different frequency hops. Accordingly, it may be difficult to maintain phase continuity and power identity/consistency between PUSCH or PUCCH transmissions in the consecutive slots. Accordingly, even though DMRS-bundling for joint channel estimation by the base station for the PUSCH or PUCCH transmission performed by the UE is configured to be enabled (DMRS-Bundling=enable), cover enhancement of the uplink transmission according to the joint channel estimation cannot be acquired.

Hereinafter, a UE operation for solving this problem is proposed. In this case, the UE operation may vary according to whether DMRS-bundling for performing the joint channel estimation by the base station for the PUSCH or PUCCH transmission performed by the UE is enabled (DMRS-Bundling=enable) or disabled (DMRS-Bundling=disable). The UE operation according to each case is proposed.

(1) First Method

"DMRS-Bundling=disable": When DMRS bundling is disabled, the slot index for frequency hopping may be determined on the basis of a single slot, and the TDW length may be determined on the basis of a TDW default value. Here, the TDW default value may be a smaller value between (a) a maximum interval corresponding to a maximum interval which can be configured by the UE to enable the base station to perform joint channel estimation and (b) a timer domain interval in which PUSCH or PUCCH repetition transmission is indicated. When "'DMRS-Bundling=disable" is configured, the UE may be configured by the base station so that coverage enhancement through joint channel estimation in the base station is prioritized over frequency diversification gain through frequency hopping between PUSCH or PUCCH transmissions. Accordingly, the slot index for frequency hopping may be determined on the basis of the single slot.

"DMRS-Bundling=enable": When DMRS bundling is enabled, both the TDW length and the slot index for frequency hopping may be determined on the basis of the TDW default value. This method corresponds to a method of maximizing coverage enhancement through joint channel estimation in the base station by determining the TDW length and the slot index for frequency hopping on the basis of the maximum interval in which the UE can maintain the channel estimation condition when "DMRS-Bundling=enable" is configured by the base station.

However, in a case of "DMRS-Bundling=enable" of the first method, even though the UE is configured to transmit the PUSCH or the PUCCH by using the inter-slot frequency hopping by the base station, the UE determines the slot index for frequency hopping on the basis of a TDW default value, and thus the UE may fail to perform the frequency hopping between PUSCH or PUCCH transmissions. The coverage enhancement through the joint channel estimation is possible, but it is difficult to expect the frequency diversification gain through frequency hopping. Accordingly, a method for acquiring not only coverage enhancement through joint channel estimation but also frequency diversification gain through frequency hopping is proposed.

(2) Second Method

"DMRS-Bundling=disable": When DMRS bundling is disabled, the slot index for frequency hopping may be determined on the basis of a single slot, and the TDW length may be determined on the basis a TDW default value of the first method. When "DMRS-Bundling=disable" is configured, the UE may be configured by the base station so that the frequency diversification gain through frequency hopping between PUSCH or PUCCH transmissions is prioritized over the coverage enhancement through the joint channel estimation in the base station. Accordingly, the slot index for frequency hopping may be determined on the basis of the single slot.

"DMRS-Bundling=enable": When DMRS bundling is enabled, the TDW length may be determined on the basis of the default value, and the slot index for frequency hopping may be determined so that frequency hopping can be performed at least one time on the basis of a half of the TDW default value. In this method, when "DMRS-Bundling=enable" is configured for the UE by the base station, the UE may perform frequency hopping at least one time for PUSCH or PUCCH transmission within the same TDW by determining the TDW length on the basis of the maximum interval in which the UE can maintain the joint channel estimation condition, and determining the slot index for frequency hopping on the basis of the half of the TDW default value. Accordingly, through this method, not only the coverage enhancement through the joint channel estimation but also the frequency diversification gain through frequency hopping can be acquired.

TDW Determination for Joint Channel Estimation

Next, in the disclosure, a method for determining, by a UE, a TDW for joint channel estimation when both M and L are configured and L<M is described.

Figure 57:
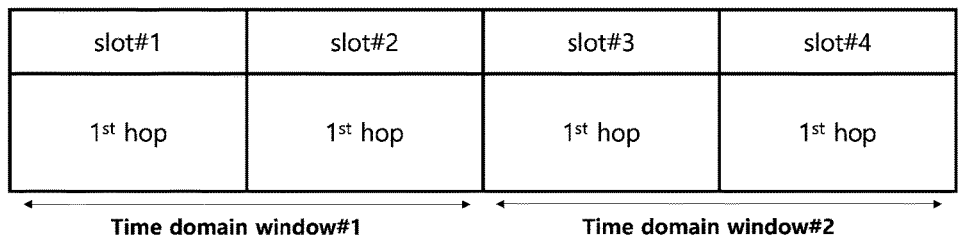
FIG. 57 illustrates a problem occurring when a UE determines a TDW.

Referring to FIG. 57, the UE may receive, from the base station, configuration/indication to repetitively transmit the PUCCH K=4 times from slot #1 to slot #4, and may be configured with M=4 and L=2. That is, the UE may determine four slots in which PUCCH repetition transmission is possible from the first slot in which PUCCH transmission is indicated to have the same frequency hop, and may determine the same TDW for two consecutive slots from the first slot in which PUCCH transmission is indicated. In this case, PUCCH repetition transmissions for slot #1 and slot #2 and PUCCH repetition transmissions for slot #3 and slot #4 are performed in the same frequency hop, and thus the joint channel estimation is possible in the base station. However, the PUCCH repetition transmissions for slot #1 and slot #2 and the PUCCH repetition transmission for slot #3 and slot #4 are determined to have different TDWs, and thus the UE does not need to satisfy the joint channel estimation condition when performing the PUCCH repetition transmission. In addition, even though the UE performs PUCCH repetition transmission by satisfying the joint channel estimation condition in different TDWs, the base station may not perform joint channel estimation for the PUCCH repetition transmissions performed in different TDWs. This is because the base station expects that the UE is to transmit the PUCCH within the TDW while satisfying the joint channel estimation condition.

Hereinafter, described are examples for solving performance deterioration according to configuration of L<M even though the UE transmits the PUSCH or the PUCCH for M slots so that the base station can perform joint channel estimation and the base station can acquire coverage enhancement of the uplink transmission according to the joint channel estimation by utilizing the same on the assumption that M and L are configured with a value smaller than a maximum interval corresponding to a maximum interval which can be configured by the UE (according to a value configured for the UE) so that the base station can perform joint channel estimation.

According to a first example of the disclosure, the UE may expect that L<M may not be configured by the base station under the condition that the base station knows UE capability such as a maximum interval related to joint channel estimation. That is, to prevent this problem occurs, the base station may configure for the UE via scheduling so that a value of L is always to be a value equal to or greater than M, and the UE may expect to receive a configuration via RRC signaling from the base station that L is to be a value to be equal to or greater than M. According to the first example, the value of M is a value equal to or smaller than L, and thus the UE may transmit the PUSCH or the PUCCH determined to have the same slot index for frequency hopping while maintaining phase continuity and power consistency so that the base station can perform joint channel estimation, and the base station may enhance the channel estimation performance through the joint channel estimation to acquire coverage enhancement of uplink transmission. However, the first example may cause restriction on the scheduling of the base station, and thus a method for solving this problem is described below.

According to a second example, when the UE receives configuration of L<M from the base station, the UE may determine the TDW on the basis of the value of M. That is, to maximize the gain through the joint channel estimation in the problem situation above, the UE may determine the TDW on the basis of a specific number M value as a hopping interval which can be included in one frequency hop while ignoring the value of L configured for the UE. It is described above that the slot index for frequency hopping may be determined on the basis of the value of M regardless of joint channel estimation, but to solve this problem, the value of M may be used for determining the TDW for joint channel estimation. According to the second example, the UE may transmit the PUSCH or the PUCCH to the base station by maintaining phase continuity and power consistency to enable the base station to perform joint channel estimation within the same slot index for frequency hopping on the basis of the configured value of M, and the base station may enhance channel estimation performance through the joint channel estimation to acquire coverage enhancement of the uplink transmission.

For example, referring to FIG. 57, L=2 is configured for the base station, but is a value smaller than the configured value of M(=4), the UE may use M=4 for TDW determination according to the second example. Accordingly, PUCCH repetition transmissions of slot #1, slot #2, slot #3, and slot #4 are included in the same TDW, and thus the UE may transmit the PUCCH to the base station by maintaining phase continuity and power consistency of DMRSs over multiple slots to enable the base station to perform joint channel estimation.

In the first example and the second example, it is assumed that M and L are configured, for the UE, to be a value smaller than a maximum interval corresponding to a maximum interval which can be configured by the UE according to the value configured for the UE to enable the base station to perform joint channel estimation. However, if not, that is, if M is configured to be greater than the maximum interval, the UE may perform uplink transmission to the base station by maintaining phase continuity and power consistency of DMRSs on the basis of the value L configured by the base station to enable the base station to perform joint channel estimation, and the base station may enhance channel estimation performance through joint channel estimation to acquire coverage enhancement of the uplink transmission.

In the first example and the second example, it is assumed that M and L are configured, for the UE, to be a value smaller than a maximum interval corresponding to a maximum interval which can be configured by the UE according to the value configured for the UE to enable the base station to perform joint channel estimation. However, if not, that is, if the value of M is configured to be greater than the maximum interval, the UE may perform uplink transmission to the base station by maintaining phase continuity and power consistency of DMRSs on the basis of the maximum interval corresponding to the maximum interval which can be configured by the UE according to the value configured for the UE to enable the base station to perform joint channel estimation, and the base station may enhance channel estimation performance through joint channel estimation to acquire coverage enhancement of the uplink transmission.

Reference Subcarrier Spacing (SCS) of TDW

In the disclosure, the TDW (length) may be defined by the number of symbols/slots/repetitions. In the NR system, there may be various SCSs, and thus the symbol/slot/repetition varies according to the SCS. Accordingly, an SCS for determining the TDW may be required. This is called a reference SCS of the TDW. A method for determining the reference SCS of the TDW is as follows.

As a first method, when receiving a TDD configuration of a cell, the UE receives a configuration of a reference SCS for the TDD configuration. When determining the TDW, the UE may use the reference SCS of the TDD configuration of the cell as a reference SCS of the TDW. Accordingly, the UE does not need a separate configuration of the reference SCS of the TDW.

As a second method, when receiving configuration of one or multiple UL BWPs of a cell, the UE receives configuration of SCSs of the one or more UL BWPs. When determining the TDW, the UE may use one of the SCSs configured for the one or more multiple UL BWPs of the cell as a reference SCS of the TDW. Preferably, when the multiple UL BWPs are configured, the lowest SCS may be used as the SCS of the TDW.

As a third method, when a UL BWP of each cell is active, the UE may use the SCS of the activated UL BWP as a reference SCS of the TDW.

As a fourth method, the UE may use any SCS as a reference SCS of the TDW. Here, any SCS may be determined differently for each frequency range (FR). Preferably, any SCS may be one of SCSs available in each FR, and may be the lowest SCS. For example, in a case of FR1, 15 kHz, 30 kHz, and 60 kHz are available for the SCS, and thus 15 kHz may be used as the reference SCS of the TDW. In a case of FR2, 60 kHz and 120 kHz are available for the SCS, 60 kHz may be used as the reference SCS of the TDW.

The first to fourth methods are cases where the UE receives no configuration of a separate reference SCS to determine the TDW. However, the base station may configure a reference SCS of a cell for the UE. A fifth method corresponds to a case where the UE configures a reference SCS for the UE. In this case, the UE may expect a reference SCS at least satisfying the following condition: the reference SCS of the TDW, configured for the UE in the cell, is at least no greater than the SCS configured for the UL BWP of the cell.

Transmission of Information on TDW

In the description above, the method for determining, by the UE, the TDW on the basis of explicit information or implicit information of the TDW received from the base station is described. Hereinafter, a method for determining and applying a TDW by the UE itself, and then transmitting information on the TDW to the base station is described.

As a first method, information on a start and an end of the TDW may be transmitted. For example, the UE may indicate 1-bit value "0" (or "1") to a PUSCH or a PUCCH transmitted in a symbol set of the start and the end of the TDW, and may indicate 1-bit value "1" (or "0") to a PUSCH or a PUCCH transmitted in a symbol set other than the start or the end of the TDW. Here, the symbol set may include a slot, a symbol, and a repetition transmission. For example, when it is assumed that the TDW starts at slot n and ends at slot n+3, the 1-bit value "0" may be indicated to the PUSCH or the PUCCH transmitted in slot n, and the 1-bit value "1" may be indicated to the PUSCH or the PUCCH transmitted in slot n+1, slot n+2, and slot n+3. Here, when the 1-bit value is indicated to the PUSCH, the 1-bit is multiplexed with the PUSCH and transmitted. In this case, the 1-bit may be multiplexed with the PUSCH in the same method as HARQ-ACK.

As a second method, information on the TDW may be transmitted by toggling the TDW when the same is changed. For example, the UE may transmit 1-bit value "0" in the PUSCH or the PUCCH transmitted in a symbol set within one TDW, and may transmit "1" by toggling the corresponding the 1-bit value in the PUSCH or the PUSCH transmitted in a symbol set within the next TDW.

Through FIG. 39, the problems of the first method and the second method are described. When the base station fails to receive the PUSCH or the PUCCH transmitted in a symbol set within a specific TDW indicated by the UE, ambiguity in the TDW may occur between the UE and the base station. Referring to FIG. 39*a*, the UE may indicate slots 0/1/2/3 as one TDW and indicate slots 4/5 as another TDW according to the first method. In this case, when the base station fails to perform PUCCH or PUSCH reception of slots 3/4, the base station may attempt joint channel estimation by determining slots 0 to 5 as one TDW. Referring to FIG. 39*b*, the UE may indicate slots 0/1/2 as one TDW, indicate slots 3/4 as another TDW, and slot 5 as another TDW. In this case, when the base station fails to perform PUCCH or PUSCH reception of slots 3/4, the base station may attempt joint channel estimation by determining slots 0 to 5 as one TDW. However, the UE may transmit the PUCCH or the PUSCH without satisfying the condition for joint channel estimation in different TDWs, and thus the base station may fail to perform joint channel estimation and it may be difficult to enhance coverage performance. Accordingly, a method for reducing the ambiguity in the information on the TDW between the UE and the base station is required.

According to a first example of the disclosure, the UE may transmit information on the TDW to the base station by using a counter indicator. The UE may transmit information on the order of a symbol set in which the PUCCH or the PUSCH is transmitted in one TDW. Here, the symbol set may include a slot, a symbol, and a repetition transmission. For example, referring to FIG. 40a, when the UE desires to indicate that joint channel estimation is possible from slot 0 to slot 3 and joint channel estimation is possible from slot 4 to slot 5, the UE may indicate a value of 0 to a start slot in which joint channel estimation is possible, and indicate counter indicator values of 1, 2, and 3 to the subsequent slots in an ascending order. In addition, referring to FIG. 40b, when the UE desires to indicate that joint channel estimation is possible from slot 0 to slot 2 and joint channel estimation is possible from slot 3 to slot 4, the UE may indicate a value of 0 to a start slot in which joint channel estimation is possible, and may indicate counter indicator values to the subsequent slots in an ascending order. Accordingly, in FIGS. 40a and 40b, when the base station has failed to decode the uplink transmissions of slots 3/4, the base station may also identify through the counter indicator that joint channel estimation cannot be performed for the uplink transmissions of slot 2 and slot 5.

According to a $(1-1)^{th}$ example, the UE may transmit, as information for joint channel estimation, information on a counter indicator and a total indicator. That is, the information on the TDW may be indicated as [counter indicator, total indicator]. The total indicator may be a symbol set included in one TDW. Here, the symbol set may include a slot, a symbol, and a repetition transmission. For example, referring to FIG. 41, when the base station fails to receive uplink transmissions of slot 2 and slot 3, the ambiguity may occur even with the counter indicator of the first example. Accordingly, by indicating both the counter indicator and the total indicator, the ambiguity in the TDW between the UE and the base station can be reduced. This method reduces the ambiguity in the TDW between the UE and the base station when the base station has failed to received the uplink channels transmitted by the UE, and thus a coverage gain through enhancement of the joint channel estimation performance can be acquired.

Figure 42:
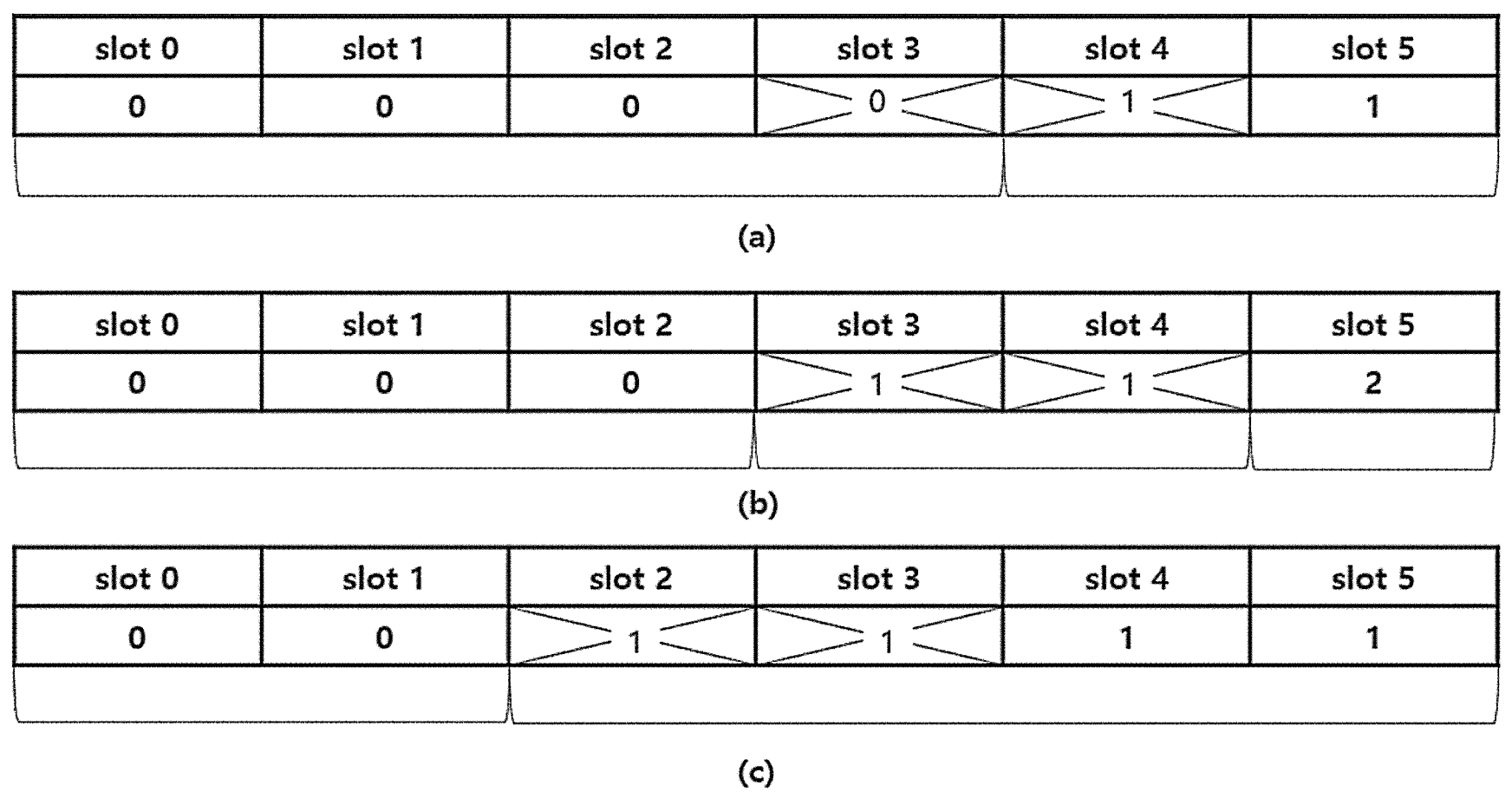

According to a second example of the disclosure, a TDW index may be transmitted. In the first example, different counter values are transmitted for the respective slots in the same TDWs, and thus signaling overhead and complexity of the UE may increase. Accordingly, one TDW may be identified as the same index, and the index is sequentially increased when the TDW is changed to the next TDW to indicate a different TDW. For example, referring to FIG. 42, the UE may notify of uplink transmissions in the same TDW through the index of the TDW, and may notify a different TDW by increasing the index when the TDW changes. This method is advantageous in that when uplink transmission within a specific TDW has failed (slot 3 and slot 4) as shown in FIG. 42b, the base station may be scheduled to recognize the failure and perform re-transmission.

TDW Determination when Multiple Cells are Configured

Next, in the disclosure, a method for determining the TDW when multiple cells (e.g., uplink cells) are configured for the UE is described.

The UE may receive a configuration of multiple uplink cells from the base station. When multiple uplink cells are configured for the UE, it is called UL carrier aggregation (CA). A cell initially configured for the UE is called a primary cell (PCell), and a cell configured in addition to the PCell is called a secondary cell (SCell). The UE may transmit an uplink physical channel in the PCell and/or the SCell. Here, the uplink physical channel may include at least one of a PUSCH and a PUCCH. When transmitting uplink physical channels in multiple cells within the same band, the UE may share transmission power to the multiple cells and perform transmission.

When the UE performs uplink transmission in multiple cells, the base station may perform joint channel estimation using a DMRS of the uplink channel. Accordingly, when the multiple uplink cells are configured, the UE may be configured to satisfy the above-described joint channel estimation condition. In the decryption above, the method for receiving configuration of one TDW from the base station by the UE and applying uplink channel transmission is described. When the UE has received configuration of one TDW in a (UL) CA situation, the following problems may occur in determining the TDW in the multiple cells. Here, one TDW may be a TDW configured with reference to the (uplink) PCell of the UE.

Figure 43:
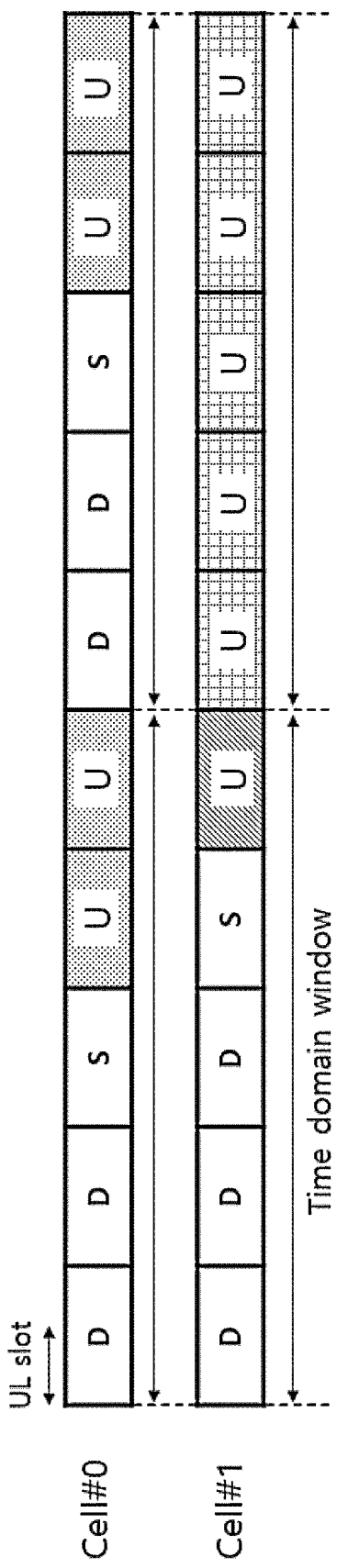
FIG. 43 illustrates a problem occurring when a TDW is determined in a CA situation.

First, the UE may have different TDD configurations for the multiple cells. Here, the TDD configuration refers to a case where a specific symbol is configured to be at least one of a downlink symbol, an uplink symbol, and a flexible symbol from the base station. In this case, the TDW configured with reference to the PCell may not be an optimal TDW for joint channel estimation in the SCell. For example, referring to FIG. 43, the UE has received two cells, cell #0 and cell #1, and may have different TDD configurations for cells, respectively. In this case, it is assumed that the UE has received configuration of the TDW with reference to cell #0 and the TDW is applied every five slots from the first slot within a radio frame. The number of consecutive UL slots in cell #1 is 6, but the TDW is applied every five slots, and thus the TDW may not be the optimal TDW for cell #1.

Figure 44:
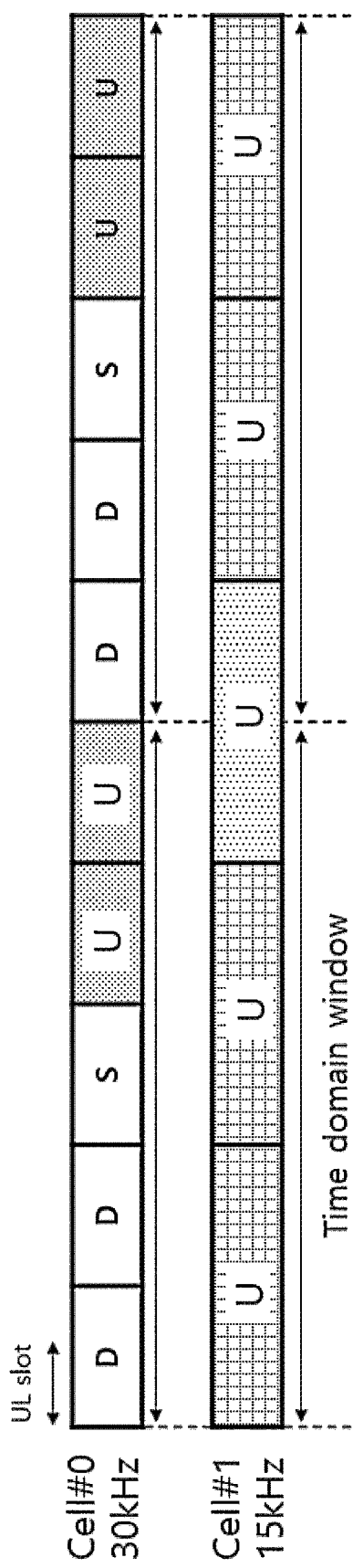
FIG. 44 illustrates a problem occurring when a TDW is determined in a CA situation.

Next, the UE may have different SCS configurations for multiple cells. Here, the SCSs may include at least one of an SCS for TDD configuration and an SCS for BWP configuration. In a CA situation, when the SCS for TDD configuration of the SCell is less than the SCS for the TDD configuration of the PCell, the boundary of the TDW determined with reference to the PCell may not be accurately applied. For example, referring to FIG. 44, for the SCSs for the TDD configuration of two cells, the UE has received configuration that the SCS for cell #0 is 30 kHz and the SCS for cell #1 is 15 kHz. It is assumed that the TDW for joint channel estimation is indicated to be 2.5 ms or 5 slots from the first slot within a radio frame with reference to cell #0. In this case, the UE may apply the same TDW to cell #1. In this case, a TDW boundary may be located during transmission of the uplink channel within the third U slot of cell #1. Accordingly, in the third U slot of cell #1, some symbols belong to a first TDW, and the other symbols belong to a second TDW. That is, when the SCS for the TDD configuration of the SCell is less than the SCS for the TDD configuration of the PCell, the TDW may not be accurately applied. Accordingly, in the CA situation, TDWs need to be determined accurately for all cells configured for the UE.

Next, examples for solving the problem in determining the TDW in the (UL) CA situation are described.

Figure 45:
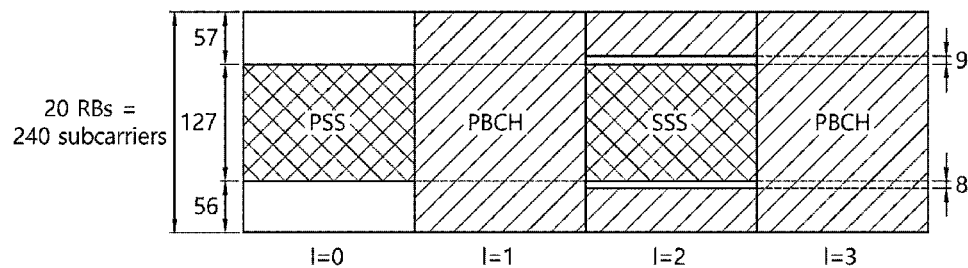
FIG. 45 illustrates a TDW indication method according to an example of the present disclosure.

According to a first example of the disclosure, for multiple cells, the UE may receive a configuration of a separate TDW for each of the cells. When multiple cells are configured for the UE, an individual TDW may be configured for each cell. That is, when the number of cells including the PCell, configured for the UE, is N, the UE may receive a configuration of N TDWs applied to the respective cells. For example, for (cell #0, cell #1, . . . , cell #N−1), the UE may receive a configuration of (window #0, window #1, . . . , window #N−1), respectively. For example, referring to FIG. 45, the UE may receive a configuration of TDW #0 (=2 slots (=1 ms) of 30 kHz SCS) for cell #0 and TDW #1 (=2 slots (=2 ms) of 15 kHz SCS) for cell #1. Here, the method for configuring the TDW of each cell may be determined according to the above-described TDW configuration method for one cell.

In the above-described (UL) CA situation, the configuration for a separate TDW for each cell is assumed in the first example. However, the base station may use some parameter as cell-common parameters to reduce signaling overhead. The method thereof is as follows.

As a first method, a common TDW reference SCS (simply, referred to as a reference SCS) may be used for the respective cells. That is, the base station may configure one reference SCS for the UE, and the UE may implicitly infer only one reference SCS. The UE may apply the one reference SCS to all cells. For example, in FIG. 45 above, the SCS of the TDW of cell #0 is 30 kHz, and the SCS of the TDW of cell #1 is 15 kHz. In this case, as in FIG. 45, when the SCS of the TDW is configured to be high, the boundary of the TDW may be positioned at the middle of the slot having the low SCS. A method for preventing this is as follows. The UE may obtain a TDW SCS in each cell. The UE may select one of the TDW SCSs of each cell and use the same as a reference SCS for all cells. In this case, the lowest TDW SCS among the TDW SCSs of each cell may be selected as the reference SCS. In another example, the TDW SCS of the PCell among the respective cells may be selected as the reference SCS. In another example, the TDW SCS of a cell having the lowest index among the respective cells may be selected as the reference SCS. In another example, the UE may receive a configuration of one reference SCS for the TDW of all cells from the base station. In this case, the reference SCS configured for the UE needs to have a value not greater than the CSC configured for the UL BWP of all cells.

As a second method, the UE may receive one TDW length in common, without receiving configuration of the TDW length for each cell. In this case, when one TDW length is commonly configured, the TDW length is called a cell-common TDW length. The UE may apply the cell-common TDW length to the respective cells. For example, the UE may adjust the cell-common TDW length according to the reference SCS and the SCS of the cell and apply the same to each of the cells. That is, when the cell-common TDW length corresponds to M slots/symbols/repetitions, the TDW length applied to one cell may be obtained as follows.

$$-TDW = f(M * (SCS\_cell/SCS\_refer))(slot/symbol/repetition)$$

Here, SCS_refer denotes a reference SCS, and SCS_cell denotes an SCS of a cell. F(x) may be at least one of ceil(x), floor(x), and round(x). Ceil(x) indicates a roundup function, flow(x) indicates a rounddown function, and round(x) indicates a round function. M indicates a cell-common TDW length.

Figure 46:
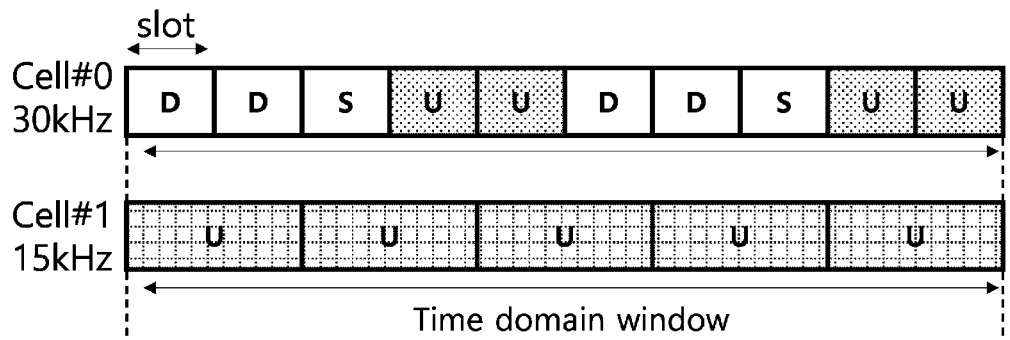
FIG. 46 illustrates a TDW indication method according to an example of the present disclosure.

For example, referring to FIG. 46, it is assumed that the UE has received configuration that the SCS of cell #0 is a 30 kHz SCS and the SCS of cell #1 is a 15 kHz SCS and the reference SCS (SCS_refer) of two cells is 15 KHZ. In addition, it is assumed that the cell-common TDW length for joint channel estimation is indicated as five slots (from the first slot within a radio frame). In this case, according to the above-described equation, the TDW length applied to cell #0 may be determined to be 5*(30 kHz/15 kHz)=10 slots/symbols/repetitions, and the TDW length applied to cell #1 may be determined to be 5*(15 kHz/15 kHz)=5 slots/symbols/repetitions.

Figure 47:
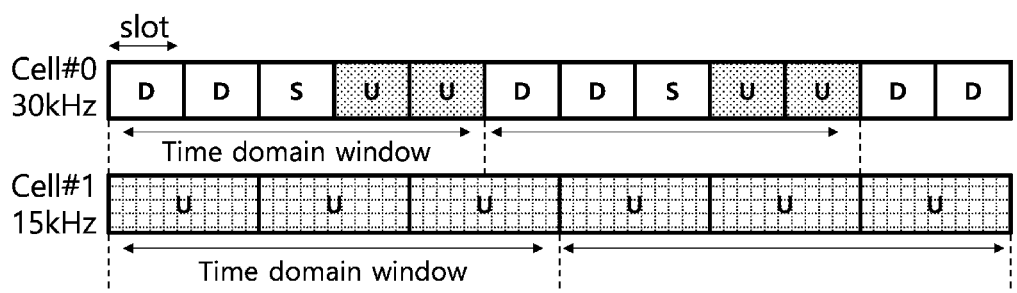
FIG. 47 illustrates a TDW indication method according to an example of the present disclosure.

For example, referring to FIG. 47, it is assumed that the UE has received configuration that the SCS of cell #0 is a 30 kHz SCS and the SCS of cell #1 is a 15 kHz SCS and the reference SCS (SCS_refer) of two cells is 30 kHZ. In addition, it is assumed that the cell-common TDW length for joint channel estimation is indicated as five slots (from the first slot within a radio frame). In this case, according to the above-described equation (e.g., f(x)=ceil(x)), the TDW length applied to cell #0 may be determined to be ceil(5*(30 kHz/30 kHz))=5 slots/symbols/repetitions, and the TDW length applied to cell #1 may be determined to be ceil(5*(15 kHz/30 kHz))=3 slots/symbols/repetitions.

In the (UL) CA situation, according to a second example of the disclosure, the TDW determined in one cell may be extendedly applied to each cell. When the multiple cells are configured, the UE may select one reference cell. Thereafter, the TDW configured with reference to the reference cell may be determined as the TDW for all cells. A criterion for determining the reference cell may include the following items.

PCell: One TDW may be a window determined with reference to the PCell. That is, the UE may extend, according to the SCell, the TDW determined with reference to the PCell and apply the same.

The lowest cell index: A cell having the lowest cell index may be determined to be a reference cell. Here, the lowest cell index may be 0. That is, the PCell may be determined to be a reference cell. Alternatively, the lowest cell index may be 1. That is, a cell having the lowest cell index among the SCells remaining after excluding the PCell may be determined as a reference cell.

The lowest SCS: A cell configure with the lowest SCS may be determined as a reference cell. Here, the SCS may include at least one of an SCS according to a TDD configuration and an SCS according to a BWP configuration of the UE. When the multiple cells of the UE are configured to have different SCSs, respectively, the TDW determined with reference to the cell configured with the highest SCS may not end at the slot boundary of the cell having the lowest SCS, and may end within the slot. To prevent this, the UE may select, as a reference cell, a cell configured with the lowest SCS among the multiple cells, and apply the TDW of the corresponding cell to all cells. When there are multiple cells configured with the lowest SCS, the reference cell may be determined in a combination with other criteria (e.g., a cell index, TDD configuration periodicity, and a UL slot ratio). For example, when there are two cells configured with the lowest SCS, a cell having the lowest cell index between two cells may be selected as a reference cell.

Figure 48:
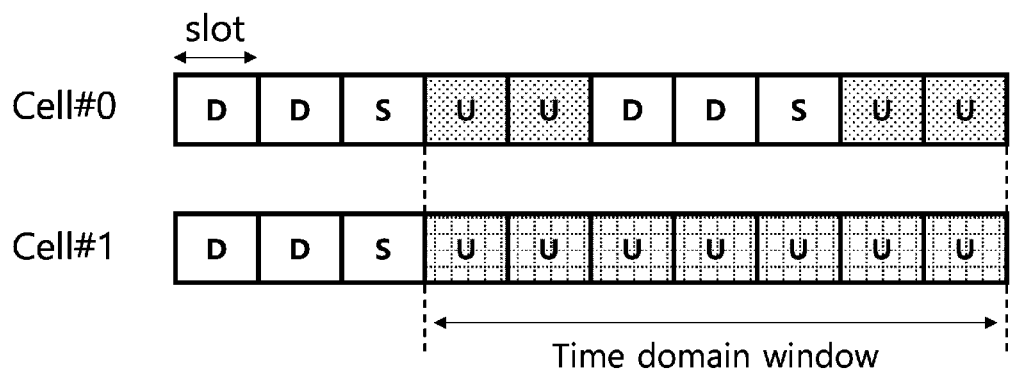
FIG. 48 illustrates a TDW indication method according to an example of the present disclosure.

The longest TDD configuration periodicity: A cell having the longest TDD configuration periodicity may be determined as a reference cell. Here, the TDD configuration periodicity is called periodicity by which one TDD configuration repeats (e.g., see TS38.213 11.1). For example, referring to FIG. 48, when SCS for TDD configuration of all cells is 15 kHz, the TDD configuration periodicity of cell #0 is 5 ms, and the TDD configuration periodicity of cell #1 is 10 ms. To include as many UL slots as possible for the multiple cells, the UE may determine the cell having the longest TDD configuration periodicity as a reference cell, and apply the TDW of the corresponding cell to all cells. The TDD configuration periodicity of cell #0 is 5 slots, the TDD configuration periodicity of cell #1 is 10 slots, thus cell #1 may be selected as a reference cell, and the TDW of cell #1 may be applied to all cells. When there are multiple cells having the longest TDD configuration periodicity, the reference cell may be determined in a combination of other criteria (e.g., a cell index, an SCS, and a UL slot ratio). For example, when there are two cells having the longest TDD configuration periodicity, a cell having the lowest SCS between two cells may be selected as a reference cell.

Figure 49:
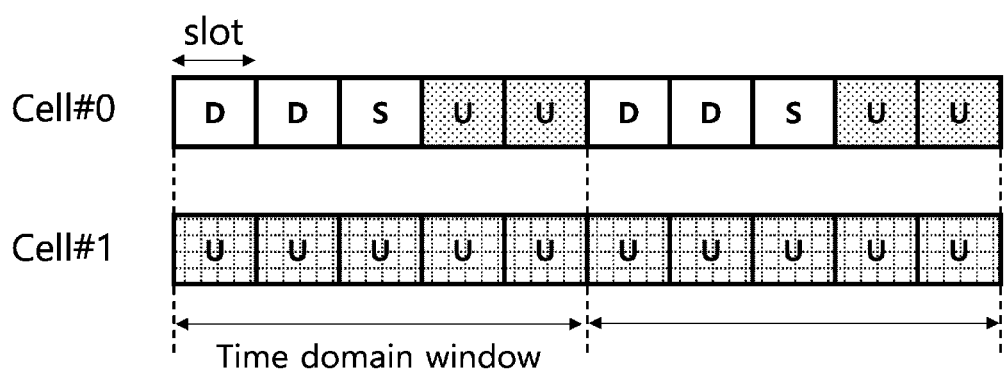
FIG. 49 illustrates a TDW indication method according to an example of the present disclosure.

The most UL slot portion: A cell including the largest number of UL slots may be determined as a reference cell. The UE may determine, as a reference cell, a cell including the largest number of UL slots during the same time interval from among multiple cells. Here, the same time interval may be the longest TDD configuration periodicity among the multiple cells. For example, referring to FIG. 49, cell #1 including the largest number of UL slots may be determined as a reference cell, and the TDW of cell #1 may be applied to all cells. When there are multiple cells including the largest number of UL slots, the reference cell may be determined in a combination of other criteria (e.g., a cell index, an SCS, and TDD configuration periodicity), a cell having the longest TDD configuration periodicity between two cells may be selected as a reference cell.

Figure 50:
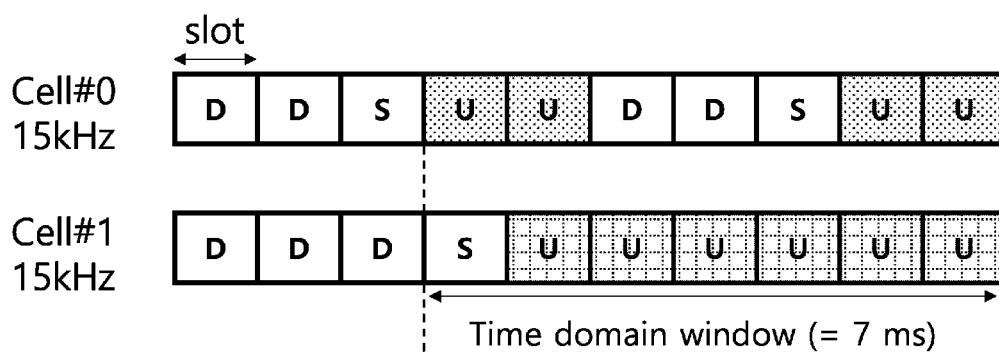
FIG. 50 illustrates a TDW indication method according to an example of the present disclosure.

In the (UL) CA situation, according to a third example, UE may determine the TDW on the basis of consecutive slots among a union of UL slots for the multiple (uplink) cells. To include as many TDD configurations for the configured multiple cells in the TDW, the UE may determine the TDW with reference to consecutive slots among the unit of UL slots among the multiple cells. Here, the union of UL slots means a slot including a UL symbol in at least one cell. For example, referring to FIG. 50, it is assumed that the UE has been configured so that different TDD configurations are made for two cells, respectively, and two cells have the same SCS=15 kHz. For cell #0 and cell #1, the UE may determine, as one TDW, a unit of consecutive UL slots. That is, the UE may determine one TDW including the fourth slot, the fifth slot, the ninth slot, and the tenth slot of cell #0 and the fifth slot to the tenth slot of cell #1, and apply the same as the TDW of all cells.

The method and system of the present disclosure are described in relation to specific embodiments, but configuration elements, a part of or the entirety of operations of the present disclosure may be implemented using a computer system having a general-purpose hardware architecture.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as one type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

INDUSTRIAL APPLICABILITY

The present invention can be applied to a user equipment, a bass station or any other device in a wireless communication system.

The invention claimed is:

1. A user equipment (UE) configured to operate in a wireless communication system, the UE comprising:
a communication module; and
a processor configured to control the communication module,
wherein the processor is configured to:
perform transmission of an uplink channel on a slot set; and
transmit a demodulation reference signal (DMRS) for the transmission of the uplink channel on the slot set,
wherein the DMRS is transmitted on one or more slots within a time window,
when a value of a length of the time window is configured by a base station, the length of the time window is determined by the value,
when the value of the length of the time window is not configured by the base station, the length of the time window is determined based on a smaller value between following values:
(1) a duration in consecutive slots from a first slot determined for the transmission of the uplink channel to the last slot determined for the transmission of the uplink channel; and
(2) a maximum duration in which the UE can maintain phase continuity and power consistency according to UE capability.

2. The UE of claim 1, wherein when a joint channel estimation operation is configured, the DMRS is transmitted so that the phase continuity and the power consistency are maintained over the one or more slots within the time window.

3. The UE of claim 1, wherein a number of the consecutive slots is determined based on a number of repetition of the uplink channel.

4. The UE of claim 1, wherein the consecutive slots comprise a slot configured by the base station for the transmission of the uplink channel.

5. The UE of claim 1, wherein the uplink channel comprises a physical uplink control channel (PUCCH) repetition transmission or a physical uplink shared channel (PUSCH) repetition transmission.

6. The UE of claim 1, wherein the uplink channel comprises a PUSCH repetition transmission type A, or a PUSCH repetition transmission type B.

7. A method used by a user equipment (UE) in a wireless communication system, the method comprising:
performing transmission of an uplink channel on a slot set; and
transmitting a demodulation reference signal (DMRS) for the transmission of the uplink channel on the slot set,
wherein the DMRS is transmitted on one or more slots within a time window,
when a value of a length of the time window is configured by a base station, the length of the time window is determined by the value,
when the value of the length of the time window is not configured by the base station, the length of the time window is determined based on a smaller value between following values:
(1) a duration in consecutive slots from a first slot determined for the transmission of the uplink channel to the last slot determined for the transmission of the uplink channel; and
(2) a maximum duration in which the UE can maintain the-phase continuity and power consistency according to UE capability.

8. The method of claim 7, wherein when a joint channel estimation operation is configured, the DMRS is transmitted so that the phase continuity and the power consistency are maintained over the one or more slots within the time window.

9. The method of claim 7, wherein a number of the consecutive slots is determined based on a number of repetition of the uplink channel.

10. The method of claim 7, wherein the consecutive slots comprise a slot configured by the base station for the transmission of the uplink channel.

11. The method of claim 7, wherein the uplink channel comprises a physical uplink control channel (PUCCH) repetition transmission or a physical uplink shared channel (PUSCH) repetition transmission.

12. The method of claim 7, wherein the uplink channel comprises a PUSCH repetition transmission type A, or a PUSCH repetition transmission type B.

* * * * *